US008892305B2

(12) United States Patent
Yasui et al.

(10) Patent No.: US 8,892,305 B2
(45) Date of Patent: Nov. 18, 2014

(54) MOTION CONTROL DEVICE FOR VEHICLE

(75) Inventors: Yoshiyuki Yasui, Nagoya (JP);
 Toshihisa Kato, Handa (JP); Toshio Yasutake, Toyoake (JP); Atsushi Ikematsu, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 739 days.

(21) Appl. No.: 12/730,555

(22) Filed: Mar. 24, 2010

(65) Prior Publication Data

US 2010/0268420 A1 Oct. 21, 2010

(30) Foreign Application Priority Data

Apr. 15, 2009 (JP) .................................. 2009-098638
Apr. 15, 2009 (JP) .................................. 2009-098646
Apr. 15, 2009 (JP) .................................. 2009-098653

(51) Int. Cl.
 *B60T 8/17* (2006.01)
 *B60T 8/1755* (2006.01)
(52) U.S. Cl.
 CPC ......... *B60T 8/17555* (2013.01); *B60T 2230/02* (2013.01)
 USPC ................... 701/38; 701/36; 701/41; 701/70; 701/71; 701/72; 701/74; 701/75
(58) Field of Classification Search
 CPC ..... B60T 7/12; B60T 8/1755; B60T 8/17551; B60T 8/17554; B60W 30/02; B60W 30/04
 USPC .................. 701/36, 38, 41, 70, 71, 72, 74, 75
 See application file for complete search history.

(56) References Cited

U.S. PATENT DOCUMENTS

| 5,732,379 | A  | * | 3/1998  | Eckert et al. ..................... 701/83  |
| 6,276,766 | B1 |   | 8/2001  | Yamada                                      |
| 6,622,073 | B2 | * | 9/2003  | Tanaka et al. ................... 701/38    |
| 6,957,873 | B2 | * | 10/2005 | Wanke et al. ................. 303/140      |

(Continued)

FOREIGN PATENT DOCUMENTS

| JP | 03-112756 A | 5/1991 |
| JP | 08-142834 A | 6/1996 |

(Continued)

OTHER PUBLICATIONS

Japanese Office Action dated Apr. 9, 2013 issued in the corresponding Japanese Patent Application No. 2009-098638 and English language translation.

(Continued)

*Primary Examiner* — John Q Nguyen
*Assistant Examiner* — Michael Whalen
(74) *Attorney, Agent, or Firm* — Buchanan Ingersoll & Rooney PC

(57) ABSTRACT

A motion control device for a vehicle, including a braking means for applying a brake torque to a wheel of the vehicle and maintaining a traveling stability of the vehicle by controlling the braking means, the motion control device for the vehicle, includes a steering angular velocity obtaining means for obtaining a steering angular velocity of the vehicle, a yaw angular acceleration obtaining means for obtaining a yaw angular acceleration of the vehicle, and a control means for controlling the brake torque on the basis of the steering angular velocity and the yaw angular acceleration.

6 Claims, 26 Drawing Sheets

(56) References Cited

U.S. PATENT DOCUMENTS

| | | | |
|---|---|---|---|
| 6,968,920 B2 * | 11/2005 | Barton et al. | 180/446 |
| 7,212,903 B2 * | 5/2007 | Niino et a | 701/71 |
| 7,657,353 B2 * | 2/2010 | Yasui et al. | 701/38 |
| 7,681,960 B2 * | 3/2010 | Wanke et al. | 303/146 |
| 7,848,866 B2 * | 12/2010 | Nimmo et al. | 701/70 |
| 2002/0087247 A1 * | 7/2002 | Tanaka et al. | 701/70 |
| 2003/0093190 A1 * | 5/2003 | Mori | 701/1 |
| 2004/0046447 A1 | 3/2004 | Wanke et al. | |
| 2005/0004738 A1 * | 1/2005 | Gronau et al. | 701/70 |
| 2005/0065697 A1 * | 3/2005 | Niino et al. | 701/71 |
| 2006/0155457 A1 * | 7/2006 | Waldbauer et al. | 701/72 |
| 2006/0241833 A1 * | 10/2006 | Yasui et al. | 701/38 |
| 2007/0282510 A1 * | 12/2007 | Nimmo et al. | 701/70 |
| 2009/0150028 A1 * | 6/2009 | Bernzen et al. | 701/45 |
| 2009/0152940 A1 * | 6/2009 | Mercier et al. | 303/113.2 |
| 2009/0198408 A1 * | 8/2009 | Salman et al. | 701/34 |
| 2010/0106358 A1 * | 4/2010 | Lu et al. | 701/29 |
| 2010/0241303 A1 * | 9/2010 | Taguchi | 701/29 |

FOREIGN PATENT DOCUMENTS

| | | |
|---|---|---|
| JP | 10-086705 A | 4/1998 |
| JP | 3114647 B2 | 12/2000 |
| JP | 2003-182556 A | 7/2003 |
| JP | 2004-513010 A | 4/2004 |
| JP | 2006-282146 A | 10/2006 |
| JP | 2007-032615 A | 2/2007 |
| JP | 2007-513002 A | 5/2007 |
| JP | 4119244 B2 | 7/2008 |

OTHER PUBLICATIONS

Japanese Office Action dated Apr. 9, 2013 issued in the corresponding Japanese Patent Application No. 2009-098646 and English language translation.

Japanese Office Action dated Apr. 9, 2013 issued in the corresponding Japanese Patent Application No. 2009-098653 and English language translation.

* cited by examiner

MOTION CONTROL DEVICE FOR VEHICLE

CROSS REFERENCE TO RELATED APPLICATIONS

This application is based on and claims priority under 35 U.S.C. §119 to Japanese Patent Application 2009-098638, filed on Apr. 15, 2009, Japanese Patent Application 2009-098646, filed on Apr. 15, 2009, and Japanese Patent Application 2009-098653, filed on Apr. 15, 2009, the entire contents of which are incorporated herein by reference.

FIELD OF THE INVENTION

The present invention generally relates to a motion control device for a vehicle.

BACKGROUND

Disclosed in JP3114647B is a brake system for a behavior control of a vehicle, that "includes a means for detecting a steering angle and a means for detecting a steering angular velocity and that starts actuating a pump means when a degree (a level) of the steering angle becomes equal to or greater than a reference value of the steering angle and when a level of the steering angular velocity becomes equal to or greater than a reference value of the steering angular velocity" in order to "ensure a favorable responsiveness of a behavior control by means of a braking force in a manner where the pump means is actuated at a stage where a condition of inducing a deterioration of a vehicle behavior is satisfied, instead of actuating the pump means at a stage where the vehicle behavior is actually deteriorated to some extent".

Disclosed in JP4119244A is a method for regulating a driving stability of a vehicle that "determines whether or not the vehicle is inclined to be in an unstable traveling condition from a stabile traveling condition on the basis of an abrupt (sudden) steering operation (a start of the steering operation)" and that allows "a preliminary brake intervention" to be executed on the basis of a maximum value of a steering wheel angular velocity and the like in order to "execute the preliminary brake intervention while the vehicle stably travels in the case where the vehicle is determined to incline to be in the unstable driving condition when a driver performs the sudden; steering performance".

Disclosed in JP2007-513002T states that "a brake pressure is likely to increase while a vehicle travels on a road having a limited inclination. Therefore, a desired target brake torque starts acting on the vehicle only after a predetermined time, which is used as a function for a brake apparatus, has been passed. This delay time (i.e. a delay of the brake pressure in acting on the vehicle) may result in generating a sideslip at the vehicle, and the vehicle may not sufficiently and promptly be stabilized in highly dynamic maneuvers." Furthermore, the regulation of driving dynamics disclosed in JP2007-513002T "determines a lateral acceleration of the vehicle and a steering speed and monitors the lateral acceleration and the steering speed in relation to threshold values, so that a preparatory brake pressure is built up in a case where the lateral acceleration exceeds a threshold value and the steering speed falls below a threshold value" in order to "promptly stabilize the vehicle while the vehicle is in a dangerous driving state".

The above-mentioned specifications (JP3114647B, JP4119244B and JP2007-513002T), for example, estimate a start of an execution of a vehicle stability control on the basis of the steering angular velocity and the like in a situation where the driver needs to abruptly and emergently avoid an obstacle while driving, and then, execute a control for applying an auxiliary brake torque to the vehicle in order to compensate a responsiveness of an actuator before the vehicle stabilizing control is executed (this control will be hereinafter referred to as a preparatory control). More specifically, a brake torque in a low level is applied to the vehicle in the preparatory control. Generally, a noise and a vibration are likely to be generated when the actuator is actuated. Therefore, in a case where the vehicle stabilizing control is not executed even if the preparatory control is executed, the noise and the vibration may cause a discomfort to the driver. Generally, an auxiliary pressure control (i.e. the preparatory control, a control for generating an auxiliary (preparatory) pressure) may be needed in a case where changes in the vehicle behavior are abrupt. However, in a case where changes in a yawing behavior are slow and gradual (e.g. in a case where an understeering tendency occurs at the vehicle), the auxiliary pressure control may not be needed.

A need thus exists to provide a motion control device for a vehicle for properly executing a vehicle stabilizing control while avoiding an unnecessary execution of an auxiliary pressure control (a preparatory control) and avoiding a generation of discomfort to a driver.

SUMMARY OF THE INVENTION

According to an aspect of the present invention, a motion control device for a vehicle includes a braking means for applying a brake torque to a wheel of the vehicle, a steering angular velocity obtaining means for obtaining a steering angular velocity of the vehicle, a yaw angular acceleration obtaining means for obtaining a yaw angular acceleration of the vehicle, and a control means for controlling the brake torque of the wheel via the braking means on the basis of the steering angular velocity and the yaw angular acceleration. The control means controls the braking means to apply the brake torque to the wheel in a case where (a degree of) the steering angular velocity is greater than a first predetermined value and where (a degree of) the yaw angular acceleration is greater than a second predetermined value.

Generally, when a preparatory control is executed, a driver may feel discomfort because of a drive noise of an actuator and the like or because of a slight deceleration of the vehicle caused by the preparatory control. Furthermore, generally, the preparatory control becomes necessary when an abrupt (rapid) yawing behavior occurs. For example, in a case where a lateral grip of a front wheel of the vehicle decreases and an understeering tendency occurs at the vehicle, the preparatory control is not necessary. Furthermore, in a case where changes in the yawing behavior are small while the vehicle is in the oversteering tendency, a necessity of the preparatory control may be low. Accordingly, in a case where the steering angular velocity is great and a start of a vehicle stabilizing control (a main control) is expected, the yaw angular acceleration is taken into consideration in a starting condition of the preparatory control. Accordingly, the preparatory control may be executed only when necessary.

According to another aspect of the present invention, a motion control device for a vehicle includes a braking means for applying a brake torque to a wheel of the vehicle, an actual turning state quantity obtaining means for obtaining an actual turning state quantity acting on the vehicle, and a first recognizing means for calculating a first state quantity on the basis of the actual turning state quantity and recognizing an oversteering tendency of the vehicle on the basis of the first state quantity. The device further includes a second recognizing means for calculating a second state quantity, which differs from the first state quantity, on the basis of the actual turning state quantity and recognizing the oversteering tendency of the vehicle on the basis of the second state quantity, a steering angular velocity obtaining means for obtaining a steering angular velocity of the vehicle, and a control means for controlling the braking means in order to control the brake torque of the wheel. The control means executes a vehicle stabilizing control for maintaining a stability of the vehicle in a manner where the control means controls the brake torque of the wheel via the braking means on the basis of a recognition result of the first recognizing means. Furthermore, the control means controls the braking means on the basis of a recognition result of the second recognizing means and the steering angular velocity in order to apply the brake torque to the wheel to enhance a responsiveness of the vehicle stabilizing control. The braking means may apply the brake torque to the wheel in a case where (a degree of) the steering angular velocity is greater than a first predetermined value and where the recognition result of the second recognizing means indicates the oversteering tendency.

The second recognizing means recognizes a relatively fast yawing motion of the vehicle when comparing to the first recognizing means. The first recognizing means is configured so as to calculate the first (oversteering) state quantity on the basis of an interrelation between a state quantity indicating a magnitude (degree) of the yawing motion of the vehicle (e,g, a sideslip angle, a sideslip angle deviation) and a state quantity indicating a speed (velocity) of the yawing motion of the vehicle (e.g. a sideslip angular velocity, a yaw rate deviation). On the other hand, the second recognizing means is configured so as to calculate the second (oversteering) state quantity on the basis only of the state quantity indicating the speed of the yawing motion of the vehicle (e.g. the sideslip angular velocity, the yaw rate deviation).

Generally, when a preparatory control is executed, a driver may feel discomfort because of a drive noise of an actuator and the like or because of a slight deceleration of the vehicle caused by the preparatory control. Furthermore, generally, the preparatory control becomes necessary when an oversteering that generates an abrupt (rapid) yawing behavior occurs. Therefore, the oversteering tendency accompanying an abrupt yawing motion is determined on the basis of the state quantity (the second state quantity), which differs from the state quantity (the first state quantity) used for an execution of a main control, in a case where the steering angular velocity is great and a start of the vehicle stabilizing control (the main control) is expected. Accordingly, a rapid increase of the oversteering tendency is detected at an early stage by using the second state quantity, so that the preparatory control may be promptly executed.

According to a further aspect of the present invention, a motion control device for a vehicle includes an actual yaw rate obtaining means for obtaining an actual yaw rate of the vehicle and a braking means for applying a brake torque to a wheel of the vehicle, so that the motion control device for the vehicle maintains a traveling stability of the vehicle by controlling the brake torque of the wheel via the braking means on the basis of the actual yaw rate. The device further includes a steering angular velocity obtaining means for obtaining a steering angular velocity of the vehicle, a determining means for determining a reference lateral acceleration (a lateral acceleration reference value) on the basis of the steering angular velocity, an actual lateral acceleration obtaining means for obtaining an actual lateral acceleration (an actual value of a lateral acceleration) of the vehicle, and a control means for controlling the braking means in order to apply the brake torque to the wheel. The control means starts applying the brake torque to the wheel by controlling the braking means when the actual lateral acceleration exceeds the reference lateral acceleration. The determining means determines the reference lateral acceleration in a manner where the greater (a degree of) the steering angular velocity is, the smaller value the reference lateral acceleration is determined to be. Alternatively, the determining means determines the reference lateral acceleration in a manner where the smaller (the degree of) the steering angular velocity is, the greater value the reference lateral acceleration is determined to be.

The reference lateral acceleration, which is calculated on the basis of the steering angular velocity, is compared with the actual lateral acceleration of the vehicle, so that a preparatory control is started when the actual lateral acceleration exceeds the reference lateral acceleration. Accordingly, because the steering angular velocity and an actual turning state quantity of the vehicle are taken into consideration in the start of the preparatory control, an execution of an unnecessary preparatory control may be avoided.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

[First Embodiment]

A first embodiment of a motion control device for a vehicle will be described below with reference to the attached drawings. Illustrated in FIG. 1 is an entire configuration example of the motion control device for the vehicle according to the first embodiment.

Figure 1:
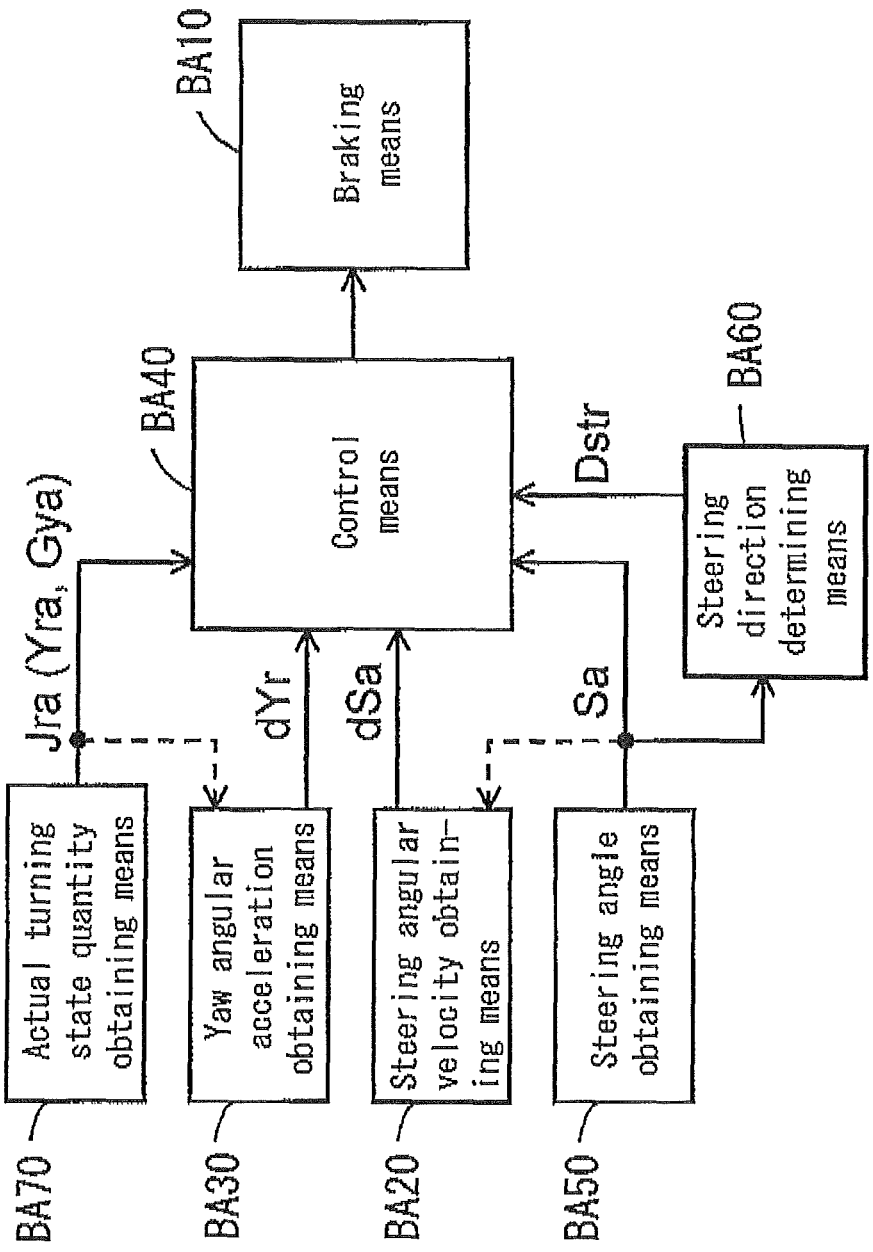
FIG. 1 is a diagram schematically illustrating an entire configuration of a motion control device for a vehicle according to a first embodiment.

As illustrated in FIG. 1, the motion control device for the vehicle (which will be hereinafter referred to as a device) includes a braking means BA10 for applying a brake torque to a wheel of the vehicle, a steering angular velocity obtaining means BA20 for obtaining a steering angular velocity dSa of the vehicle, a yaw angular acceleration obtaining means BA30 for obtaining a yaw angular acceleration dYr and a control means BA40 for controlling the brake torque to be applied to the wheel via the braking means BA10 on the basis of the steering angular velocity dSa and the yaw angular acceleration dYr. More specifically, the control means BA40 controls the braking means BA10 in order to apply the brake torque to the wheel in a case where a degree (a level) of the steering angular velocity dSa is greater than a first predetermined value (i.e. one of threshold values for determining a start of a preparatory control, more specifically, one of predetermined values dsa1, dsa2 and dsa3) and a degree (a level) of the yaw angular acceleration dYr is greater than a second predetermined value (i.e. one of the threshold values for determining the start of the preparatory control, more specifically, one of predetermined values dyr1, dyr2 and dyr3).

Generally, in a case where changes in a yawing behavior of the vehicle are small, necessity of executing the preparatory control is low. Hence, the device is configured so as to execute the preparatory control only when necessary by taking a condition relating to the yaw angular acceleration dYr, which indicates changes in a yawing motion of the vehicle, into consideration, in addition to a condition relating to the steering angular velocity dSa.

The device further includes a steering angle obtaining means BA50 for obtaining a steering angle Sa of the vehicle. The control means BA40 is configured so as to apply the brake torque to the vehicle on the basis of the steering angular velocity dSa obtained in a case where the degree of the steering angle Sa increases and the yaw angular acceleration dYr obtained in the case where the degree of the steering angle Sa increases. Furthermore, the control means BA40 may be configured so as to apply the brake torque to the vehicle on the basis of the steering angular velocity dSa obtained in a case where the degree of the steering angle Se decreases and the yaw angular acceleration dYr obtained in the case where the degree of the steering angle Se decreases. The "yaw angular acceleration obtained in the case where the degree of the steering angle increases (decreases)" indicates that a changing direction of the steering angle (i.e. a sign of the steering angular velocity) coincides with a changing direction of a yaw rate (the yaw angular velocity) (i.e. a sign of the yaw angular velocity). In other words, the "yaw angular acceleration obtained in the case where the degree of the steering angle increases (decreases)" indicates an increase of the yaw rate relative to an increase of the steering angle or a decrease of the yaw rate relative to a decrease of the steering angle. Furthermore, the control means BA40 may be configured so as to control and apply the brake torque to the vehicle when the degree of the steering angle Sa becomes smaller than a third predetermined value (i.e. one of the threshold values for determining the start of the preparatory control, more specifically, a predetermined value sa1) in the case where the degree of the steering angle Sa decreases. Additionally, the steering angular velocity obtaining means BA20 may be configured so as to calculate the steering angular velocity dSa on the basis of the steering angle Se obtained by the steering angle obtaining means BA50.

When the driver steers (rotates) a steering wheel quickly or steers back towards an initial position of the steering wheel quickly, an abrupt yawing behavior is likely to be generated. In the case where the above-mentioned steering performance is operated by the driver, the condition relating to the yaw angular acceleration dYr is also taken into consideration, in addition to the condition relating to the steering angular velocity dSa, so that the preparatory control is surely and appropriately executed.

The device further includes a steering direction determining means BA60 for determining whether a steering direction Dstr of the vehicle corresponds to one direction (i.e. either one of a right direction or a left direction and which will be hereinafter referred to as a first direction) or the other direction (i.e. the direction opposite to the first direction and which is referred to as a second direction) on the basis of the steering angle Sa obtained by the steering angle obtaining means BA50. In this case, the control means BA40 is configured so as to control and apply the brake torque to the vehicle on the basis of the steering angular velocity dSa obtained in the case where the steering direction Dstr of the vehicle is determined to correspond to the first direction ant then, subsequently to the second direction by the steering direction determining means BA60 and in the case where the degree of the steering angle Sa increases, and on the basis of the yaw angular acceleration dYr obtained in the case where the degree of the steering angle Sa increases. In this case, the control means BA40 may be configured so as to control and apply the brake torque to the vehicle in a case where the degree of the steering angle Sa is smaller than a fourth predetermined value (i.e. one of the threshold values for determining the start of the preparatory control, more specifically, a predetermined value sa2).

The abrupt yawing behavior is likely to be generated in a case where the steering wheel is operated in the second direction from the first direction. Even in the case where the above-described steering operation is performed by the driver, the preparatory control is surely and appropriately executed because the condition relating to the yaw angular acceleration dYr is also taken into consideration in addition to the condition relating to the steering angular velocity dSa. Furthermore, because the degree of the steering angle is added to the starting condition (i.e. the condition for starting the preparatory control), the operation of the steering wheel being steered in the first direction and then in the second direction may be surely detected.

The device further includes an actual lateral acceleration obtaining means (i.e. an actual turning state quantity obtaining means BA70) for obtaining an actual lateral acceleration Gya acting on the vehicle. The control means BA40 may set the second predetermined value (i.e. the predetermined values dyr1, dyr2, dyr3) on the basis of the actual lateral acceleration Gya. Furthermore, in this case, the control means BA40 may be configured so as to apply the brake torque to the vehicle in a case where a degree (a level) of the actual lateral acceleration Gya becomes greater than a fifth predetermined value (i.e. one of the threshold values for determining the start of the preparatory control, more specifically, a predetermined value gy1). Additionally, the yaw angular acceleration obtaining means BA30 may be configured so as to calculate the yaw angular acceleration dYr on the basis of an actual turning state quantity Jra (i.e. an actual yaw rate Yra) obtained by the actual turning state quantity obtaining means BA70.

Generally, the abrupt yawing behavior is likely to be generated in a case where the vehicle travels on a road surface having a relatively high friction coefficient. Therefore, a condition using the actual lateral acceleration is added to the determination of the start of the preparatory control (i.e. a starting condition of the preparatory control), so that the preparatory control is surely and appropriately executed. Furthermore, because the starting condition is adjusted by the actual lateral acceleration, the preparatory control appropriate to a road surface condition may be executed.

Figure 2:
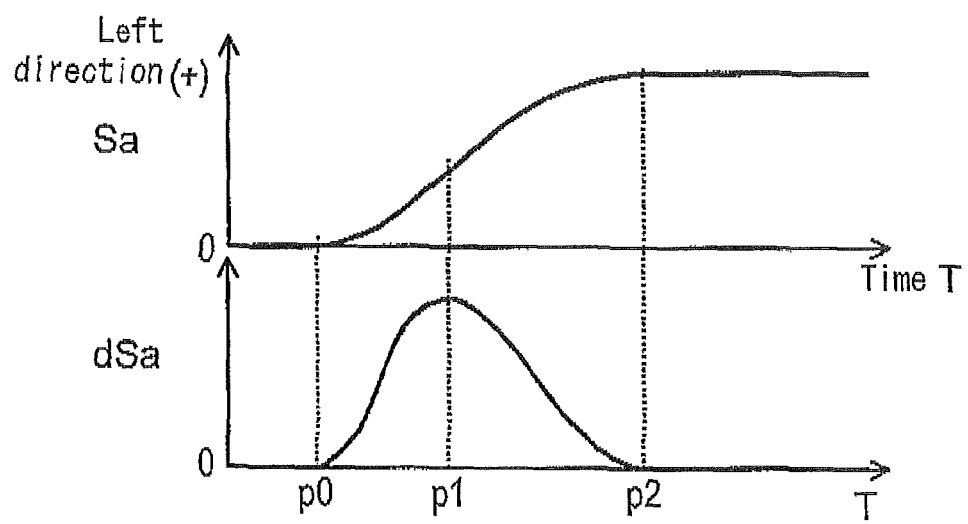
FIG. 2 is a diagram for explaining a J-turn steering operation for abruptly and emergently avoiding an obstacle.

The steering operation in a case where the driver performs an emergent avoidance of an obstacle will be described below with reference to FIGS. 2 and 3. Illustrated in FIG. 2 is a so-called J-turn steering operation, which indicates that the driver abruptly performs the steering wheel operation in the first direction (e.g. in the left steering direction). In this case, the driver starts the steering operation at a time p0 and the steering angle Sa (i.e. a steering wheel angle θsw or a steered wheel steering angle δfa) increases from zero (0) (a neutral position of the steering wheel, the position by which the vehicle is steered to move straight) until time p2. Then, after time p2, the steering angle Sa remains at a constant value. On the other hand, in this case, the steering angular velocity dSa (a time derivative of the steering angle) starts rising from zero (0) at time p0. The steering angular velocity dSa reaches a maximum value at time p1. Then, the degree of the steering angular velocity dSa returns to zero (0) at time p2. The direction of the steering operation includes a right-steering direction and a left-steering direction. Furthermore, a turning direction of the vehicle includes a right-turning direction and a left-turning direction. Generally, the steering directions and the turning directions of the vehicle are indicated by plus and minus signs. For example, the left-steering direction and the left-turning direction are indicated by the plus sign and the right-steering direction and the right-turning direction are indicated by the minus sign. However, when considering the plus and minus signs in order to explain a magnitude relation of values or an increase and a decrease of a value, the explanation may become too complicated. Therefore, in the embodiments, values will be described (explained) on the basis of a magnitude relation of absolute values or an increase and a decrease of an absolute value unless otherwise specified. Additionally, a predetermined value is set as a positive value.

Figure 3:
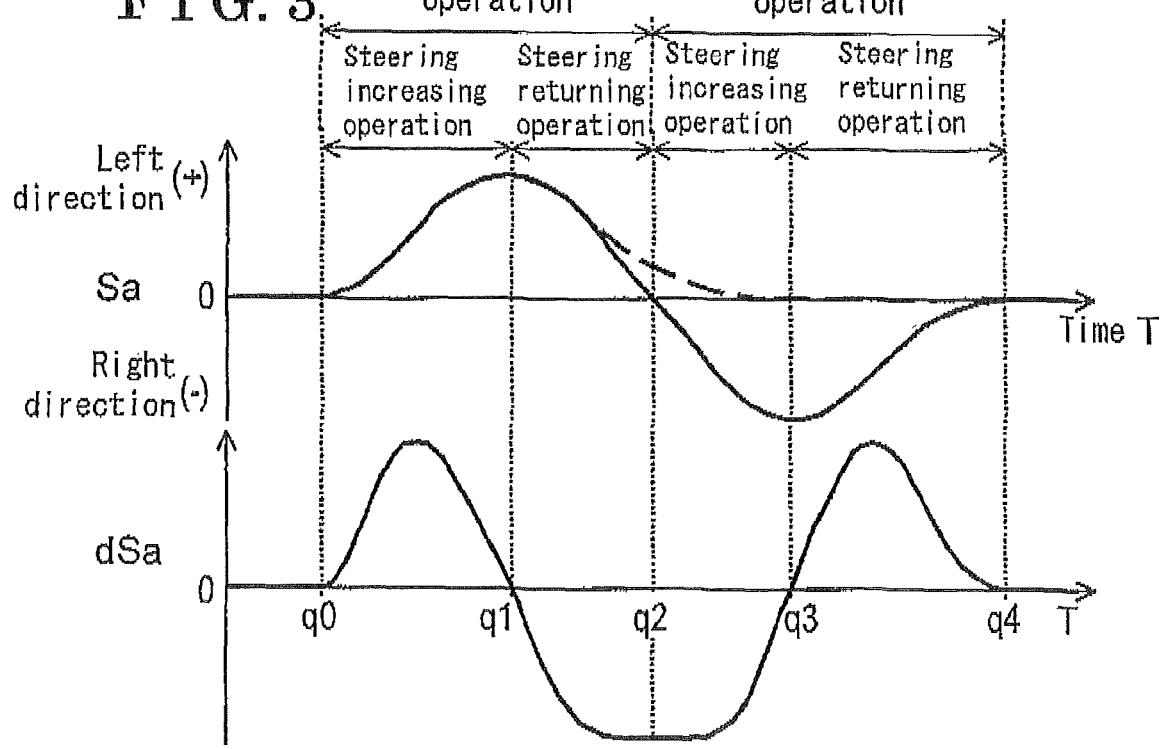
FIG. 3 is a diagram for explaining a lane-change steering operation for abruptly and emergently avoiding the obstacle.

Illustrated in FIG. 3 is a case where a transitional steering operation, which is called as a lane-change steering operation, i.e. a steering wheel operation where the driver rapidly steers the steering wheel in the first direction, (e.g. in the left-steering direction) and then the driver sequentially steers the steering wheel in the second direction opposite from the first direction (e.g. in the right-steering direction), is performed. In this case, it is assumed that the driver starts the steering operation in the first direction (i.e. in one steering direction) at time q0. In this case, the degree of the steering angle Sa increases in the one steering direction from zero (0) (i.e. a neutral position of the steering wheel, the position where the vehicle is steered to travel straight) until time q1. Then, after time q1, the steering wheel is steered back so that the degree of the steering angle Sa decreases towards zero (0). Furthermore, the driver sequentially starts the steering operation in the second direction (i.e. the other direction, the other steering direction) at time q2. In this case, the level of the steering angle Sa increases in the other steering direction (i.e. in the second direction) from zero (0) through time q2 to time q3. After time q3, the steering wheel is steered back so that the degree of the steering angle Sa decreases towards zero (0) and the degree of the steering angle Sa becomes zero (0) again at time q4. In this embodiment, the steering operation to be performed first in one direction (i.e. in the first direction) is referred to as a "first steering operation", and the steering operation to be performed in the other direction (i.e. the second direction) sequentially after the "first steering operation" is referred to as a "second steering operation". The continuous steering operation, in which the first steering operation and the second steering operation are sequentially performed, is referred to as the "transitional steering operation". Additionally, a case where the degree of the steering angle Sa is distant away form zero (0)(i.e. the steering neutral position), in other words, a case where the level (an absolute value) of the steering angle Sa increases, is referred to as a "steering invreasing" state. On the other hand, a case where the degree of the steering angle Sa approximates to zero (0)(i.e. the steering neutral position), in other words, a case where the level (the absolute value) of the steering angle Sa decreases, is referred to as a "steering returning" state. A vehicle stabilizing control is likely to be executed in a case where the degree of the steering angular velocity dSa is great while the "steering returning" operation is performed in the first steering operation or while the "steering increasing" operation is performed in the second steering operation. On the other hand, in a case where the second steering operation is not performed after the first steering operation (i.e. in a case where the transitional steering operation is not performed) as illustrated by a short dashed line in FIG. 3, the vehicle stabilizing control is not likely to be necessary even if the degree of the steering angle velocity dSa is the same as in the transitional steering operation.

Figure 4:
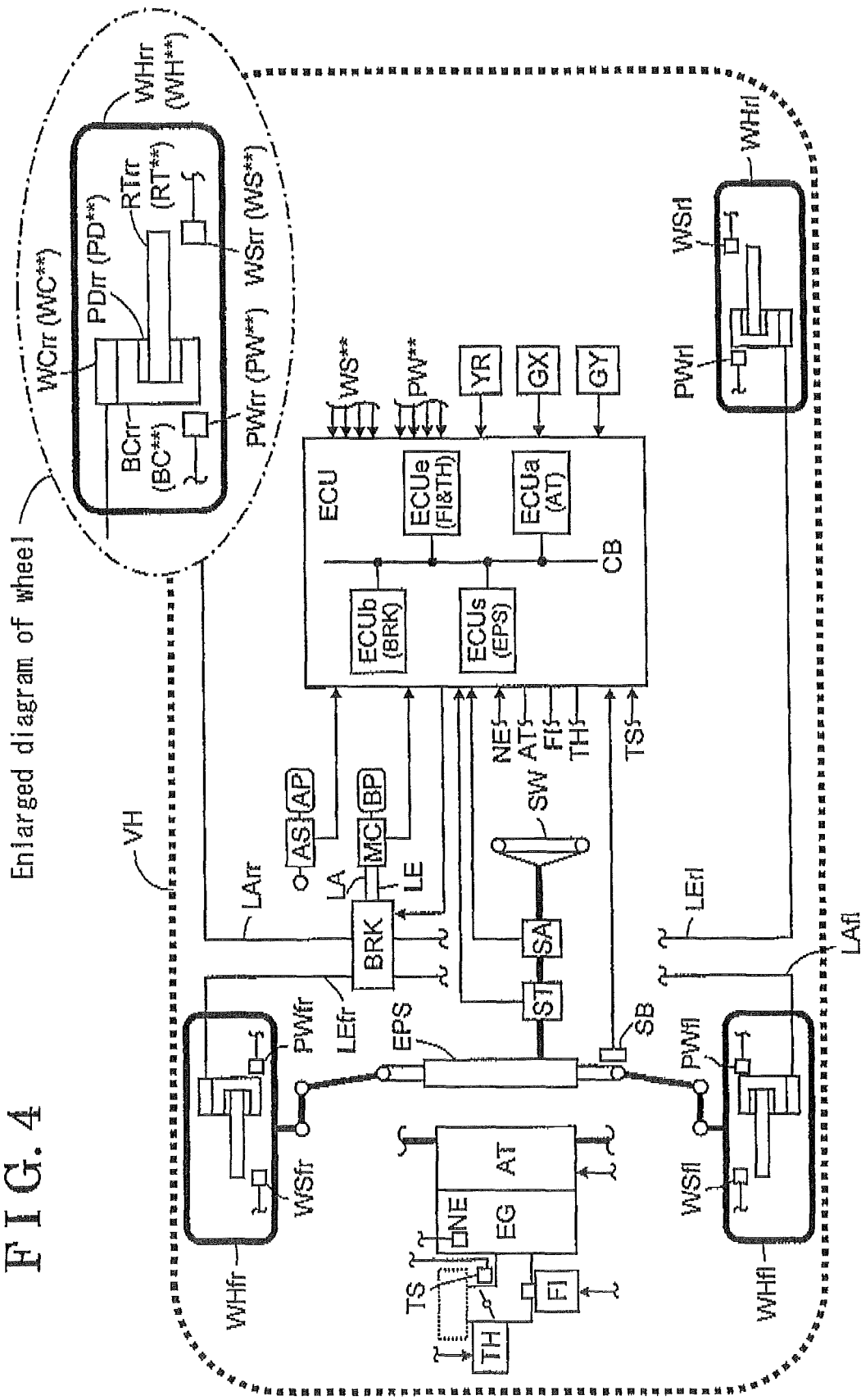
FIG. 4 is a diagram schematically illustrating an entire configuration of the vehicle having the motion control device for the vehicle according to the first embodiment.

Illustrated in FIG. 4 is a diagram of an entire configuration of the vehicle having the motion control device for the vehicle (which will be hereinafter referred to as the device) according to the embodiment. A vehicle having a motion control device according to a second embodiment and a vehicle having a motion control device according to a third embodiment have similar configuration as the vehicle illustrated in FIG. 4. Symbols '**' are used to comprehensively indicate wheels, specifically, 'fl' indicates a front-left wheel, 'fr' indicate a front-right wheel, 'rl' indicates a rear-left wheel, and 'rr' indicates a rear-right wheel.

The device includes a wheel speed sensor WS for detecting a wheel speed Vw of the wheel WH, a steering wheel angle sensor SA for detecting a rotational angle θsw of a steering wheel SW (from a neutral position zero (0) by which the vehicle is steered to travel straight), a front-wheel steering angle sensor SB for detecting the steering angle δfa of the steered wheels (the front wheels), a steering torque sensor ST for detecting a torque Tsw generated when the driver operates the steering wheel SW, a yaw rate sensor YR for detecting an actual yaw rate Yra acting on the vehicle a longitudinal acceleration sensor GX for detecting an acceleration (a deceleration) generated in a front-rear direction (a longitudinal direction) of a vehicle body (i.e. a longitudinal acceleration Gxa), a lateral acceleration sensor GY for detecting a lateral acceleration Gya generated in a lateral direction of the vehicle body, a wheel cylinder pressure sensor PW for detecting a brake hydraulic pressure Pw within a wheel cylinder WC, an engine rotational speed sensor NE for detecting a rotational speed Ne of an engine EG, an acceleration operation sensor AS for detecting an operation quantity As of an acceleration operating member AP (an acceleration pedal), a brake operation sensor BS for detecting an operation quantity Bs of a brake operating member BP (a brake pedal), a shift position sensor Hs for detecting a shift position Hs of a shift operating member SF, and a throttle position sensor Ts for detecting an opening degree Ts of a throttle valve of the engine EG.

The device further includes a brake actuator BRK for controlling the brake hydraulic pressure, a throttle actuator TH for controlling the throttle valve, a fuel injection actuator FI for controlling an injection of a fuel, and an automatic transmission apparatus AT for controlling a gear change.

Furthermore, the device includes an electronic control unit ECU. The electronic control unit ECU is a microcomputer that includes plural and independent electronic control units ECU (ECUb, ECUs, ECUe and ECUa), which are connected to one another via a communication bus CB. The electronic control unit ECU is electrically connected to the above-mentioned each actuator (the brake actuator BRK and the like) and the above-mentioned each sensor (the wheel speed sensor WS** and the like). Each electronic control unit (ECUb and the like) configured within the electronic control unit ECU executes a specific and dedicated control program. A signal (a sensor value) outputted from each sensor and a signal (an internal calculation value), which is obtained by each electronic control unit (ECUb and the like), are commonly used by each of the electronic control units (ECUb, ECUs, ECUe and ECUa) via the communication bus CB.

More specifically, the brake electronic control unit ECUb is configured so as to execute a slip restricting control (i.e. a braking force and driving force control) such as an anti-skid control (ABS control), a traction control (TCS control) and the like on the basis of the signals outputted from the wheel speed sensor WS, the yaw rate sensor YR, the lateral acceleration sensor GY and the like. Furthermore, the brake electronic control unit ECUb is configured so as to calculate a vehicle speed Vx by using a known method on the basis of the wheel speed Vw of each wheel detected by the wheel speed sensor WS**. The steering electronic control unit ECUs is configured so as to execute a known electric power steering control on the basis of the signal outputted from the steering torque sensor ST and the like. The engine electronic control unit ECUe is configured so as to control the throttle actuator TH and the fuel injection actuator FI on the basis of the signal outputted from the acceleration operation sensor AS and the like. The transmission electronic control unit ECUa is configured so as to control a gear ratio of the automatic transmission apparatus AT.

The brake actuator BRK has a known configuration in which plural electromagnetic valves (hydraulic pressure adjusting valves), a hydraulic pump, an electric motor and the like are included. The brake actuator BRK supplies the brake hydraulic pressure in response to an operation of the brake operating member BP by the driver to a wheel cylinder WC of each wheel WH in a case where a brake control is not executed in order to apply a brake torque to each wheel WH in response to the operation of the brake operating member (the brake pedal) BP. Further, the brake actuator BRK is configured to individually adjust the brake hydraulic pressure within the wheel cylinder WC of each wheel WH independently of the operation of the brake pedal BP in order to adjust the brake torque applied to each wheel WH independently of each other in a case where the brake control, such as the anti-skid control (the ABS control), the traction control (the TCS control) or the vehicle stabilizing control (an electronic stability control, an ESC control) for restricting an understeering and an oversteering of the vehicle and the like, is executed.

Each wheel WH includes the known wheel cylinder WC, a known brake caliper BC, a known brake pad PD and a known brake rotor RT, which serve as the braking means. When the brake hydraulic pressure is applied to the wheel cylinder WC provided at the brake caliper BC, the brake pad PD is pressed against the brake rotor RT while generating a friction force therebetween, thereby applying the brake torque to the wheel WH. In this embodiment, the brake torque is controlled by the brake hydraulic pressure. Alternatively, the control of the brake hydraulic pressure may be achieved by using an electric brake apparatus.

Figure 5:
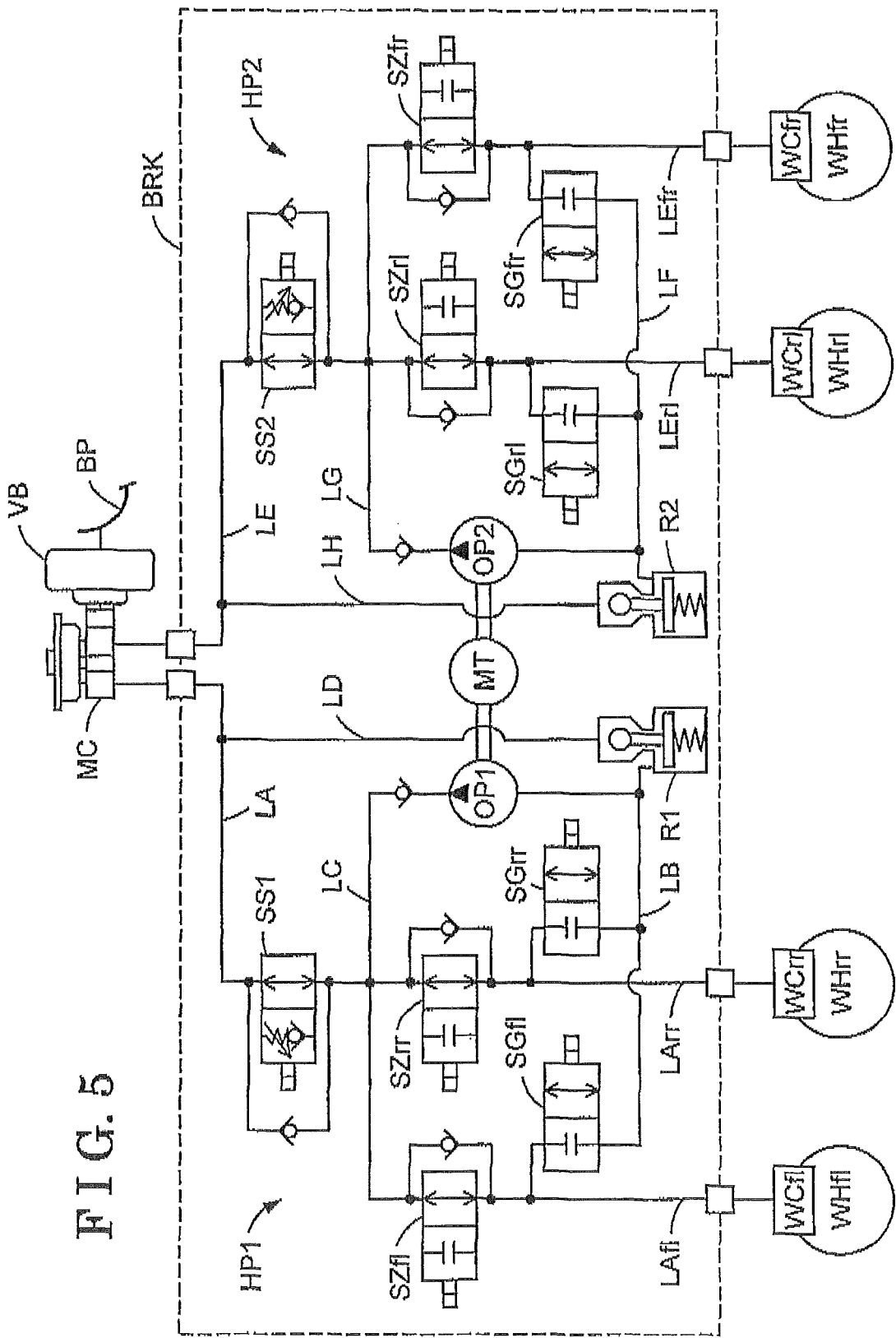
FIG. 5 is diagram schematically illustrating an entire configuration of a brake actuator illustrated in FIG. 4 according to the first embodiment.

Illustrated in FIG. 5 is an entire configuration example of the brake actuator BRK. When the driver depresses the brake operating member BP (e.g. the brake pedal), a depression force generated in response to an operation of the brake operating member BP is boosted by a booster VB, so that a master piston provided at a master cylinder MC is pushed. Accordingly, a same degree (level) of a master cylinder pressure Pmc is generated at a first chamber and a second chamber, which are defined by the master piston within the master cylinder MC. The master cylinder pressure Pmc is applied to the wheel cylinder WC of the corresponding wheel WH via the brake actuator BRK.

The brake actuator BRK includes a first brake circuit HP1 connected to the first chamber of the master cylinder MC and a second brake circuit HP2 connected to the second chamber of the master cylinder MC. The first brake circuit HP1 is used to control the brake hydraulic pressure applied to the front-left wheel WHfl and the rear-right wheel WHrr. On the other hand, the second brake circuit HP2 is used to control the brake hydraulic pressure applied to the front-right wheel WHfr and the rear-left wheel WHrl. The first brake circuit HP1 and the second brake circuit HP2 have a similar configuration. Therefore, in this embodiment, only the first brake circuit HP1 will be described and the description of the second brake circuit HP2 will be omitted. The brake actuator BRK illustrated in FIG. 5 has a diagonal circuit system. However, the brake actuator BRK may be modified to have a front-rear circuit system.

The first brake circuit HP1 includes a conduit LA, through which the brake hydraulic pressures (i.e. hydraulic pressures within the wheel cylinders) Pwfl and Pwrr are generated. A first differential pressure control valve SS1, which is controlled to be in a communication state and a differential pressure generating state, is provided at the conduit LA. For example, in a case where the first differential pressure control valve SS1 is in the communication state, a brake fluid flows through the conduit LA without generating a differential pressure, in other words, a degree (a level) of the hydraulic pressure at the conduit LA at an upstream side relative to the first differential pressure control valve SS1 remains to be at the same degree as the hydraulic pressure at the conduit LA at a downstream side relative to the first differential pressure control valve SS1. On the other hand, in a case where the first differential pressure control valve SS1 is in the differential pressure generating state, a pressure difference is generated between the hydraulic pressure within the conduit LA at the upstream side relative to the first differential pressure control valve SS1 and the hydraulic pressure at the conduit LA at the downstream side relative to the first differential pressure control valve SS1. The master cylinder pressure Pmc is transmitted to the wheel cylinders WCfl and WCrr, which are provided at the front-left wheel WHfl and the rear-right wheel WHrr, respectively. A valve position of the first differential pressure control valve SS1 is controlled to be at an opened state, so that the communication state is established at the first differential control valve SS1 in a case where the driver performs a normal operation of the brake pedal BP (i.e. in the case where the brake control is not executed). When electricity is supplied to the first differential pressure control valve SS1, the valve position of the first differential pressure control valve SS1 is controlled to be in a closed state, so that the differential pressure generating state is established at the first differential pressure control valve SS1.

The conduit LA is split into a first conduit LAfl and a second conduit LArr at the downstream side closer to the wheel cylinders WCfl and WCrr, respectively, relative to the first differential pressure control valve SS1. A first pressure increase control valve SZfl for controlling a pressure increase of the brake hydraulic pressure supplied to the wheel cylinder WCfl is provided at the first conduit LAfl. A second pressure increase control valve SZrr for controlling a pressure increase of the brake hydraulic pressure supplied to the wheel cylinder WCrr is provided at the second conduit LArr. A two position electromagnetic valve, which is controlled to be in a communication establishing state (i.e. a state where the brake fluid is allowed to flow through the two position electromagnetic valve) and a communication interrupting state (i.e. a state where the flow of the brake fluid is interrupted), is adapted to each of the first and second pressure increase control valves SZfl and SZrr. In a case where an electric current supplied to each of the first and second pressure increase control valves SZfl and SZrr is zero (0), in other words, in a case where the electricity is not supplied to each of the first and second pressure increase control valves SZfl and SZrr, the communication establishing state is established (i.e. each of the first and second pressure increase control valves SZfl and SZrr is controlled to be in an opened state). On the other hand, in a case where the electric current is supplied to each of the first and second pressure increase control valves SZfl and SZrr, in other words, in a case where each of the first and second pressure increase control valves SZfl and SZrr is energized, the communication interrupting state is established (i.e. each of the first and second pressure increase control valves SZfl and SZrr is controlled to be in an closed state). Each of the first and second pressure increase control valves SZfl and SZrr is configured as a so-called normally-opened type valve.

A conduit LB is a conduit used for decreasing the brake hydraulic pressure. Furthermore, the conduit LB connects a regulating reservoir R1 on the one hand and a portion of the first conduit LAfl extending between the first pressure increase control valve SZfl and the wheel cylinder WCfl and a portion of the second conduit LArr extending between the second pressure increase control valve SZrr and the wheel cylinder WCrr on the other. A first pressure decrease control valve SGfl and a second pressure decrease control valve SGrr, each of which is configured as a two position electromagnetic valve and each of which is controlled to be in a communication establishing state (i.e. a state where the brake fluid is allowed to flow through the two position electromagnetic valve) and a communication interrupting state (i.e. a state where the flow of the brake fluid is interrupted), are provided at the conduit LB, Each of the first and second pressure decrease control valves SGfl and SGrr is turned to be in a closed state when the electricity is not supplied thereto. On the other hand, in a case where the electricity is supplied to each of the first and second pressure decrease control valves SGfl and SGrr, each of the first and second pressure decrease control valves SGfl and SGrr is turned to be in an opened state. Furthermore, each of the first and second pressure decrease control valves SGfl and SGrr is configured as a so-called normally-closed type valve.

A conduit LC is provided between the regulating reservoir R1 and the conduit LA. A hydraulic pump OP1 is provided at the conduit LC. The brake fluid is sucked by the hydraulic pump OP1 via the regulating reservoir R1. Then, the hydraulic pump OP1 discharges the brake fluid to the master cylinder MC or to the wheel cylinders WCfl and WCrr. Furthermore, the hydraulic pump OP1 is driven by an electric motor MT. A conduit LD is provided between the regulating reservoir R1 and the master cylinder MC. In a case where an automatic pressure generation (i.e. an automatic supply of the brake hydraulic pressure) is executed while, for example, the vehicle stabilizing control, the traction control and the like is being executed, the brake fluid is sucked from the master cylinder MC through the conduit LD to the hydraulic pump OP1 by means of the hydraulic pump OP1, and then, the hydraulic pump OP1 discharges the brake fluid to the first and second conduits LAfl and LArr. Accordingly, the brake fluid is supplied to the wheel cylinders WCfl and WCrr, so that the brake hydraulic pressure generated at wheel cylinder WC** of the target wheel is increased in order to apply the brake torque thereto.

When the preparatory control is executed, the electric motor MT is actuated so that the brake fluid is sucked from the master cylinder MC by means of the hydraulic pump OP1 and then, the brake fluid is discharged to the wheel cylinder WC. Accordingly, a clearance (which is also called as a pad clearance) formed between the brake pad PD and the brake rotor RT** is closed, and further, a preparatory (auxiliary)

brake hydraulic pressure (which is also called as a preparatory pressure) is generated at the wheel cylinder WC**.

Figure 6:
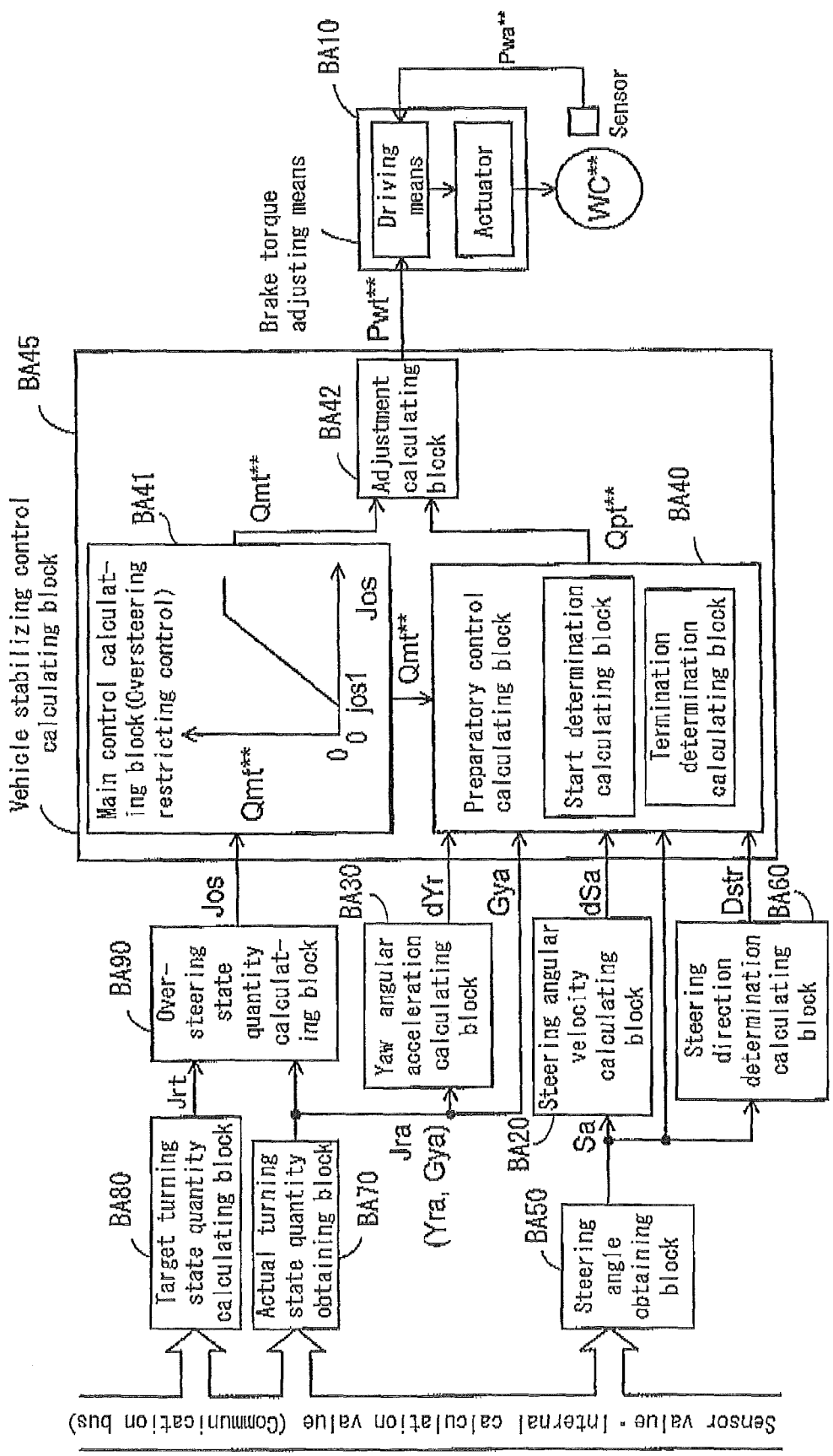
FIG. 6 is a functional block diagram illustrating a processing example of a motion control for the vehicle (a vehicle stabilizing control) according to the first embodiment.

Illustrated in FIG. 6 is a functional block diagram of a processing example of a motion control for the vehicle (i.e. the vehicle stabilizing control) according to the first embodiment. The vehicle stabilizing control includes a main control and the preparatory control. The main control is a control for restricting an understeering tendency and/or an oversteering tendency of the vehicle. On the other hand, the preparatory control is a control for assisting the main control. More specifically, the preparatory control is executed before the main control is executed in order to compensate responsiveness of the vehicle stabilizing control. Additionally, functional blocks having the identical reference numerals as means in FIG. 1 have similar functions as functions of the corresponding means.

In a target turning state quantity calculating block BA80, a turning state quantity Jrt of the vehicle to be targeted (i.e. a target turning state quantity Jrt) is calculated by using a known method. The turning state quantity is a property that indicates a turning state of the vehicle. More specifically, the turning state quantity is a value calculated by using at least one of the yaw rate, a sideslip angle of the vehicle body (which is also called simply as a sideslip angle) and a vehicle body sideslip angular velocity (which is also called simply as a sideslip angular velocity). For example, a target yaw rate Yrt is calculated on the basis of the vehicle speed Vx and the steering wheel angle θsw (or the front wheel steering angle δfa) as the target turning state quantity Jrt.

In an actual turning state quantity obtaining block BA70, the actual turning state quantity Jra corresponding to the target turning state quantity Jrt is obtained on the basis of the sensor value(s) and/or the internal calculation value(s) of other electronic control unit(s), which are obtained via the communication bus CB. For example, in a case where the target yaw rate is used as the target turning state quantity Jrt, the actual yaw rate Yra, which is detected by the yaw rate sensor YR as the actual turning state quantity Jra and which acts on the vehicle, is obtained. Furthermore, a state quantity (e.g. an actual sideslip angle βa) corresponding to the target turning state quantity Jrt may be calculated on the basis of the actual turning state quantity Jra.

In an oversteering state quantity calculating block BA90, an oversteering state quantity Jos, which indicates a degree (a level) of the oversteering of the vehicle, is calculated on the basis of the target turning state quantity Jrt and the actual turning state quantity Jra. More specifically, the oversteering state quantity Jos is calculated by comparing the actual turning state quantity Jra with the target turning state quantity Jrt. For example, a deviation (a difference) ΔYr between the actual yaw rate Yra and the target yaw rate Yrt (i.e. ΔYr=Yra−Yrt, a yaw rate deviation) is obtained as the oversteering state quantity Jos. Alternatively, the oversteering state quantity Jos may be calculated in view of an interaction of plural state quantities instead of calculating the oversteering state quantity Jos as a single state quantity. For example, the oversteering state quantity Jos may be calculated on the basis of an interaction of a deviation (a difference) Δβ between the actual sideslip angle βa and a target sideslip angle βt (i.e. Δβ=βa−βt, a sideslip angle deviation) and the yaw rate deviation ΔYr (i.e. Jos=K1*Δβ+K2*ΔYr, where K1 and K2 are coefficients).

In the case where the (vehicle body) sideslip angle or the (vehicle body) sideslip angular velocity is used as the turning state quantity, a target value of the sideslip angle or a target value of the sideslip angular velocity may be set as a constant value (e.g. the target value may be set as zero (0)). Therefore, in this case, the target turning state quantity Jrt (the target turning state quantity calculating block BA80) may be omitted in the calculation of the oversteering state quantity Jos. The oversteering state quantity Jos is inputted into a vehicle stabilizing control calculating block BA45.

In a yaw angular acceleration calculating block BA30, the actual yaw rate Yra, which is obtained at the actual turning state quantity obtaining block BA70, is differentiated by time in order to obtain the yaw angular acceleration dYr. Alternatively, the yaw angular acceleration dYr may be directly obtained from a sensor and/or other electronic control unit via the communication bus CB. The yaw angular acceleration dYr is inputted into the vehicle stabilizing control calculating block BA45. Additionally, the actual lateral acceleration Gya, which is obtained by the actual turning state quantity obtaining block BA70, is inputted into the vehicle stabilizing control calculating block BA45.

In a steering angle obtaining block BA50, the steering angle Sa is obtained on the basis of the sensor signal and/or the internal calculation value of other electronic control unit, which are obtained via the communication bus CB. More specifically, the steering angle Sa is determined on the basis of at least one of the steering wheel angle θsw and the steering angle δfa of the steered wheel (the front wheels). In the steering angular velocity calculating block BA20, the steering angle Sa is differentiated by time in order to obtain the steering angular velocity dSa. More specifically, the steering angular velocity dSa is determined on the basis of at least one of the steering wheel angular velocity dθsw and a steered wheel steering angular velocity dδfa. Alternatively, the steering angular velocity dSa may be directly obtained from the sensor(s) and/or other electronic control unit(s) via the communication bus CB. In a steering direction determination calculating block BA60, the steering direction Dstr is calculated on the basis of the steering angle Sa. More specifically, either one of a straight-moving direction, the left-steering direction and the right-steering direction is determined as the steering direction Dstr. The steering angle Sa, the steering angular velocity dSa and the steering direction Dstr are inputted into the vehicle stabilizing control calculating block BA45.

In the vehicle stabilizing control calculating block BA45, a target value Pwt of the brake torque to be applied to the wheel WH in order to maintain a stability (a traveling stability) of the vehicle is calculated on the basis of the above-mentioned state quantities (the oversteering state quantity Jos and the like). The vehicle stability control calculating block BA45 includes a main control calculating block BA41, the preparatory control calculating block BA40 and an adjustment calculating block BA42. In the main control calculating block BA41, a target value Qmt of the brake torque of the wheel WH (which will be hereinafter referred to as a main control target value Qmt) to be used as a basis of stabilizing the vehicle (specifically, a basis of preventing the oversteering tendency of the vehicle) is calculated on the basis of the oversteering state quantity Jos. In the preparatory control calculating block BA40, a preparatory target value Qpt of the brake torque (which will be hereinafter referred to as a preparatory control target value Qpt) for compensating the responsiveness of the brake actuator BRK is calculated. In the adjustment calculating block BA42, the main control target value Qmt and the preparatory control target value Qpt are adjusted in order to obtain a final target value Pwt of the brake torque (which will be hereinafter referred to as a final target value Pwt**). Additionally, the vehicle speed Vx and the brake operation quantity Bs are inputted to the vehicle stabilizing control calculating block BA45.

In the main control calculating block BA41, the main control target value Qmt, which is used as the basis for the vehicle stabilizing control (the oversteering preventing control), is calculated on the basis of the oversteering state quantity Jos by using a preliminarily set calculation map. The calculation map specifies a characteristic of the main control target value Qmt to be set to zero (0) in a case where the oversteering state quantity Jos is smaller than a predetermined value Jos1 (a threshold value) and to increase from zero (0) in response to an increase of the oversteering state quantity Jos in a case where the oversteering state quantity Jos is equal to or greater than the predetermined value Jos1. The predetermined value jos1 is used as a starting condition of the main control of the vehicle stabilizing control (i.e. a condition of starting a supply of the brake torque). The main control target value Qmt** is also inputted into the preparatory control calculating block BA40.

In the preparatory control calculating block BA40, the preparatory control target value Qpt** is calculated in order to compensate the responsiveness of the brake actuator BRK by advancing the supply of the brake torque executed by the main control. Furthermore, the preparatory control calculating block BA40 includes a start determination calculating block and a termination determination calculating block. The preparatory control will be described in more detail later.

In the adjustment calculating block BA42, the final target value Pwt is calculated on the basis of the main control target value Qmt and the preparatory control target value Qpt. More specifically, either the main target value Qmt or the preparatory control target value Qpt having a greater value is selected in order to obtain the final target value Pwt. Alternatively, the final target value Pwt may be calculated by adding the preparatory control target value Qpt to the main control target value Qmt. Each of the main control target value Qmt, the preparatory control target value Qpt and the final target value Pwt is calculated as a value of either one of a wheel braking force, the brake torque, the brake hydraulic pressure, a longitudinal slip, the wheel speed and a thrust force of the brake pad PD**.

In a brake torque adjusting means BA10, which serves as a braking means, a driving means of the brake actuator BRK (e.g. the electric motor used for driving the hydraulic pump, a driving means of a solenoid valve or the like) is controlled on the basis of the final target value Pwt of the brake torque. In this embodiment, a sensor (e.g. the pressure sensor PW) for detecting an actual value Pwa of the brake torque corresponding to the target value Pwt is provided at the wheel WH*. Accordingly, the driving means of the brake actuator BRK may be controlled so that the actual value Pwa corresponds to the target value Pwt on the basis of the target value Pwt and the actual value Pwa**.

Figure 7:
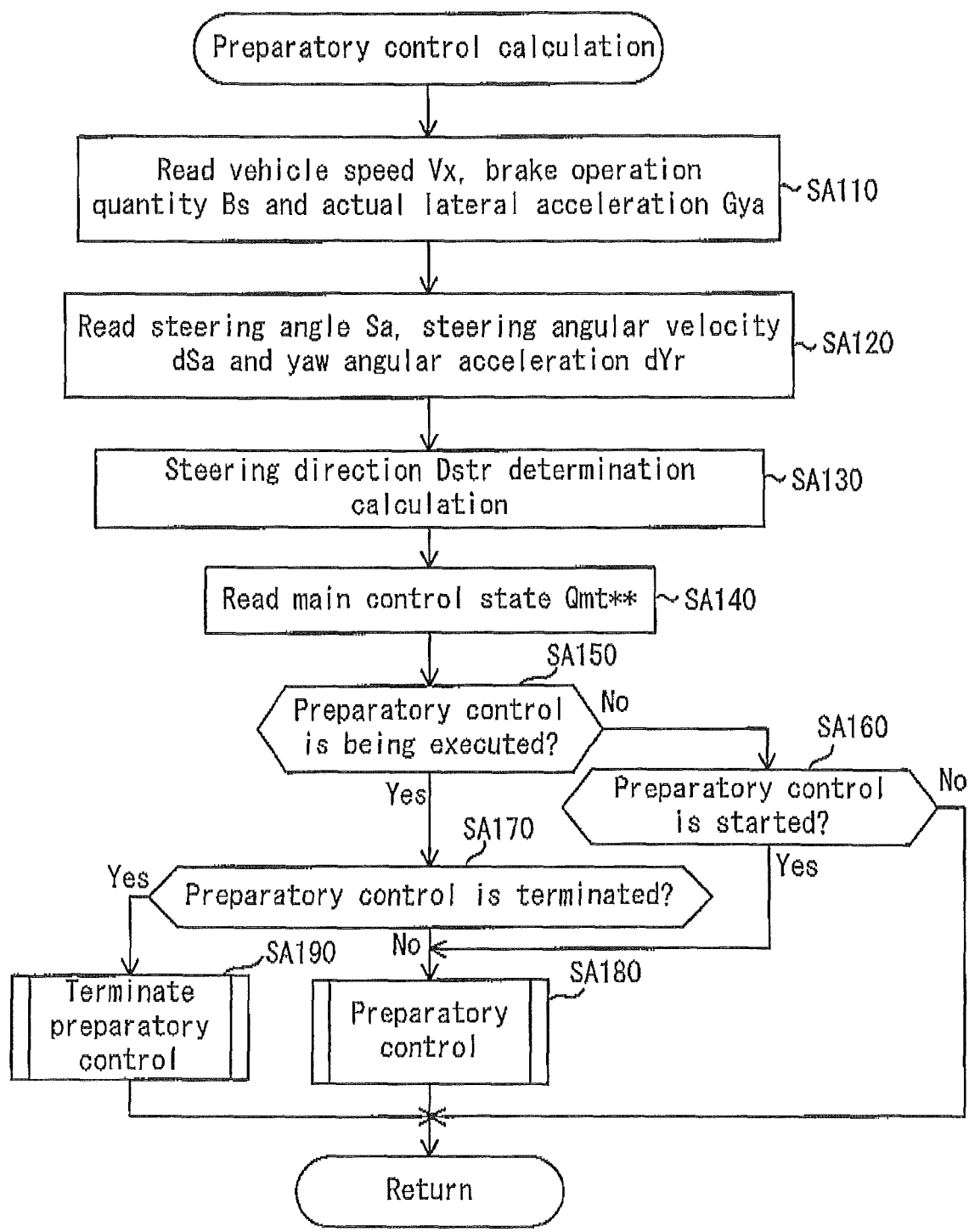
FIG. 7 is a control flowchart illustrating a processing example of a preparatory control calculation illustrated in FIG. 6 according to the first embodiment.

The preparatory control calculating block BA40 illustrated in FIG. 6 will be described below with reference to FIG. 7.

Firstly, the preparatory control calculating block BA40 reads the vehicle speed Vx, the brake operation quantity Bs and the (actual) lateral acceleration Gya in step SA110. Then, in step SA120, the preparatory control calculating block BA40 reads the steering angle Sa (the steering wheel operating angle θsw or the front wheel steering angle δfa), the steering angular velocity dSa (the steering wheel operation angular velocity dθsw or the front wheel steering angular velocity dδfa) and the yaw angular acceleration dYr. In step SA130, the steering direction Dstr is calculated on the basis of the steering angle Sa. For example, the steering direction is determined on the basis of the sign of the steering angle Sa. More specifically, in a case where the sign of the steering angle Se is plus (+), the steering angle direction Dstr is determined as the left-steering direction (which corresponds to a left-turn of the vehicle). On the other hand, in a case where the sign of the steering angle Sa is minus (−), the steering angle direction Dstr is determined as the right-steering direction (which corresponds to a right-turn of the vehicle). Furthermore, in step SA140, the preparatory control calculating block BA40 reads the control state Qmt** of the main control. More specifically, in step SA140, information indicating whether the main control is started or not, information indicating what degree (level) of the brake torque is applied to which wheel in the case where the main control is executed, and the like are inputted.

Then, a start of the preparatory control and/or a termination of the preparatory control is determined through steps SA150, SA160 and SA170. More specifically, it is determined whether or not the preparatory control is currently being executed in step SA150. In a case where the preparatory control is not executed and a negative determination is concluded in step SA 150 (i.e. No in SA 150), the calculation process proceeds to step SA160. In step SA160, it is determined whether or not a starting condition of the preparatory control is satisfied. The starting condition of the preparatory control will be described in detail later. In a case where the start of the preparatory control is determined in step SA160 (i.e. Yes in SA160), the calculation process proceeds to step SA180 and the preparatory control is started. In the preparatory control, a preliminary set, predetermined value is outputted to the adjustment calculating block BA42 as the preparatory control target value Qpt**. When the preparatory control is executed, for example, the pad clearance is closed, thereby generating the preparatory brake torque. Accordingly, the responsiveness of the brake actuator BRK is compensated. On the other hand, in a case where the start of the preparatory control is denied in step SA160 (i.e. No in SA160), the preparatory control is not executed.

In a case where the preparatory control is being executed and a positive determination is concluded in step SA150 (i.e. Yes in SA 150), the calculation process proceeds to step SA170. In step SA170, it is determined whether or not a termination condition of the preparatory control is satisfied. The termination condition of the preparatory control will be described in detail later. In a case where a termination of the preparatory control is determined in step SA170 (i.e. Yes in SA170), the preparatory control is terminated in step SA190 and the preparatory control target value Qpt** is set back to zero (0). On the other hand, in a case where the termination of the preparatory control is denied in step SA170 (i.e. No in SA170), the calculation process proceeds to step SA180 and the preparatory control is continued.

Figure 8:
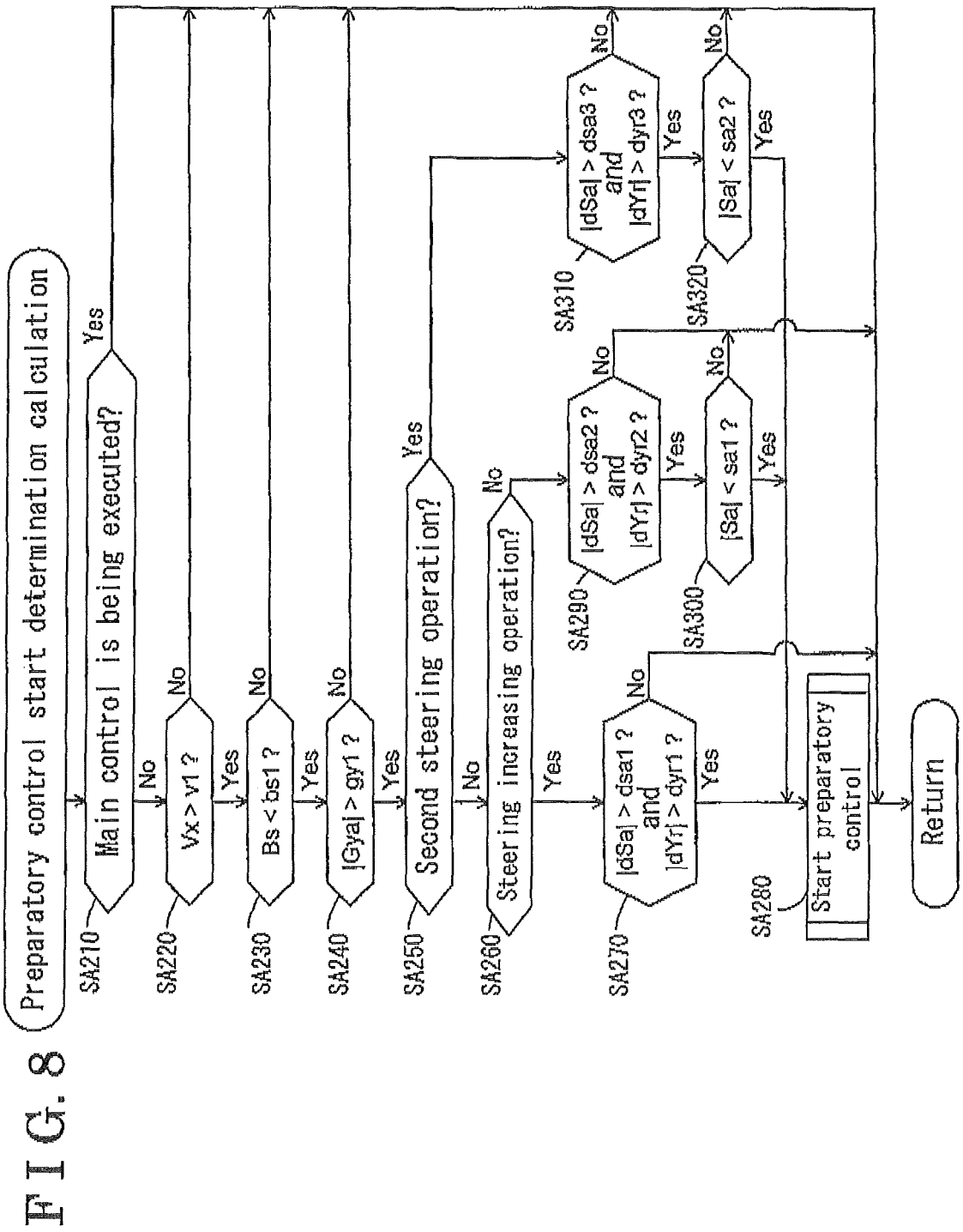
FIG. 8 is a control flowchart illustrating a processing example of a preparatory control start determination illustrated in FIG. 7 according to the first embodiment.

The preparatory control start determining step SA160 illustrated in FIG. 7 (which corresponds to the start determination calculating block of the preparatory control calculating block BA40 in FIG. 6) will be described below with reference to FIG. 8. The start determination of the preparatory control is executed for each wheel. Additionally, as mentioned above, when explaining the magnitude relation of values or when explaining the increase and decrease of the value in view of the steering directions and the turning direction, which are indicated by the plus and minus signs, the explanation may become too complicated. Therefore, values will be described (explained) on the basis of the magnitude relation of the absolute values or the increase and the decrease of the absolute value unless otherwise specified. Additionally, the predetermined value is set as a value with the plus sign (+). Furthermore, the symbols '**' are used to comprehensively indicate wheels, specifically, indicates the front-left wheel, 'fr' indicate the front-right wheel, 'rl' indicates the rear-left wheel, and 'rr' indicates the rear-right wheel.

In step SA210, it is determined whether or not the main control is being executed. The determination in step SA210 is executed on the basis of the main control target value Qmt** of the vehicle stabilizing control. In a case where the main control has already been executed to a determination-target wheel (i.e. in a case where a positive determination is concluded in step SA210 (Yes in SA210)), the preparatory control does not need to be executed. Therefore, in this case, the preparatory control is not executed. On the other hand, in a case where a negative determination is concluded in step SA210 (i.e. No in SA210, in a case where the main control is not executed), the calculation process proceeds to step SA220.

In step SA220, it is determined whether or not the vehicle speed Vx is greater than a predetermined value v1. In a case where the vehicle speed Vx is equal to or smaller than the predetermined value v1 and a negative determination is concluded in step SA220 (No in SA220), the preparatory control is not started. Generally, in a case where the vehicle speed Vx is low, the abrupt yawing behavior is not likely to occur. Therefore, a necessity of compensating the responsiveness of the brake actuator BRK is low. On the other hand, in a case where the vehicle speed Vx is greater than the predetermined value v1 and a positive determination is concluded in step SA220 (i.e. Yes in SA220), the calculation process proceeds to step SA230.

In step SA230, it is determined whether or not the driver performs the brake operation. The determination in step SA230 is executed on the basis of a comparison result between the brake operation quantity Bs and a predetermined value bs1. In a case where the brake operation quantity Bs is equal to or greater than the predetermined value bs1 and the driver operates the brake operating member BP, a negative determination is concluded in step SA230 (i.e. No in SA230) and the preparatory control is not started because the brake torque has already been generated at the wheel while the driver performs the brake operation, therefore, the preparatory control is not necessary. On the other hand, in a case where the brake operation quantity Bs is smaller than the predetermined value bs1 (i.e. Bs<bs1) and a positive determination is concluded in step SA230 (i.e. Yes in SA230), the calculation process proceeds to step SA240.

In step SA240, it is determined whether or not the degree (an absolute value) of the actual lateral acceleration Gya is greater than a predetermined value gy1. In a case where the actual lateral acceleration Gya is equal to or smaller than the predetermined value gy1 and a negative determination is concluded in step SA240 (i.e. No in SA240), the preparatory control is not started because, generally, the abrupt yawing behavior is less likely to occur in the case where the actual lateral acceleration is low, therefore, the necessity of compensating the responsiveness of the brake actuator BRK is low. On the other hand, in a case where the degree (the absolute value) of the actual lateral acceleration Gya is greater than the predetermined value gy1 and a positive determination is concluded in step SA240 (i.e. Yes in SA240), the calculation process proceeds to step SA250.

In step SA250, it is determined whether or not a current steering operation corresponds to the "second steering operation". The "second steering operation" is the steering operation to be performed in the second direction sequentially and immediately after the steering wheel SW is operated in the first direction opposite to the second direction. The determination of the "second steering operation" is executed on the basis of the steering direction Dstr. In a case where the steering operation is determined as the "second steering operation" and a positive determination is concluded in step SA250 (i.e. Yes in SA250), the calculation process proceeds to step SA310. On the other hand, in a case where a negative determination is concluded in step SA250 (i.e. No in SA250), the calculation process proceeds to step SA260.

In step SA260, it is determined whether or not the current steering operation is the "steering increasing" operation. The "steering increasing" operation is an operation in which the steering wheel SW (a steering apparatus) is steered (rotated) in a direction away from the neutral position thereof. The determination in step SA260 is executed on the basis of the steering angle Sa. Generally, when the current steering operation is the "steering increasing" operation, a degree (an absolute value) of the steering angle Sa increases. In a case where the steering operation is the "steering returning" operation (i.e. an operation in which the steering apparatus is steered (rotated) towards the neutral position, the operation in which the degree (the absolute value) of the steering angle Sa decreases) and a negative determination is concluded in step SA260 (i.e. No in SA260), the calculation process proceeds to step SA290. On the other hand, in a case where the steering operation is the "steering operation" and a positive determination is concluded in step SA260 (i.e. Yes in SA260), the calculation process proceeds to step SA270.

In step SA270, it is determined whether or not the degree (an absolute value) of the steering angular velocity dSa is greater than the predetermined value dsa1 and whether or not the degree (an absolute value) of the yaw angular acceleration dYr is greater than the predetermined value dyr1. In a ease where the steering angular velocity dSa is equal to or smaller than the predetermined value dsa1 or the yaw angular acceleration dYr is equal to or smaller than the predetermined value dyr1 and where a negative determination is concluded in step SA270 (i.e. No in SA270), the preparatory control is not started. On the other hand, in a case where a positive determination is concluded in step SA270 (i.e. Yes in SA270), the calculation process proceeds to step SA280 and the preparatory control is started. In step SA280, in this case, a preliminarily set predetermined value pre1 is outputted to the adjustment calculating block BA42 as the preparatory control target value Qpt**.

In a case where the steering operation performed by the driver is the steering returning operation in the first steering operation (i.e. in a case where the degree of the steering angle Sa is determined to decrease on the basis of the steering angle Sa), the calculation process proceeds to step SA290 from step SA260. In step SA290, it is determined whether or not the degree (the absolute value) of the steering angular velocity dSa is greater than the predetermined value dsa2 and whether or not the degree (the absolute value) of the yaw angular acceleration dYr is greater than the predetermined value dyr2. In a case where the steering angular velocity dSa is equal to or smaller than the predetermined value dsa2 or the yaw angular acceleration dYr is equal to or smaller than the predetermined value dyr2 and where a negative determination is concluded in step SA290 (i.e. No in SA290), the preparatory control is not started. On the other hand, in a case where a positive determination is concluded in step SA290 (i.e. Yes in SA290), the calculation process proceeds to step SA300.

In step SA300, it is determined whether or not the degree (the absolute value) of the steering angle Sa is smaller than the predetermined value sa1. In a case where the steering angle Sa is equal to or greater than the predetermined value sa1 and a negative determination is concluded in step SA300 (i.e. No in SA300), the preparatory control is not started. On the other hand, in a case where a positive determination is concluded in step SA300 (i.e. Yes in SA300), the calculation process proceeds to step SA280 and the preparatory control is started. In step SA280, in this case, a preliminarily set predetermined value pre2 is outputted to the adjustment calculating block BA42 as the preparatory control target value Qpt**.

In the case where the steering operation is determined as the second steering operation (i.e. in the case where the steering direction is determined to sequentially shift from the first direction to the second direction on the basis of the steering direction Dstr), the calculation process proceeds to step SA310 from step SA250. In step SA310, it is determined whether or not the degree (the absolute value) of the steering angular velocity dSa is greater than the predetermined value dsa3 and whether or not the degree (the absolute value) of the yaw angular acceleration dYr is greater than the predetermined value dyr3. In a case where the steering angular velocity dSa is equal to or smaller than the predetermined value dsa3 or the yaw angular acceleration dYr is equal to or smaller than the predetermined value dyr3 and where a negative determination is concluded in step SA310 (i.e. No in SA310), the preparatory control is not started. On the other hand, in a case where a positive determination is concluded in step SA310 (i.e. Yes in SA310), the calculation process proceeds to step SA320, In step SA320, it is determined whether or not the degree (the absolute value) of the steering angle Sa is smaller than the predetermined value sa2. In a case where the steering angle Sa is equal to or greater than the predetermined value sa2 and a negative determination is concluded in step SA320 (i.e. No in SA320), the preparatory control is not started. On the other hand, in a case where a positive determination is concluded in step SA320 (i.e. Yes in SA320), the calculation process proceeds to step SA280 and the preparatory control is started. In step SA280, in this case, a preliminarily set predetermined value pre3 is outputted to the adjustment calculating block SA42 as the preparatory control target value Qpt**

The above-mentioned predetermined values (the positive values) v1, bs1, gy1, dsa1, dsa2, dsa3, dyr1, dyr2, dyr3, sa1 and sa2 are threshold values used for determining the start of the preparatory control (i.e. preparatory control start determining threshold values). The predetermined values sa1, dsa1 and dsa3 correspond to the first predetermined value. The predetermined values dyr1, dyr2 and dyr3 correspond to the second predetermined value. The predetermined value sa1 corresponds to the third predetermined value. The predetermined value sa2 corresponds to the fourth predetermined value. Furthermore, the predetermined value gy1 corresponds to the fifth predetermined value. The device does not need to include all of the above-described functional blocks. For example, one ore more of the functional block maybe removed (omitted) from the device.

Figure 9:
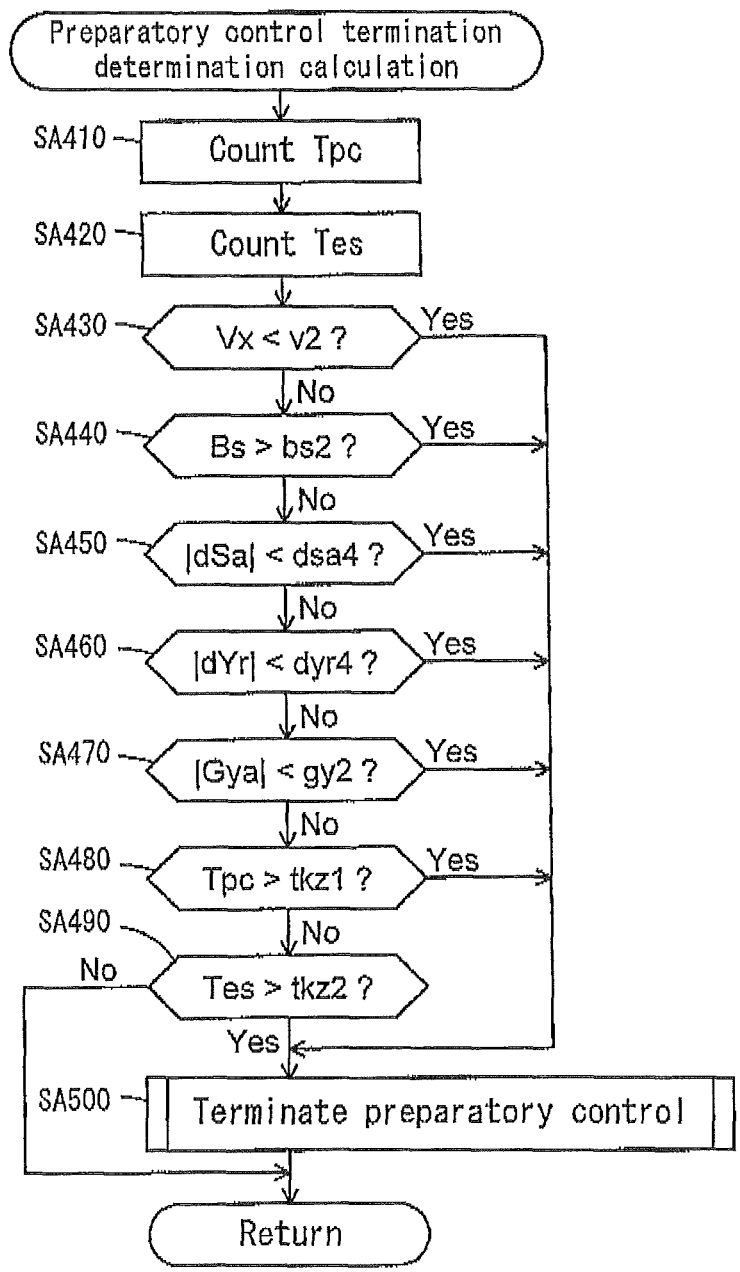
FIG. 9 is a control flowchart illustrating a processing example of a preparatory control termination determination illustrated in FIG. 7 according to the first embodiment.

The preparatory control termination determining step SA170 illustrated in FIG. 7, which corresponds to the termination determination calculating block of the preparatory control calculating block BA40 in FIG. 6, will be described in detail with reference to FIG. 9. The termination determination of the preparatory control is executed for each wheel WH**.

In step SA410, a time during which the preparatory control is started and continued (i.e. a duration time Tpc) is counted. Furthermore, in step SA420, a time during which the main control is continued (i.e. a duration time Tes) is counted on the basis of the main control state Qmt** of the vehicle stabilizing control.

In step SA430, is it determined whether or not the vehicle speed Vx is lower than a predetermined value v2 (<v1). In a case where the vehicle speed Vx is lower than the predetermined value v2 and a positive determination is concluded in step SA430 (i.e. Yes in SA430), the calculation process proceeds to step SA500. In step SA500, the preparatory control is terminated and the preparatory control target value Qpt** is set to zero (0) because generally, the abrupt yawing behavior is less likely to occur when the vehicle speed Vx decreases. On the other hand, in a case where the vehicle speed Vx is equal to or greater than the predetermined value v2 and a negative determination is concluded in step SA430 (i.e. No in SA430), the calculation process proceeds to step SA440.

In step SA440, it is determined whether or not the driver starts the brake operation after the preparatory control is started, on the basis of the brake operation quantity Bs. In a case where the brake operation is started, so that the brake operation quantity Bs becomes greater than a predetermined value bs2 (i.e. Bs>bs2 (>bs1)) and where a positive determination is concluded in step SA440 (i.e. Yes in SA440), the calculation process proceeds to step SA500. On the other hand, in a case where the brake operation quantity Bs is equal to or smaller than the predetermined value bs2 and a negative determination is concluded in step SA440 (i.e. No in SA440), the calculation process proceeds to step SA450.

In step SA450, it is determined whether or not the degree (the absolute value) of the steering angular velocity dSa is smaller than a predetermined value dsa4 (<dsa1, dsa2, dsa3). In a case where the degree of the steering angular velocity dSa is smaller than the predetermined value dsa4 and a positive determination is concluded in step SA450 (i.e. Yes in SA450), the calculation process proceeds to step SA500 where the preparatory control is terminated because, generally, the abrupt yawing behavior is less likely to occur when the steering angular velocity dSa decreases. On the other hand, in a case where the degree of the steering angular velocity dSa is equal to or greater than the predetermined value dsa4 and a negative determination is concluded in step SA450 (i.e. No in SA450), the calculation process proceeds to step SA460.

In step SA460, it is determined whether or not the degree (the absolute value) of the yaw angular acceleration dYr is smaller than a predetermined value dyr4 (<dyr1, dyr2, dyr3). In a case where the degree of the yaw angular acceleration dYr is smaller than the predetermined value dyr4 and where the abrupt yawing behavior has not yet occur, a positive determination is concluded in step SA460 (i.e. Yes in SA460) and the calculation process proceeds to step SA500. On the other hand, in a case where the degree of the yaw angular acceleration dYr is equal to or greater than the predetermined value dyr4 and a negative determination is concluded in step SA460 (i.e. No in SA460), the calculation process proceeds to step SA470.

In step SA470, it is determined whether or not the degree (the absolute value) of the actual lateral acceleration Gya is smaller than a predetermined value gy2 (<gy1). In a case where the degree of the actual lateral acceleration Gya is smaller than the predetermined value gy2 and a positive determination is concluded in step SA470 (i.e. Yes in SA470), the calculation process proceeds to step SA500. On the other hand, in a case where the degree of the actual lateral acceleration Gya is equal to or greater than the predetermined value gy2 and a negative determination is concluded in step SA470 (i.e. No in SA470), the calculation process proceeds to step SA450.

In step SA480, it is determined whether or not the duration time Tpc of the preparatory control is greater than a predetermined value tkz1. In a case where the duration time Tpc is greater than the predetermined value tkz1 and a positive determination is concluded in step SA480 (i.e. Yes in SA480), the calculation process proceeds to step SA500 and the preparatory control is terminated because generally, the vehicle stabilizing control is not executed after a predetermined time has passed since the abrupt steering operation had been performed and therefore, the preparatory control is not necessary. On the other hand, in a case where the duration time Tpc is equal to or smaller than the predetermined value tkz1 and a negative determination is concluded in step SA480 (i.e. No in SA480), the calculation process proceeds to step SA490.

In step SA490, it is determined whether or not the duration time Tes of the main control is greater than a predetermined value tkz2. In a case where the duration time Tes is greater than the predetermined value tkz2 and a positive determination is concluded in step SA490 (i.e. Yes in SA490), the calculation process proceeds to step SA500 and the preparatory control is terminated because, generally, the preparatory control is not necessary after a predetermined time has passed since the main control of the vehicle stabilizing control had been started. On the other hand, in a case where the duration time Tes is equal to or smaller than the predetermined value tkz2 and a negative determination is concluded in step SA490 (i.e. No in SA490), the preparatory control is continued.

The above-mentioned predetermined values (the positive values) v2, bs2, gy2, dsa4, dyr4, tkz1 and tkz2 are threshold values used for determining the termination of the preparatory control (1,e, preparatory control termination determining threshold values). The device does not need to include all of the above-mentioned functional blocks. For example, one or more of the functional block may be removed (omitted) from the device.

Figure 10:
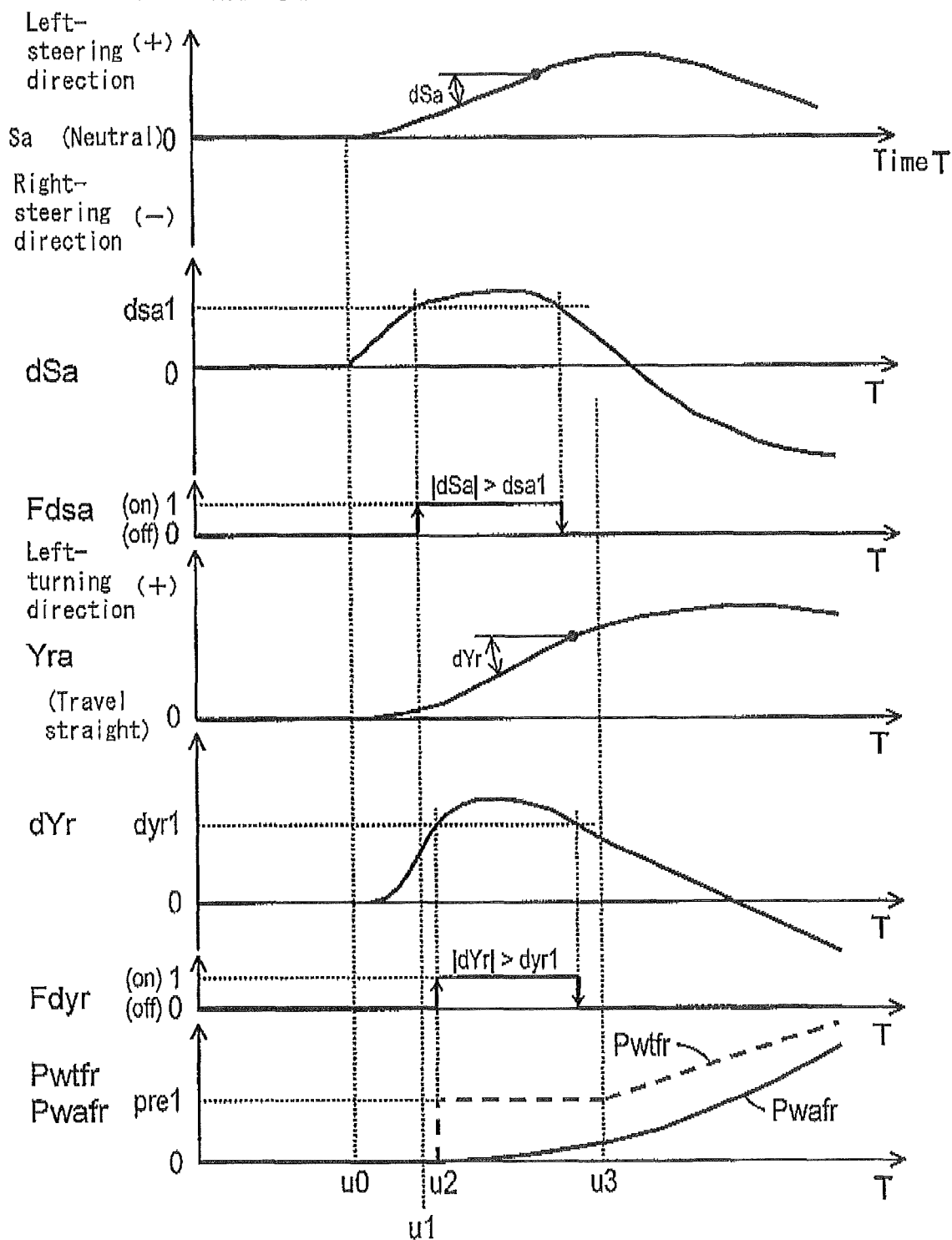
FIG. 10 is a diagram for explaining advantages and merits of the first embodiment to be obtained in a case where the J-turn steering operation is performed.
Figure 11:
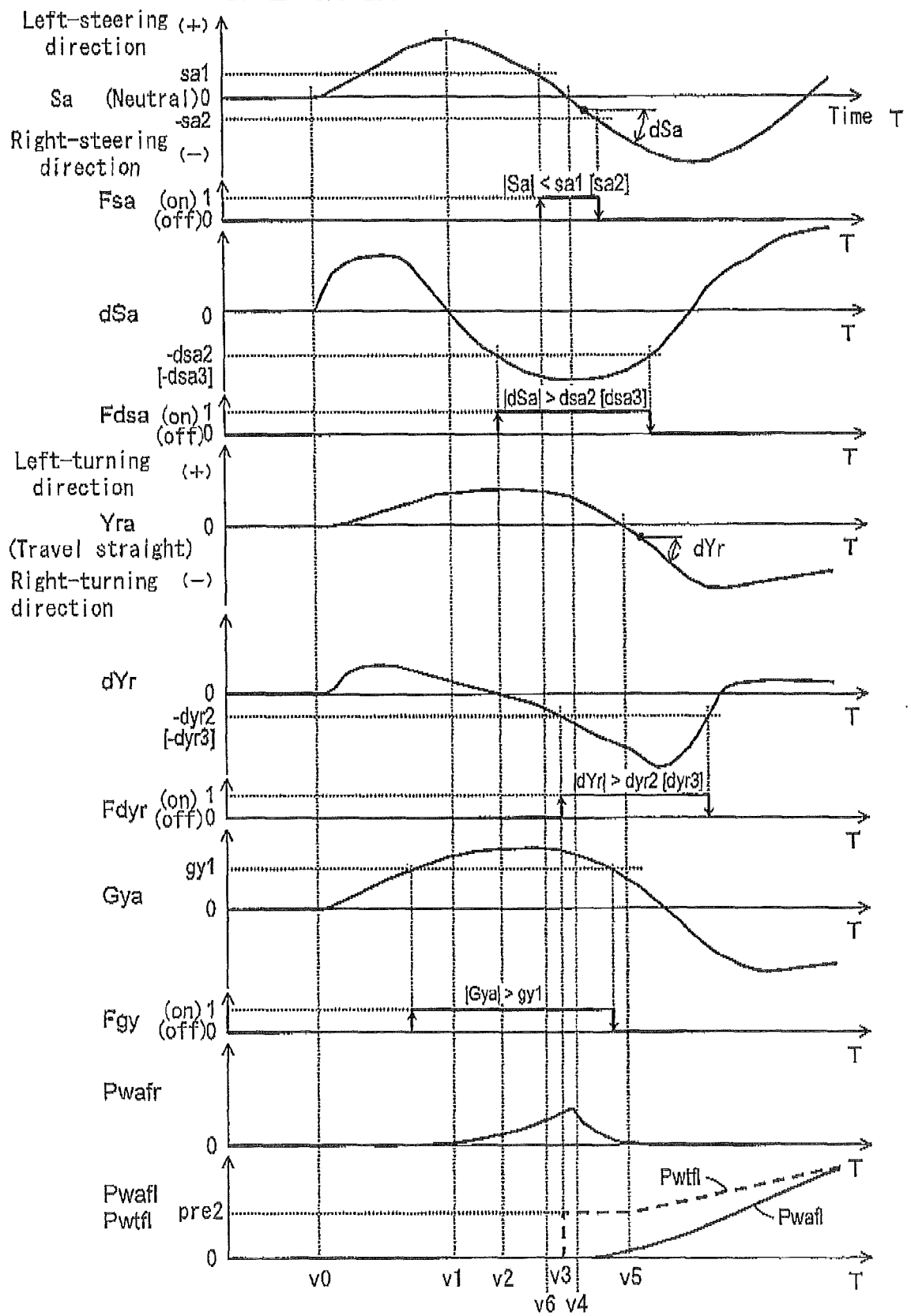
FIG. 11 is a diagram for explaining advantages and merits of the first embodiment to be obtained in a case where the lane-change steering operation is performed.
Figure 12:
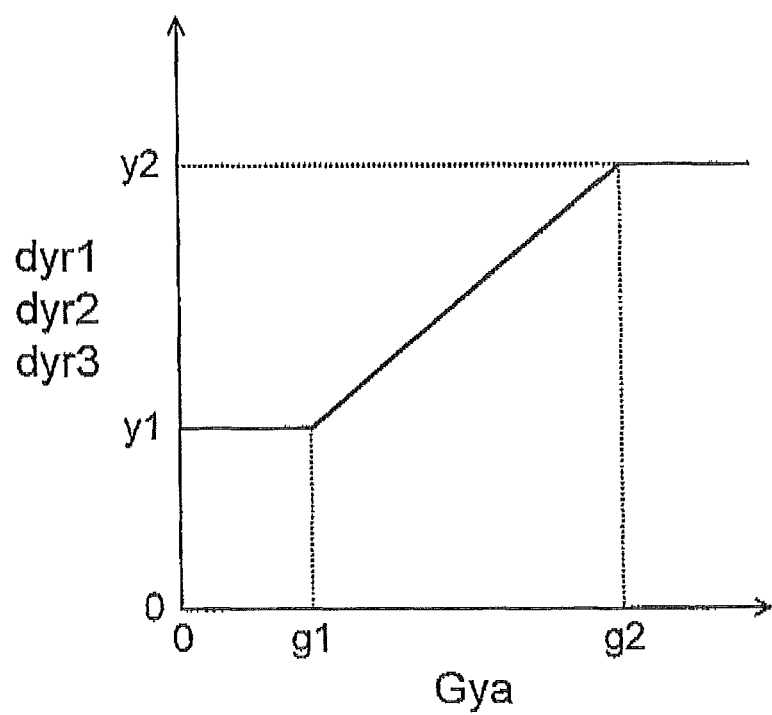
FIG. 12 is a diagram illustrating an example of a map for calculating a threshold value (a second predetermined value) used for determining a start of the preparatory control on the basis of an actual lateral acceleration according to the first embodiment.

Advantages and merits of the device according to the first embodiment will be described below with reference to FIGS. 10 and 11. Generally, the driver may feel discomfort because of a drive noise of the actuator and the like while the preparatory control is being executed or because of a slight deceleration of the vehicle by the preparatory control. The preparatory control is likely to become necessary when the abrupt yawing behavior occurs. For example, in a case where a lateral grip of the front wheels decreases and the understeering tendency occurs at the vehicle, the preparatory control is not necessary. Furthermore, in a case where changes in the yawing behavior is small while the oversteering tendency occurs at the vehicle, the preparatory control is likely to be less necessary. Hence, in this embodiment, another condition (e.g. a condition relating to the yaw angular acceleration dYr and the like) is added to the vehicle stabilizing control in a case where the steering angular velocity dSa is great and the start of the vehicle stabilizing control (the main control) is expected. Accordingly, the start of the main control is expected with high certainty, so that the preparatory control is executed only when necessary. Additionally, the predetermined values dsa1, dsa2 and dsa3 correspond to the first predetermined value. The predetermined values dyr1, dyr2 and dyr3 correspond to the second predetermined value. The predetermined value sa1 corresponds to the third predetermined value. The predetermined value sat corresponds to the fourth predetermined value. Furthermore, the predetermined value gy1 corresponds to the fifth predetermined value.

Advantages and merits to be obtained in a case where the J-turn steering operation is performed will be described below with reference to FIG. 10. In this case, the sudden steering operation in the first direction (e.g. in the left direction) is started at time u0 and the steering angle Sa rapidly increases. The steering angular velocity dSa is obtained by the steering angular velocity obtaining means BA50 and the degree of the steering angular velocity dSa is compared with the predetermined value dsa1 at the control means BA40. The steering angular velocity dSa may be calculated on the basis of the steering angle Sa. Then, a control flag Fdsa indicating a comparison result is set on the preparatory control calculating block BA40. In a case where the steering angular velocity dSa is equal to or smaller than the predetermined value dsa1, zero (0) is outputted to the adjustment calculating block BA42 as the control flag Fdsa. On the other hand, in the case where the steering angular velocity dSa is greater than the predetermined value dsa1, one (1) is outputted to the adjustment calculating block BA42 as the control flag Fdsa. In the case illustrated in FIG. 10, the condition of the steering angular velocity dSa being greater than the predetermined value dsa1 (i.e. dSa>dsa1) is satisfied at time u1.

Furthermore, the yaw angular acceleration dYr is obtained by the yaw angular acceleration obtaining means BA30 and the degree of the yaw angular acceleration dYr corresponding to the steering angular velocity dSa is compared with the predetermined value dyr1 at the control means BA40. The "degree of the yaw angular acceleration dYr corresponding to the steering angular velocity dSa" indicates the absolute value of the yaw angular acceleration dYr in a case where the sign of the steering angular velocity dSa corresponds with the sign of the yaw angular acceleration dYr. The yaw angular acceleration dYr may be calculated on the basis of the yaw rate Yra. Then, a control flag Fdyr indicating a comparison result is set on the preparatory control calculating block BA40. In the case where the yaw angular acceleration dYr is equal to or smaller than the predetermined value dyr1, zero (0) is outputted to the adjustment calculating block BA42 as the control flag Fdyr. On the other hand, in the case where the yaw angular acceleration dYr is greater than the predetermined value dyr1, one (1) is outputted to the adjustment calculating block BA42 as the control flag Fdyr. In the case illustrated in FIG. 10, the condition of the yaw angular acceleration dYr being greater than the predetermined value dyr1 (i.e. dYr>dyr1) is satisfied at time u2. In a case where the condition of the steering angular velocity dSa being greater than the predetermined value dsa1 (dSa>dsa1, i.e. Fdsa=1) and the condition of the yaw angular acceleration dYr being greater than the predetermined value dyr1 (dYr>dyr1, i.e. Fdyr=1) are satisfied (at time u2), the preparatory control is started. More specifically, in this case, a target value Qptfr of the preparatory control (i.e. the final target value Pwtfr=the predetermined value pre1) is outputted to a turning outer front wheel, so that the actual brake torque Pwafr is increased.

Accordingly, because the brake torque is applied to the target wheel prior to the start of the main control of the vehicle stabilizing control (e.g. the main control is started at time u3), the responsiveness of the brake actuator BRK may be compensated. Generally, in the case where the understeering tendency occurs at the vehicle, the yaw angular acceleration dYr does not increase that much. Therefore, in this embodiment, the yaw angular acceleration dYr is also taken into consideration in addition to the steering angular velocity dSa. As a result, the preparatory control is more properly executed.

Additionally, the actual lateral acceleration Gya may be obtained by the actual turning state quantity obtaining means BA70 and the degree (the absolute value) of the actual lateral acceleration Gya is compared with the predetermined value gy1 at the control means BA40. Then, a control flag Fgy indicating a comparison result may be set on the preparatory control calculating block BA40. In a case where the actual lateral acceleration Gya is equal to or smaller than the predetermined value gy1, zero (0) is outputted to the adjustment calculating block BA42 as the control flag Fgy. On the other hand, in a case where the actual lateral acceleration Gya is greater than the predetermined value gy1, one (1) is outputted to the adjustment calculating block BA42 as the control flag Fgy. In this case, the preparatory control may be started when at least the condition of the steering angular velocity dSa being greater than the predetermined value dsa1 (dSa>dsa1, i.e. Fdsa=1), the condition of the yaw angular acceleration dYr being greater than the predetermined value dyr1 (dYr>dyr1, i.e. Fdyr=1) and the condition of the actual lateral acceleration Gya being greater than the predetermined value gy1 (Gya>gy1, i.e. Fgy=1) are satisfied. Generally, the abrupt yawing behavior is likely to occur in a case where the vehicle travels on the road surface having a relatively high friction coefficient. Therefore, in this case, the condition relating to the actual lateral acceleration is added to the starting determination of the preparatory control, so that the preparatory control is more properly executed.

Advantages and merits to be obtained in the case where the lane-change steering operation (i.e. the transitional steering operation) is performed will be described below with reference to FIG. 11. In this case, it is assumed that the steering wheel SW is rapidly and suddenly steered in the left direction at time v0 and then, the steering wheel SW is sequentially steered in the right direction at time v4. The lane-change steering operation will be described mainly with the determination of the steering returning operation in the first steering operation and the steering operation in the second steering operation will be indicated within square brackets.

Firstly, the steering angular velocity dSa is obtained by the steering angular velocity obtaining means BA20 and then, the degree of the steering angular velocity dSa is compared with the predetermined value dsa2 [the predetermined value dsa3] at the control means BA40. As is the case with the above-mentioned case, the steering angular velocity dSa may be calculated on the basis of the steering angle Se. Then, a control flag Fdsa indicating a comparison result may be set on the preparatory control calculating block BA40. In a case where the steering angular velocity dSa is equal to or smaller than the predetermined value dsa2 [the predetermined value dsa3], zero (0) is outputted to the adjustment calculating block BA42 as the control flag Fdsa. On the other hand, in the case where the steering angular velocity dSa is greater than the predetermined value dsa2 [the predetermined value dsa3], one (1) is outputted to the adjustment calculating block BA42 as the control flag Fdsa. In the case illustrated in FIG. 11, the condition of the steering angular velocity dSa being greater than the predetermined value dsa2 (dSa>dsa2 [dSa>dsa3]) is satisfied at time v2 [time v4].

Furthermore, the yaw angular acceleration dYr is obtained by the yaw angular acceleration obtaining means BA30, and then, the degree of the yaw angular acceleration dYr corresponding to the steering angular velocity dSa is compared with the predetermined value dyr2 [the predetermined value dyr3] at the control means BA40. As is the case with the above-described case, the "degree of the yaw angular acceleration dYr corresponding to the steering angular velocity dSa" indicates the absolute value of the yaw angular acceleration dYr in the case where the sign of the steering angular velocity dSa corresponds with the sign of the yaw angular acceleration dYr. The yaw angular acceleration dYr may be calculated on the basis of the yaw rate Yra. Then, the control flag Fdyr indicating the comparison result may be set on the preparatory control calculating block BA40. In the case where the yaw angular acceleration dYr is equal to or smaller than the predetermined value dyr2 [the predetermined value dyr3], zero (0) is outputted to the adjustment calculating block BA42 as the control flag Fdyr. On the other hand, in the case where the yaw angular acceleration dYr is greater than the predetermined value dyr2 [the predetermined value dyr3], one (1) is outputted to the adjustment calculating block BA42 as the control flag Fdyr. In a case where the condition of the steering angular velocity dSa being greater than the predetermined value dsa2 [the predetermined value dsa3] (dSa>dsa2 [dSa>dsa3], i.e. Fdsa=1) and the condition of the yaw angular acceleration dYr being greater than the predetermined value dyr2 [the predetermined value dyr3] (dYr>dyr2 [dYr>dyr3], i.e. Fdyr=1) are satisfied (at time v3 [at time v4]), the preparatory control is started. More specifically, in this case, a target value Qptfl of the preparatory control (i.e. the final target value Pwtfl=the predetermined value pre2 [the predetermined value pre3]) is outputted to a wheel, which serves as a turning outer front wheel in the case where the vehicle turns while the second steering operation is performed, so that the actual brake torque Pwafl is increased.

Accordingly, because the brake torque is applied to the target wheel prior to the start of the main control of the vehicle stabilizing control (e,g, the main control is started at time V5), the responsiveness of the brake actuator BRK may be compensated. In this embodiment, the preparatory control is started after abrupt changes in the yawing behavior (i.e. abrupt changes in the yaw angular acceleration) in the same direction as the steering operation direction (i.e. a direction of the steering angular velocity dSa corresponds to a direction of the yaw angular acceleration dYr) is detected. Accordingly, the preparatory control may be more properly executed.

Additionally, the steering angle Sa may be obtained by the steering angle obtaining means BA50, and then, the degree (the absolute value) of the steering angle Sa may be compared with the predetermined value sa1 [the predetermined value sa2] at the control means BA40. A control flag Fsa indicating a comparison result may be set on the preparatory control calculating block BA40. In the case where the steering angle Sa is equal to or greater than the predetermined value sa1 [the predetermined value sa2], zero (0) is outputted to the adjustment calculating block BA42 as the control flag Fsa. On the other hand, in the case where the steering angle Sa is smaller than the predetermined value sa1 [the predetermined value sa2], one (1) is outputted to the adjustment calculating block BA42 as the control flag Fsa. In this case, the preparatory control may be started when at least the condition of the steering angular acceleration dSa being greater than the predetermined value dsa2 [the predetermined value dsa3] (dSa>dsa2[dSa>dsa3], i.e. Fdsa=1), the condition of the yaw angular acceleration dYr being greater than the predetermined value dyr2 [the predetermined value dyr3] (dYr>dyr2 [dYr>dyr3], i.e. Fdyr=1) and the condition of the steering angle Sa being smaller than the predetermined value sa1 [the predetermined value sa2] (Sa<sa1[Sa<sa2], i.e. Fsa=1) are satisfied.

In the case where the second steering operation is not performed after the first steering operation is performed, the abrupt yawing behavior is less likely to occur. Therefore, in this embodiment, the degree of the steering angle Se is added to the staring condition of the preparatory control, so that the preparatory control is started when the second steering operation is expected to be certainly operated or immediately after the second steering operation is started.

Furthermore, the actual lateral acceleration Gya may be obtained by the actual turning state quantity obtaining means BA70, and then, the degree (the absolute value) of the actual lateral acceleration Gya may be compared with the predetermined value gy1 at the control means BA40. Then, a control flag Fgy indicating a comparison result may be set on the preparatory control calculating block BA40. In the case where the actual lateral acceleration Gya is equal to or smaller than the predetermined value gy1, zero (0) is outputted to the adjustment calculating block BA42 as the control flag Fgy.

On the other hand, in the case where the actual lateral acceleration Gya is greater than the predetermined value gy1, one (1) is outputted to the adjustment calculating block BA42 as the control flag Fgy. In this case, the preparatory control may be started when at least the condition of the steering angular acceleration dSa being greater than the predetermined value dsa2 [the predetermined value dsa3] (dSa>dsa2 [dSa>dsa3], i.e. Fdsa=1), the condition of the yaw angular acceleration dYr being greater than the predetermined value dyr2 [the predetermined value dyr3] (dYr>dyr2 [dYr>dyr3], i.e. Fdyr=1) and the condition of the actual lateral acceleration Gya being greater than the predetermined value gy1 (Gya>gy1, i.e. Fgy=1) are satisfied. As is the case with the J-turn steering operation, the abrupt yawing behavior is likely to occur when the vehicle travels on the road surface having the relatively high friction coefficient. Accordingly, in this embodiment, the condition relating to the lateral acceleration Gya is added to the starting condition of the preparatory control, so that the preparatory control may be executed more properly and accurately.

Additionally, at least one of a set of the predetermined values dsa2 and dsa3, a set of the predetermined values dyr2 and dyr3 and a set of the predetermined values sa1 and sa2 may be set so as to have the same value.

The predetermined values dyr1, dyr2 and dyr3 are used as the preparatory control starting threshold values relating to the yaw angular acceleration dYr. At least one of the predetermined values dyr1, dyr2 and dyr3 may be set on the basis of the actual lateral acceleration Gya. More specifically, at least one of the predetermined values dyr1, dyr2 and dyr3 is set on the basis of a calculation map, in which at least one of the predetermined values dyr1, dyr2 and dyr3 is characterized so that at least one of the predetermined values dyr1, dyr2 and dyr3 is set as a predetermined value y1 in a case where the actual lateral acceleration Gya is equal to or greater than zero (0) but less than a predetermined value g1, so that at least one of the predetermined values dyr1, dyr2 and dyr3 is set so as to increase in response to an increase of the lateral acceleration Gya in a case where the actual lateral acceleration Gya is equal to or greater than the predetermined value g1 but less then a predetermined value g2 (>g1) and so that at least one of the predetermined values dyr1, dyr2 and dyr3 is set as a predetermined value y2 (>y1) in a case where the actual lateral acceleration Gya is equal to or greater than the predetermined value g2. The friction coefficient of the road surface is reflected on the actual lateral acceleration Gya. Therefore, the preparatory control appropriate to a road surface condition may be executed because at least one of the predetermined values dyr1, dyr2 and dyr3 is set on the basis of the actual lateral acceleration Gya.

The motion control device for the vehicle according to the first embodiment includes the steering angle obtaining means BA50 for obtaining the steering angle Sa of the vehicle. The control means BA40 of the device is configured so as to apply the brake torque to the wheel WH on the basis of the steering angular velocity dSa to be obtained in the case where (the degree of) the steering angle Sa increases and the yaw angular acceleration dYr to be obtained in the case where (the degree of) the steering angle Sa increases. Furthermore, the control means BA40 may be configured so as to apply the brake torque to the wheel WH on the basis of the steering angular velocity dSa to be obtained in the case where (the degree of) the steering angle Sa decreases and the yaw angular acceleration dYr to be obtained in the case where (the degree of) the steering angle Sa decreases. Moreover, the control means BA40 may be configured so as to apply the brake torque to the wheel WH** in the case where (the degree of) the steering angle Sa is smaller than the third predetermined value (i.e. the predetermined value sa1) while (the degree of) the steering angle Sa decreases. Additionally, the steering angular velocity obtaining means BA20 may be configured so as to calculate the steering angular velocity dSa on the basis of the steering angle Sa, which is obtained by the steering angle obtaining means BA50.

The motion control device for the vehicle according to the first embodiment includes the steering direction determining means BA60 for determining whether the steering direction Dstr of the vehicle corresponds to the first direction or the second direction opposite from the first direction, on the basis of the steering angle Sa, which is obtained by the steering angle obtaining means BA50. The first direction (the one direction) is one of a left direction and a right direction, and the second direction (the other direction) is the other of the left direction and the right direction. The control means BA40 may be configured so as to apply the brake torque to the wheel WH on the basis of the steering angular velocity dSa to be obtained in the case where (the degree of) the steering angle Sa increases and the yaw angular acceleration dYr to be obtained in the case where (the degree of) the steering angle Se increases in the case where the steering direction determining means BA60 determines that the steering direction Dstr corresponds to the first direction and then, the steering direction Dstr is sequentially determined to correspond to the second direction. In this case, the control means BA40 may apply the brake torque to the wheel WH in the case where (the degree of) the steering angle Sa is smaller than the fourth predetermined value (i.e. the predetermined value sa2).

The motion control device for the vehicle according to the first embodiment includes the actual lateral acceleration obtaining means (i.e. the actual turning state quantity obtaining means BA70) for obtaining the actual lateral acceleration Gya acting on the vehicle. The control means BA40 is configured so as to set the second predetermined value (i.e. the predetermined values dyr1, dyr2 and dyr3) on the basis of the actual lateral acceleration Gya. Furthermore, the control means BA40 may be configured so as to apply the brake torque to the wheel WH** in the case where (the degree of) the actual lateral acceleration Gya is greater than the fifth predetermined value (i.e. the predetermined value gy1). Additionally, the yaw angular acceleration obtaining means BA30 may be configured so as to calculate the yaw angular acceleration dYr on the basis of the actual turning state quantity Jra (i.e. the actual yaw rate Yra), which is obtained by the turning state quantity obtaining means BA70.

[Second Embodiment]

Figure 13:
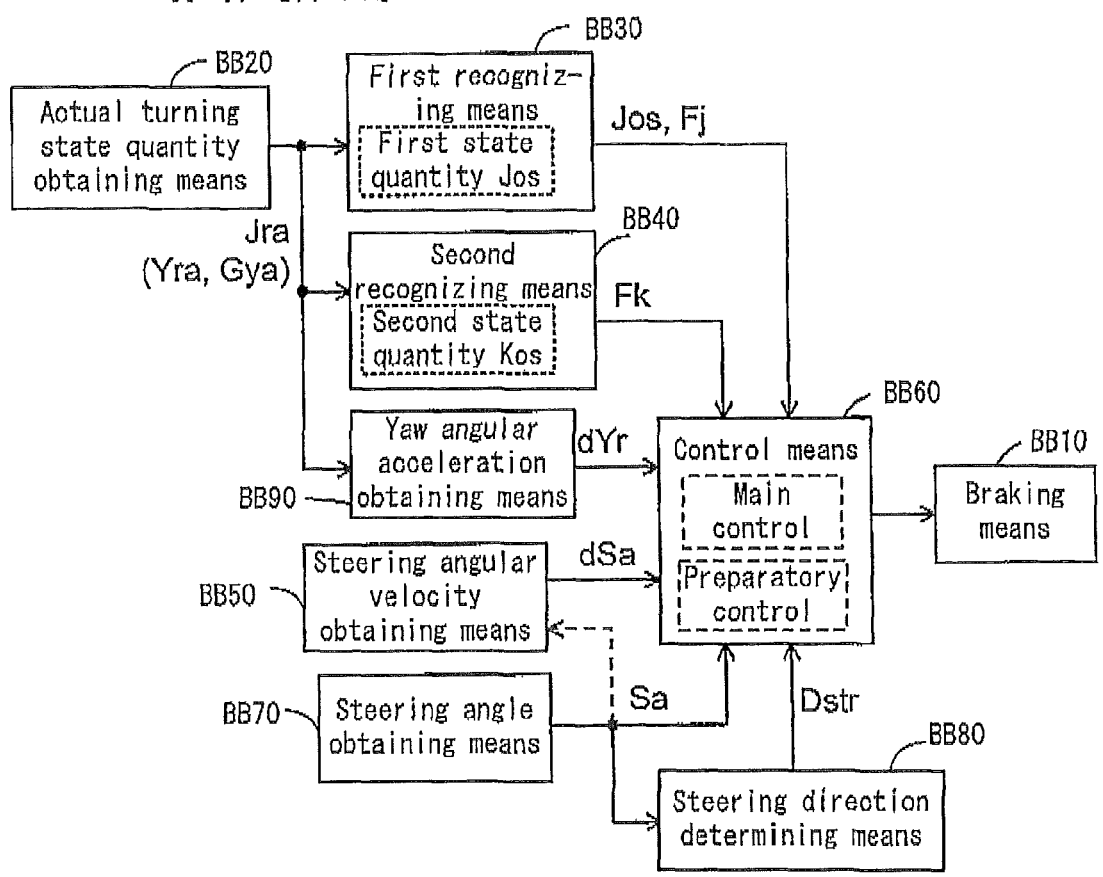
FIG. 13 is a diagram illustrating an entire configuration of a motion control device for a vehicle according to a second embodiment.

A second embodiment of a motion control device for a vehicle will be described below with reference to the attached drawings. Illustrated in FIG. 13 is an entire configuration example of the motion control device for the vehicle according to the second embodiment, As illustrated in FIG. 13, the motion control device for the vehicle (which will be hereinafter referred to as the device) includes a braking means BB10 for applying the brake torque to the wheel WH, an actual turning state quantity obtaining means BB20 for obtaining the actual turning state quantity (Yra, Gya and the like) acting on the vehicle, and a first recognizing means BB30 for calculating a first state quantity Jos on the basis of the actual turning state quantity and recognizing the oversteering tendency of the vehicle on the basis of the first state quantity Jos. The device further includes a second recognizing means BB40 for calculating a second state quantity Kos, which differs from the first state quantity Jos, on the basis of the actual turning state quantity (Yra, Gya and the like) of the vehicle in order to recognize the oversteering tendency of the vehicle on the basis of the second state quantity Kos, a steering angular velocity obtaining means BB50 for obtaining the steering angular velocity dSa of the vehicle, and a control means BB60 for controlling the braking means BB10 in order to control the brake torque to be applied to the wheel WH. More specifically, the control means BB60 executes the vehicle stabilizing control for maintaining the stability (the traveling stability) of the vehicle in a manner where the control means BB60 controls the brake torque of the wheel WH via the braking means BB10 on the basis of a recognition results Fj and Jos of the first recognizing means BB30. Furthermore, the control means BB60 applies the brake torque to the wheel WH in order to improve the responsiveness of the vehicle stabilizing control in a manner where the control means BB60 controls the braking means BB60 on the basis of a recognition result Fk of the second recognizing means BB40 and the steering angular velocity dSa. More specifically, the control means BB60 may be configured so as to apply the brake torque to the wheel WH** in a case where (the absolute value of) the steering angular velocity dSa is greater than the first predetermined value (i.e. the predetermined value dsa1, dsa2 or dsa3) and where the recognition result Fk of the second recognizing means BB40 indicates the oversteering tendency of the vehicle (i.e. Fk=1).

When comparing to the first recognizing means 131330, the second recognizing means BB40 recognizes a relatively fast yawing motion of the vehicle. On the other hand, the first recognizing means BB30 is configured so as to calculate the first (oversteering) state quantity Jos on the basis of an interrelation between a state quantity indicating a magnitude (a size) of the yawing motion of the vehicle (e.g. the lateral sideslip angle βa, the sideslip angle deviation Δβ and the like) and a state quantity indicating a speed (velocity) of the yawing motion of the vehicle (e.g. the sideslip angular velocity dβa, the yaw rate deviation ΔYr and the like). More specifically, the first state quantity Jos is calculated on the basis of a calculation formula composed of the state quantity including a term of the sideslip angle (of the vehicle) and the state quantity including a term of the yaw rate. The second recognizing means BB40 is configured so as to calculate the second (oversteering) state quantity Kos on the basis of only the state quantity indicating the speed of the yawing motion of the vehicle (e.g. the sideslip angular velocity dβa, the yaw rate deviation ΔYr and the like). More specifically, the second state quantity Kos is calculated on the basis of a calculation formula composed only of the state quantity including the yaw rate term (without using the sideslip angle term).

The preparatory control may become necessary in the case where the oversteering, which may induce the abrupt yawing behavior, occurs at the vehicle. In the main control of the vehicle stabilizing control, an oversteering tendency accompanying a relatively gradual yawing behavior needs to be recognized. Accordingly, in this embodiment, the oversteering tendency accompanying abrupt changes in the yawing motion is determined on the basis of the second state quantity Kos, which differs from the first state quantity Jos. Therefore, an increase (likeliness of an increase) of the abrupt oversteering tendency may be determined at an early stage by using the second state quantity Kos, which may result in promptly starting the execution of the preparatory control.

The device further includes a steering angle obtaining means BB70 for obtaining the steering angle Sa of the vehicle. The control means BB60 may be configured so as to apply the brake torque to the wheel WH** in a case where (the absolute value of) the steering angle Sa decreases and (the absolute value of) the steering angle Sa is smaller than the second predetermined value (i.e. the predetermined value sa1). Additionally, the steering angular velocity obtaining means BB50 may be configured so as to calculate the steering angular velocity dSa on the basis of the steering angle Sa, which is obtained by the steering angle obtaining means BB70.

The device further includes a steering direction determining means BB80 for determining whether the steering direction Dstr of the vehicle corresponds to the first direction (i.e. either one of the right direction or the left direction) or the second direction (i.e. the direction opposite to the first direction), on the basis of the steering angle Sa, which is obtained by the steering angle obtaining means BB70. In this case, the control means BB60 may be configured so as to apply the brake torque to the wheel WH** in a case where the steering direction determining means BB80 determines that the steering direction Dstr corresponds to the first direction and then sequentially determines that the steering direction Dstr corresponds to the second direction, (the absolute value of) the steering angle Sa increases and where (the absolute value of) the steering angle Sa is smaller than the third predetermined value (i.e. the predetermined value sa2).

The abrupt yawing behavior is likely to occur at the vehicle in the case where the steering operation is performed in the first direction and then in the second direction (i.e. in the case where the steering direction is shifted to the second direction from the first direction). Therefore, in this embodiment, because the degree of the steering angle Sa is added to the starting condition, the steering operation being performed in the first direction then to in the second direction may be certainly detected.

Figure 14:
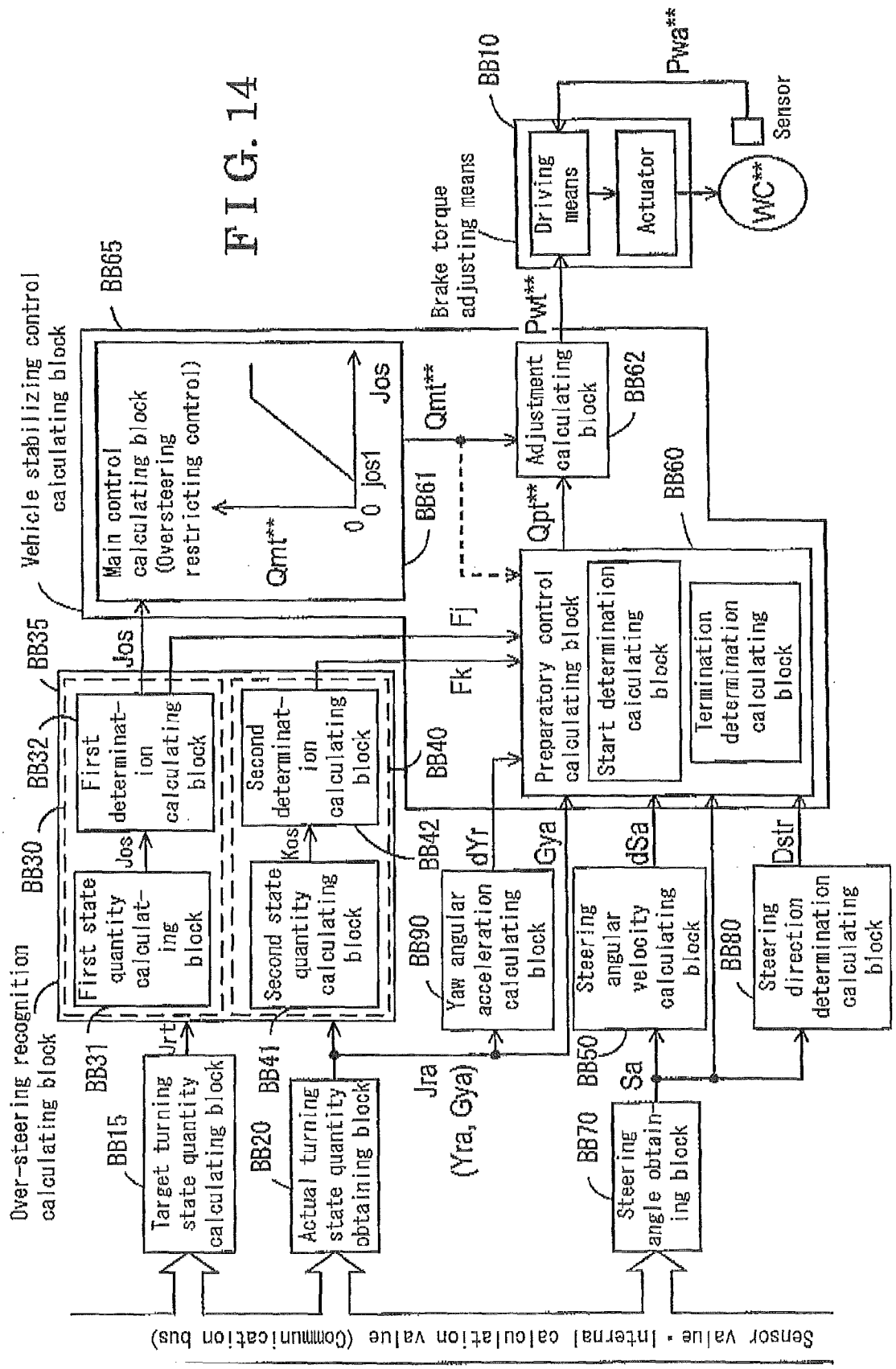
FIG. 14 is a functional block diagram illustrating a processing example of a motion control for a vehicle (a vehicle stabilizing control) according to the second embodiment.

The device further includes a yaw angular acceleration obtaining means BB90 for obtaining the yaw angular acceleration dYr of the vehicle. The yaw angular acceleration dYr may be calculated on the basis of the actual turning state quantity (i.e. the yaw rate Yra), which is obtained by the actual turning state quantity obtaining means BB20. In this case, the control means BB60 may be configured so as to apply the brake torque to the wheel WH** in a case where (the absolute value of) the yaw angular acceleration dYr is greater than the fourth predetermined value (i.e. the predetermined value dyr1, dyr2 or dyr3). The yaw angular acceleration dYr indicates the changes in the yawing motion. Therefore, because the condition relating to the yaw angular acceleration dYr is taken into consideration, the preparatory control may be properly and appropriately executed, Illustrated in FIG. 14 is a functional block diagram of a processing example of the motion control for the vehicle (i.e. the vehicle stabilizing control) according to the second embodiment. The vehicle having the motion control device for the vehicle (i.e. the device) according to the second embodiment has a similar configuration as the vehicle having the device according to the first embodiment (see FIG. 4). The vehicle stabilizing control includes the main control and the preparatory control. The main control is a control for restricting an occurrence the understeering tendency of the vehicle and/or the oversteering tendency of the vehicle. On the other hand, the preparatory control is a control for assisting the main control. More specifically, the preparatory control is executed before the main control is started in order to compensate the responsiveness of the vehicle stabilizing control. Additionally, the functional blocks indicated by the identical reference numerals used for the means include the same function as the corresponding means.

In a target turning state quantity calculating block BB15, a turning state quantity Jrt of the vehicle to be targeted (i.e. a target turning state quantity Jrt) is calculated by using a known method. The turning state quantity is a property indicating the turning state of the vehicle. Furthermore, the turning state quantity is a value, which is calculated by using at least one of the yaw rate, the vehicle body sideslip angle (which is also referred to simply as the sideslip angle) and the vehicle body sideslip angular velocity (which is also referred to simply as the sideslip angular velocity). For example, the target yaw rate Yrt is calculated as the target turning state quantity Jrt on the basis of the vehicle speed Vx and the steering wheel angle θsw (or the front wheel steering angle δfa). Then, the target sideslip angle FM (i.e. the sideslip angle of the vehicle body to be targeted) is calculated on the basis of the steering wheel angle θsw (or the front wheel steering angle δfa).

In a turning state quantity obtaining block BB20, the turning state quantity Jra, which actually acts on the vehicle, is obtained on the basis of the sensor value(s) and/or the internal calculation value(s) of other electronic control unit(s), which are obtained via the communication bus CB. For example, the actual yaw rate Yra, which is detected by the yaw rate sensor YR and which acts on the vehicle, and the actual lateral acceleration Gya, which is detected by the lateral acceleration sensor GY, may be obtained as the turning state quantity Jra. The target turning state quantity Jrt and the actual turning state quantity Jra correspond to each other.

In an oversteering recognition calculating block BB35, the oversteering state quantity Jos, which indicates the magnitude (the size) of the oversteering occurring at the vehicle, and control flags Fj and Fk, which indicate whether or not the vehicle is in the oversteering tendency, are calculated on the basis of the target turning state quantity Jrt and the actual turning state quantity Jra. The control flag Fj indicates a determination result of the oversteering tendency of the vehicle obtained by using the first state quantity Jos. More specifically, the control flag Fj being zero (0) (i.e. Fj=0) indicates that "the vehicle is not in the oversteering tendency (which is also called as non-oversteering state)", On the other hand, the control flag Fj being one (1) (i.e. Fj=1) indicates that "the vehicle is in the oversteering tendency (which is also called as the oversteering state)". The control flag Fk indicates a determination result of the oversteering tendency of the vehicle by using the second state quantity Kos. More specifically, the control flag Fk being zero (0) (i.e. Fk=0) indicates that "the vehicle is not in the oversteering tendency (i.e. which is also called as the non-oversteering state)". On the other hand, the control flag Fk being one (1) (i.e. Fk=1) indicates that "the vehicle is in the oversteering tendency (which is also called as the oversteering state)". The oversteering recognition calculating block BB35 includes a first recognition calculating block BB30 in which the first state quantity Jos is used and a second recognition calculating block BB40 in which the second state quantity Kos is used.

Firstly, the first oversteering recognition calculating block BB30 will be described below. In the first oversteering recognition calculating block BB30, the first state quantity Jos, which is calculated on the basis of the interrelation between the state quantity indicating the magnitude (the size) of the yawing motion and the state quantity indicating the speed (velocity) of the yawing motion, is used as the turning state quantity. Additionally, the first state quantity Jos is used for a control quantity calculation in the main control of the vehicle stabilizing control (i.e. the calculation of the target brake torque value used in the main control).

The yawing motion may gradually increase while the vehicle travels on the road surface having a low friction coefficient. In order to properly execute the vehicle stabilizing control even in the above-described case, the first state quantity Jos is calculated in view of the magnitude of the yawing motion (i.e. the state quantity indicating how large the yawing motion is), in addition to the speed of the yawing motion (i.e. the state quantity indicating how fast the yawing motion is), in the determination of the oversteering tendency and the like executed in the main control. The "state quantity indicating the magnitude (the size) of the yawing motion" is a property including the actual (vehicle body) sideslip angle pa of the vehicle. In other words, the sideslip angle deviation Δβ or the actual sideslip angle βa itself corresponds to the "state quantity indicating the magnitude (the size) of the yawing motion". The "state quantity indicating the speed of the yawing motion" is a property including the actual yaw rate Yra of the vehicle. In other words, the yaw rate deviation ΔYr or the sideslip angular velocity dβa (=Yra−Gya/Vx, where Gya indicates the actual lateral acceleration and Vx indicates the vehicle speed) corresponds to the "state quantity indicating the speed of the yawing motion".

In a first state quantity calculating block BB31, the first state quantity Jos is calculated by comparing the actual turning state quantity Jra with the target turning state quantity Jrt. More specifically, the first state quantity Jos*(K1*Δβ+K2*ΔYr, where K1 and K2 are coefficients) is calculated on the basis of the interrelation between the deviation Δβ between the actual sideslip angle βa and the target sideslip angle βt (i.e. Δβ=βa−βt, the sideslip angle deviation Δβ) and the deviation ΔYr between the actual yaw rate Yra and the target yaw rate Yrt (i.e. ΔYr=Yra−Yrt, the yaw rate deviation ΔYr). Alternatively, the sideslip angular velocity dβa may be used in order to calculate the first state quantity Jos, instead of the yaw rate deviation ΔYr. Furthermore, because the target value βt of the sideslip angle may be set as a constant (e,g, the target value βt may be set as zero (0)), the actual sideslip angle βa itself may be used in the calculation of the first state quantity Jos, instead of the sideslip angle deviation Δβ. The first state quantity Jos may be calculated on the basis of an interrelation between the state quantity Δβ or the actual side slip angle pa, which indicates the magnitude (the size) of the yawing motion, on the one hand and the state quantity ΔYr or the sideslip angular velocity dβa, which indicates the speed of the yawing motion, on the other. In other words, the first state quantity Jos may be calculated on the basis of a calculation formula composed of the state quantity Δβ or βa, which includes the sideslip angle term, and the state quantity ΔYr or dβa, which includes the yaw rate term. Additionally, in a case where the first state quantity Jos is calculated on the basis of the interrelation between the actual sideslip angle βa and the sideslip angular velocity dβa, the target turning state quantity Jrt may be omitted (i.e. the target turning state quantity calculating block BB15 may be removed from the device.

In a first determination calculating block BB32, it is determined whether or not the oversteering tendency occurs on the basis of the first state quantity (the first oversteering state quantity) Jos. More specifically, in a case where the first state quantity Jos is greater than the predetermined value jos1, the vehicle is determined to be in the oversteering tendency (i.e. the oversteering state). On the other hand, in a case where the first state quantity Jos is equal to or smaller than the predetermined value jos1, the vehicle is in the understeering tendency or in a neutral steering state. In other words, it is determined that the oversteering tendency does not occur at the vehicle (i.e. the non-oversteering state). Then, in the case where the vehicle is in the oversteering state (i.e. Jos jos1), one (1) is outputted to the preparatory control calculating block BB60 as the first control flag Fj (i.e. the result of the oversteering determination based on the first state quantity). On the other hand, in the case where the vehicle is in the non-oversteering state (Joss≤jos1), zero (0) is outputted to the preparatory control calculating block BB60 as the first control flag Fj. In addition to the output of the first control flag Fj to a preparatory control calculating block BB60, the first state quantity Jos is outputted from the first determination calculating block BB32 to a vehicle stabilizing control calculating block BB65, The second oversteering recognition calculating block BB40 will be described below. In the second oversteering recognition calculating block BB40, the second state quantity Kos, which is calculated on the basis of the state quantity indicating the speed (velocity) of the yawing motion (i.e. the state quantity indicating how fast the yawing motion is), is used as the turning state quantity. The second state quantity Kos, which is calculated at a second state quantity calculating block BB41, is used for the determination of the oversteering tendency, which is used for the preparatory control. The preparatory control may become necessary only in the case where the oversteering tendency accompanying the abrupt yawing motion occurs. Therefore, the second state quantity Kos is calculated on the basis only of the state quantity indicating the speed of the yawing motion. For example, the yaw rate deviation $\Delta Yr$ (=Yra−Yrt) is used as the second state quantity Kos. Alternatively, the sideslip angular velocity $d\beta e$ (=Yra−Gya/Vx) may be used as the second state quantity Kos. In other words, the second state quantity Kos may be calculated on the basis of a calculation formula, which does not include the sideslip angle term and which includes only the yaw rate term (state quantities $\Delta Yr$, $d\beta a$).

In a second determination calculating block BB42, the oversteering tendency accompanying the abrupt yawing motion of the vehicle is determined on the basis of the second state quantity (the second oversteering state quantity) Kos. In a case where the second state quantity Kos is greater than a predetermined value kos1, the vehicle is determined to be in the oversteering state. On the other hand, in a case where the second state quantity kos is equal to or smaller than the predetermined value kos1, the vehicle is determined to be in the non-oversteering state. Then, in the case where the vehicle is in the oversteering state (i.e. Kos>kos1), one (1) is outputted to the preparatory control calculating block BB60 as the second control flag Fk (i.e. the result of determination of the oversteering tendency based on the second state quantity). On the other hand, in the case where the vehicle is in the non-oversteering state (i.e. Kos≤kos1), zero (0) is outputted to the preparatory control calculating block BB60 as the second control flag Fk.

In a yaw angular acceleration calculating block BB90, the actual yaw rate Yra, which is obtained at the actual turning state quantity obtaining block BB20, is differentiated by time in order to obtain the yaw angular acceleration dYr. Alternatively, the yaw angular acceleration dYr may be directly obtained from the sensor(s) and/or the other electronic control unit(s) via the communication bus CB. The yaw angular acceleration dYr and the actual lateral acceleration Gya, which is obtained at the turning state quantity obtaining block BB20, are inputted into the vehicle stabilizing control calculating block BB65 (i.e. the preparatory control calculating block BB60).

In a steering angle obtaining block BB70, the steering angle Sa is obtained on the basis of the sensor signal(s) and/or the internal calculation value(s) of other electronic control unit(s), which are obtained via the communication bus CB. More specifically, the steering angle Sa is determined on the basis of at least one of the steering wheel angle θsw and the steering angle δfa of the steered wheels (the front wheels). In a steering angular velocity calculating block BB50, the steering angle Sa is differentiated by time in order to obtain the steering angular velocity dSa. More specifically, the steering angular velocity dSa is determined on the basis of at least one of the steering wheel angular velocity dθsw and the steered wheel steering angular velocity dδfa. Alternatively, the steering angular velocity dSa may be directly obtained from the sensor(s) and/or the other electronic control unit(s) via the communication bus CB, in a steering direction determination calculating block BB80, the steering direction Dstr is calculated on the basis of the steering angle Sa. The steering angle Dstr is determined as, either the straight-moving direction, the left-steering direction or the right-steering direction. The steering angle Sa, the steering angular velocity dSa and the steering direction Dstr are inputted into the vehicle stabilizing control calculating block BB65 (i.e. the preparatory control calculating block BB60).

In the vehicle stabilizing control calculating block BB65, the target value Pwt of the brake torque to be applied to the wheel WH for maintaining the stability of the vehicle is calculated on the basis of the above-mentioned state quantity (e.g. the oversteering state quantity Jos and the like). The vehicle stabilizing control calculating block BB65 includes a main control calculating block BB61, the preparatory control calculating block BB60 and an adjustment calculating block BB62. In the main control calculating block BB61, the target value Qmt of the brake torque to be applied to the wheel WH (i.e. the main control target value Qmt), which is used as a basis for stabilizing the vehicle (specifically, for restricting the oversteering tendency of the vehicle), is calculated on the basis of the first (oversteering) state quantity Jos. In the preparatory control calculating block BB60, the target value Qpt of the preparatory (auxiliary) brake torque (i.e. the preparatory control target value Qpt) for compensating the responsiveness of the brake actuator BRK is calculated. In the adjustment calculating block BB62, the main control target value Qmt and the preparatory control target value Qpt are adjusted in order to obtain the final target value Pwt of the brake torque (i.e. the final target value Pwt). Furthermore, vehicle speed Vx and the brake operation quantity Bs are inputted into the vehicle stabilizing control calculating block BB65**.

In the main control calculating block BB61, the main control target value Qmt, which is used as the basis of the vehicle stabilizing control (1,e, the oversteering restricting control), is calculated on the basis of the first oversteering state quantity (the first state quantity) Jos by using a preliminarily set calculation map. The calculation map is set so as to specify a characteristic of the main control target value Qmt. More specifically, according to the calculation map, the main control target value Qmt is set to be zero (0) in the case where the first state quantity Jos is smaller than the predetermined value jos1 (the threshold value) and which is set to so as to increase from zero (0) in response to an increase of the first state quantity Jos in the case where the oversteering state quantity Jos is equal to or greater than the predetermined value. The predetermined value jos1 is used as a condition for determining the start of the main control of the vehicle stabilizing control (i.e. a condition for determining the oversteering state on the basis of the first state quantity and starting to apply the brake torque). The main control target value Qmt is inputted into the preparatory control calculating block BB60.

In the preparatory control calculating block BB60, the preparatory control target value Qpt** is calculated in order to advance the start of supply of the brake torque by the main control and in order to compensate the responsiveness of the brake actuator BRK. The control flags Fj and Fk, the yaw angular acceleration dYr, the actual lateral acceleration Gya, the steering angle Sa, the steering angular velocity dSa and the steering direction Dstr are inputted into the preparatory control calculating block BB60. The preparatory control calculating block BB60 includes a start determination calculating block and a termination determination calculating block. The preparatory control will be described in more detail later.

In the adjustment calculating block BB62, the final target value Pwt is calculated on the basis of the main control target value Qmt and the preparatory control target value Qpt. More specifically, the final target value Pwt is obtained in a manner where either the main control target value Qmt or the preparatory control target value Qpt having a greater value is selected. Alternatively, the final target value Pwt may be calculated by adding the preparatory control target value Qpt to the main control target value Qmt. Each of the main control target value Qmt, the preparatory control target value Qpt and the final target value Pwt may be calculated as a value of either the wheel braking force, the brake torque, the brake hydraulic pressure, the longitudinal slip, the wheel speed or the thrust force of the brake pad PD**.

In the brake torque adjusting means BB10, which serves as the braking means, the driving means of the brake actuator BRK (e.g. the electric motor for driving the hydraulic pump, the driving means of the solenoid valve and the like) is controlled on the basis of the final target value Pwt of the brake torque. Furthermore, by providing the sensor (e.g. the pressure sensor PW) for detecting the actual value Pwa of the brake torque corresponding to the target value Pwt at the wheel WH, the driving means may be controlled so that the actual value Pwa corresponds to the target value Pwt on the basis of the target value Pwt and the actual value Pwa**.

Figure 15:
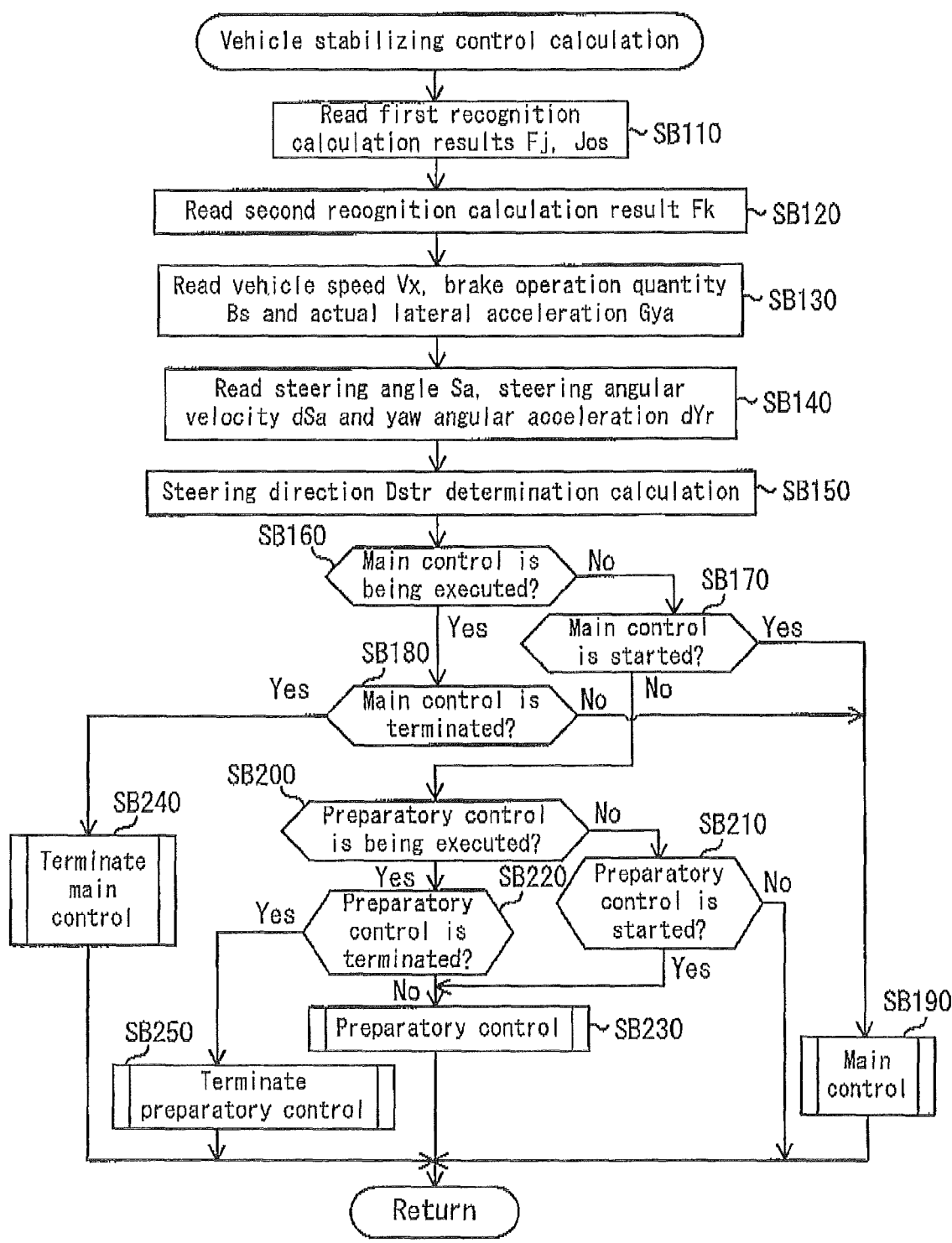
FIG. 15 is a control flowchart illustrating a processing example of a vehicle stabilizing control calculation illustrated in FIG. 14 according to the second embodiment.

The preparatory control calculating block BB60 illustrated in FIG. 14 will be described in more detail with reference to FIG. 15.

Firstly, in step SB110, the preparatory control calculating block BB60 reads the first control flag Fj and the first state quantity Jos as the calculation result of the first oversteering recognition calculating block (i.e. as a first recognition calculation result). In this case, the preparatory control calculating block BB60 also reads the control state Qmt of the main control may also be read. In other words, information such as whether or not the main control has already started, how much the brake torque is applied to which wheel WH in the case where the main control has been started and the like, is inputted into the preparatory control calculating block BB60.

In step SB120, the preparatory control calculating block BB60 reads the second control flag Fk as a calculation result of the second oversteering recognition calculating block (i.e. a second recognition calculation result). Then, in step SB130, the preparatory control calculating block BB60 reads the vehicle speed Vx, the brake operation quantity Bs and the (actual) lateral acceleration Gya. In step SB140, the preparatory control calculating block BB60 reads the steering angle Sa (the steering wheel operating angle θsw or the front wheel steering angle δfa), the steering angular velocity dSa (the steering wheel operation angular velocity dθsw or the front wheel steering angular velocity dδfa) and the yaw angular acceleration dYr. Then, in step SB150, the steering direction Dstr is calculated on the basis of the steering angle Sa. For example, the steering direction may be determined on the basis of the sign of the steering angle Sa. More specifically, in the case where the sign of the steering angle Sa is the positive sign (+), the steering direction is determined to correspond to the left-steering direction (which corresponds to the left-turn of the vehicle). On the other hand, in the case where the sign of the steering angle Sa is the negative sign (−), the steering direction is determined to correspond to the right-steering direction (which corresponds to the right-turn of the vehicle).

The start and/or the termination of the main control of the vehicle stabilizing control is determined through determination steps SB160, SB170 and SB180. More specifically, in step SB160, it is determined whether or not the main control is currently being executed. In a case where the main control is not currently being executed and a negative determination is concluded in step SB160 (i.e. No in SB160), the calculation process proceeds to step SB170. In step SB170, it is determined whether or not the start condition of the main control is satisfied. More specifically, the start of the main control is determined in the case where the first stat quantity Jos exceeds the predetermined value jos1. In a case where a positive determination of the start of the main control is concluded in step SB170 (i.e. Yes in SB170), the calculation process proceeds to step SB190 and the main control is started. In this case, if the preparatory control is being executed, the execution of the preparatory control is terminated and the main control is started. In the main control, the calculation result obtained by using the preliminarily set calculation map (see the main control calculating block BB61 in FIG. 14) is outputted as the main control target value Qmt**. On the other hand, in a case where the start of the main control is denied in step BS170 (i.e. No in SB170), the main control is not started and the process proceeds to step SB200.

In a case where the main control is being executed and a positive determination is concluded in step SB160 (i.e. Yes in SB180), the calculation process proceeds to step SB180. Then, in step SB160, it is determined whether or not the termination condition of the main control is satisfied. More specifically, the termination of the main control is determined in the case where the first state quantity Jos becomes equal to or smaller than the predetermined value jos1. In a case where the termination of the main control is determined in step SB180 (i.e. Yes in SB180), the main control is terminated in step SB240 and the main control target value Qmt** is set back to zero (0). On the other hand, in a case where the termination of the main control is denied in step SB180 (i.e. No in SB180), the calculation process proceeds to step SB190 and the main control is continued.

Alternatively, the start and/or the termination of the preparatory control is determined through determination steps SB200, SB210 and SB220. More specifically, in step SB200, it is determined whether or not the preparatory control is currently being executed. In a case where the preparatory control is not currently being executed and a negative determination is concluded in step SB200 (i.e. No in SB200), the calculation process proceeds to step SB210. In step SB210, it is determined whether or not the start condition of the preparatory control is satisfied. The start condition of the preparatory control will be described in more detail later. In a case where the start of the preparatory control is determined in step SB210 (i.e. Yes in SB210), the calculation process proceeds to step SB230 and the preparatory control is started. In the preparatory control, the preliminarily set predetermined value is outputted as the preparatory control target value Qpt**. When the preparatory control is executed, for example, the pad clearance is closed, thereby generating the auxiliary (preparatory) brake torque. Accordingly, the responsiveness of the brake actuator BRK is compensated. On the other hand, in a case where the start of the preparatory control is denied in step SB210 (i.e. No in SB210), the preparatory control is not started.

In a case where the preparatory control is being executed and a positive determination is concluded in step SB200 (i.e.

Yes in SB200), the calculation process proceeds to step SB220. In step SB220, it is determined whether or not the termination condition of the preparatory control is satisfied. The termination condition of the preparatory control will be described in more detail later. In a case where the termination of the preparatory control is determined in step SB220 (i.e. Yes in SB220), the preparatory control is terminated in step SB250 and the preparatory control target value Qpt is set back to zero (0). On the other hand, in a case where the termination of the preparatory control is denied in step SB220 (i.e. No in SB220), the calculation process proceeds to step SB230** and the preparatory control is continued.

Figure 16:
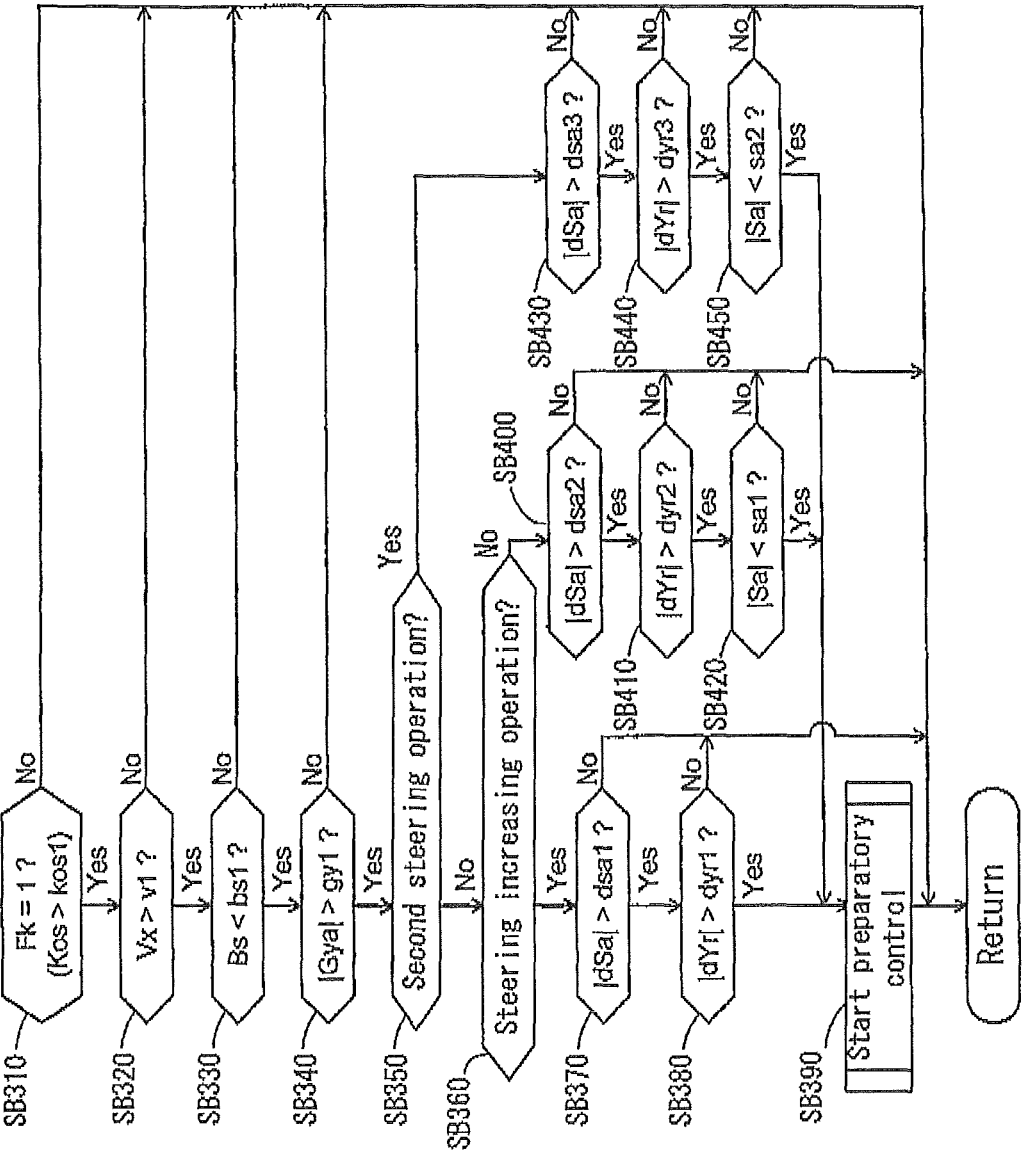
FIG. 16 is a control flowchart illustrating a processing example of a preparatory control start determination illustrated in FIG. 15 according to the second embodiment.

The preparatory control start determination step SB210 illustrated in FIG. 15 (which corresponds to the start determination calculating block of the preparatory control calculating block BB60 illustrated in FIG. 14) will be described below with reference to FIG. 16. The start determination of the preparatory control is executed to each wheel WH. Additionally, as mentioned above, when explaining the magnitude relation of values or when explaining the increase and decrease of the value in view of the steering directions and the turning direction, which are indicated by the plus and minus signs, the explanation may become too complicated. Therefore, values will be described (explained) on the basis of the magnitude relation of the absolute values or the increase and the decrease of the absolute value unless otherwise specified. Additionally, the predetermined value is set as a value with the plus sign (+). Furthermore, the symbols '' are used to comprehensively indicate wheels, specifically, 'fl' indicates the front-left wheel, 'fr' indicate the front-right wheel, 'rl' indicates the rear-left wheel, and 'rr' indicates the rear-right wheel.

In step SB310, it is determined whether or not the vehicle is in the oversteering tendency accompanying the abrupt yawing motion, on the basis of the read-in second control flag Fk. Furthermore, the start determination calculating block reads the second state quantity Kos, which is calculated on the basis of the property indicating the speed of the yawing motion, in order to determine whether or not the second state quantity Kos is greater than the predetermined value kos1. In a case where the vehicle is determined not to be in the abrupt oversteering state (i.e. in the case where the negative determination is concluded in step SB310 (i.e. No in SB310)), the preparatory control is not necessary. Therefore, in this case, the preparatory control is not started. On the other hand, in the case where the positive determination is concluded in step SB310 (i.e. Yes in SAB310), the calculation process proceeds to step SB320.

In step SB320, is it determined whether or not the vehicle speed Vx is greater than the predetermined value v1. In a case where the vehicle speed Vx is equal to or smaller than the predetermined value v1 and a negative determination is concluded in step SB320 (i.e. No in SB320), the preparatory control is not started. Generally, in the case where the vehicle speed is low, the abrupt yawing behavior is not likely to occur, therefore, the necessity of compensating the responsiveness of the brake actuator BRK is low. In a case where the vehicle speed Vx is greater than the predetermined value v1 and a positive determination is concluded in step SB320 (i.e. Yes in SB320), the calculation process proceeds to step SB330.

In step SB330, it is determined whether or not the driver performs the brake operation. More specifically, the determination of the brake operation is executed on the basis of the comparison result between the brake operation quantity Bs and the predetermined value bs1. In a case where the brake operation quantity Bs is equal to or greater than the predetermined value bs1 and the brake operating member BP is operated, a negative determination is concluded in step SB330 (i.e. No in SB330) and the preparatory control is not started, because the brake torque is already generated at the wheel WH while the driver performs the brake operation, therefore, the preparatory control is not necessary. On the other hand, in a case where the brake operation quantity Bs is smaller than the predetermined value bs1 (i.e. Bs<bs1) and a positive determination is concluded in step SB330 (i.e. Yes in SB330), the calculation process proceeds to step SB340**.

In step SB340, it is determined whether or not the degree (the absolute value) of the actual lateral acceleration Gya is greater than the predetermined value gy1. In a case where the actual lateral acceleration Gya is equal to or smaller than the predetermined value gy1 and a negative determination is concluded in step SB340 (i.e. No in SB340), the preparatory control is not started, because, generally, in the case where the actual lateral acceleration is low, the abrupt yawing behavior is less likely to occur, therefore, the necessity of compensating the responsiveness of the brake actuator is low. On the other hand, in a case where the degree (the absolute value) of the actual lateral acceleration Gya is greater than the predetermined value gy1 and a positive determination is concluded in step SB340 (i.e. Yes in SB340), the calculation process proceeds to step SB350.

In step SB350, it is determined whether or not the current steering operation corresponds to the "second steering operation". The "second steering operation" is a steering operation in which the steering operation is performed in first direction and then, immediately after, the steering operation is sequentially performed in the second direction opposite to the first direction. The determination of the "second steering operation" is executed on the basis of the steering direction Dstr. In a case where the steering operation is determined to correspond to the second steering operation and a positive determination is concluded in step SB350 (i.e. Yes in SB350), the calculation process proceeds to step SB430. On the other hand, in a case where a negative determination is concluded in step SB350 (i.e. No in SB350), the calculation process proceeds to step SB360.

In step SB360, it is determined whether or not the current steering operation corresponds to the "steering increasing" operation. The "steering increasing" operation is an operation of the steering apparatus performed in the direction away from the neutral direction. The determination of whether or not the operation of the steering wheel SW is the steering operation is executed on the basis of the steering angle Sa. In the case where the operation of the steering wheel SW is determined as the steering wheel, the degree (the absolute value) of the steering angle Sa increases. In a case where the operation of the steering wheel SW is determined as the "steering returning" operation (i.e. an operation of the steering apparatus in the direction towards the neutral position and the operation in which the degree (the absolute value) of the steering angle Sa decreases) and a negative determination is concluded in step SB360 (i.e. No in SB360), the calculation process proceeds to step SB400. On the other hand, in a case where the operation of the steering wheel SW is determined as the "steering increasing" operation and a positive determination is concluded in step SB360 (i.e. Yes in SB360), the calculation process proceeds to step SB370.

In step SB370, it is determined whether or not the degree (the absolute value) of the steering angular velocity dSa is greater than the predetermined value dsa1. In a case where the steering angular velocity dSa is equal to or smaller than the predetermined value dsa1 and a negative determination is concluded in step SB370 (i.e. No in SB370), the preparatory control is not started because, generally, in the case where the steering angular velocity dSa is low, the abrupt yawing behavior is less likely to occur, therefore, the necessity of compensating the responsiveness of the brake actuator BRK is low. On the other hand, in a case where the degree (the absolute value) of the steering angular velocity dSa is greater than the predetermined value dsa1 and a positive determination is concluded in step SB370 (i.e. Yes in SB370), the calculation process proceeds to step SB380.

In step SB380, it is determined whether or not the degree (the absolute value) of the yaw angular acceleration dYr is greater than the predetermined value dyr1. In a case where the yaw angular acceleration dYr is equal to or smaller than the predetermined value dyr1 and a negative determination is concluded in step SB380 (i.e. No in SB380), the preparatory control is not started because, generally, in the case where the yaw angular acceleration dYr is low, the abrupt yawing behavior does not occur at the vehicle. On the other hand, in a case where the degree (the absolute value) of the yaw angular acceleration dYr is greater than the predetermined value dyr1 and a positive determination is concluded in step SB380 (i.e. Yes in SB380), the calculation process proceeds to step SB390 and the preparatory control is started. In step SB390, the preliminarily set predetermined value pre1 is outputted to the adjustment calculating block BB62 as the preparatory control target value Qpt**.

In the case where the operation of the steering wheel SW is in the "steering returning" state (i.e. in the case where the degree of the steering angle Sa decreases in response to the steering angle Sa), the calculation process proceeds to step SB400 from step SB360.

In step SB400, it is determined whether or not the degree (the absolute value) of the steering angular velocity dSa is greater than the predetermined value dsa2. In a case where the steering angular velocity dSa is equal to or smaller than the predetermined value dsa2 and a negative determination is concluded in step SB400 (i.e. No in SB400), the preparatory control is not started because, generally, in the case where the steering angular velocity dSa is low, the abrupt yawing behavior is less likely to occur, therefore, the necessity of compensating the responsiveness of the brake actuator BRK is low. On the other hand, in a case where the degree (the absolute value) of the steering angular velocity dSa is greater than the predetermined value dsa2 and a positive determination is concluded in step SB400 (i.e. Yes in SB400), the calculation process proceeds to step SB410.

In step SB410, it is determined whether or not the degree (the absolute value) of the yaw angular acceleration dYr is greater than the predetermined value dyr2. In a case where the yaw angular acceleration dYr is equal to or smaller than the predetermined value dyr2 and a negative determination is concluded in step SB410 (i.e. No in SB410), the preparatory control is not started because, generally, in the case where the yaw angular acceleration dYr is low, the abrupt yawing behavior does not occur at the vehicle. On the other hand, in a case where the degree (the absolute value) of the yaw angular acceleration dYr is greater than the predetermined value dyr2 and a positive determination is concluded in step SB410 (i.e. Yes in SB410), the calculation process proceeds to step SB420.

In step SB420, it is determined whether or not the degree (the absolute value) of the steering angle Sa is smaller than the predetermined value sa1. In a case where the steering angle Sa is equal to or greater than the predetermined value sa1 and a negative determination is concluded in step SB420 (i.e. No in SB420), the preparatory control is not started. On the other hand, in a case where a positive determination is concluded in step SB420 (i.e. Yes in SB420), the calculation process proceeds to step SB390 and the preparatory control is started. In step SB390, in this case, the preliminarily set predetermined value pre2 is outputted to the adjustment calculating block BB62 as the preparatory control target value Qpt**.

In the case where the operation of the steering wheel SW is the second steering operation (i.e. in the case where the steering direction is determined to be sequentially changed from the first direction to the second direction on the basis of the steering direction Dstr), the calculation process proceeds to step SB430 from step SB350.

In step SB430, it is determined whether or not the degree (the absolute value) of the steering angular velocity dSa is greater than the predetermined value dsa3. In a case where the steering angular velocity dSa is equal to or smaller than the predetermined value dsa3 and a negative determination is concluded in step SB340 (i.e. No in SB430), the preparatory control is not started because, generally, in the case where the steering angular velocity dSa is low, the abrupt steering behavior is not likely to occur, therefore the necessity of compensating the responsiveness of the brake actuator BRK is low. On the other hand, in a case where the degree (the absolute value) of the steering angular velocity dSa is greater than the predetermined value dsa3 and a positive determination is concluded in step SA430 (i.e. Yes in SA430), the calculation process proceeds to step SB440.

In step SB440, it is determined whether or not the degree (the absolute value) of the yaw angular acceleration dYr is greater than the predetermined value dyr3. In a case where the yaw angular acceleration dYr is equal to or smaller than the predetermined value dyr3 and a negative determination is concluded in step SB440 (No in SB440), the preparatory control is not started because, generally, in the case where the yaw angular acceleration dYr is low, the abrupt yawing behavior does not occur. On the other hand, in a case where the degree (the absolute value) of the yaw angular acceleration dYr is greater than the predetermined value dyr3 and a positive determination is concluded in step SB440 (i.e. Yes in SB440), the calculation process proceeds to step SB450.

In step SB450, it is determined whether or not the degree (the absolute value) of the steering angle Sa is smaller than the predetermined value sa2. In a case where the steering angle Sa is equal to or greater than the predetermined value sa2 and a negative determination is concluded in step SB450 (No in SB450), the preparatory control is not started. On the other hand, in a case where a positive determination is concluded in step SB450 (i.e. Yes in SB450), the calculation process proceeds to step SB390 and the preparatory control is started. In step SB390, in this case, the preliminarily set predetermined value pre3 is outputted to the adjustment calculating block BB62 as the preparatory control target value Qpt**.

The above-mentioned predetermined values (the positive values) v1, bs1, gy1, dsa1, dsa2, dsa3, dyr1, dyr2, dyr3, sa1 and sa2 are threshold values for determining the start of the preparatory control (i.e. the preparatory control start determining threshold values). The predetermined values dsa1, dsa2 and dsa3 correspond to the first predetermined value. The predetermined value sa1 corresponds to the second predetermined value. The predetermined value sa2 corresponds to the third predetermined value. Furthermore, the predetermined values dyr1, dyr2 and dyr3 correspond to the fourth predetermined value. The device does not need to include all of the determination blocks. For example, one of more of the determination block may be omitted (removed from the device).

Figure 17:
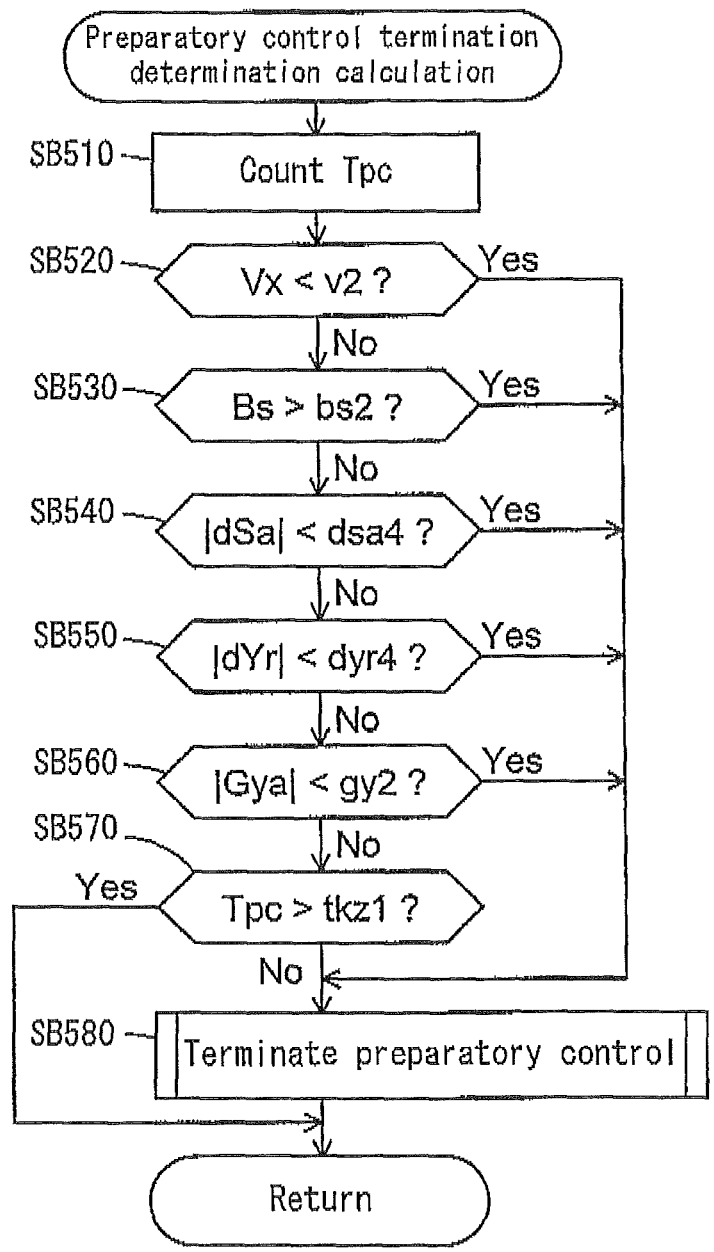
FIG. 17 is a control flowchart illustrating a processing example of a preparatory control termination determination illustrated in FIG. 15 according to the second embodiment.

The preparatory control termination determining step SB220 illustrated in FIG. 15 (which corresponds to the termination determination calculating block of the preparatory control calculating block BB60 in FIG. 14) will be described below with reference to FIG. 17. The termination determination of the preparatory control is executed for each wheel WH**.

In step SB510, the time during which the preparatory control is started and continued (i.e. the duration time Tpc) is counted. Then, in step SB520, it is determined whether or not the vehicle speed Vx is lower than the predetermined value v2 (<v1). In a case where the vehicle speed Vx is lower than the predetermined value v2 and a positive determination is concluded in step SB520 (i.e. Yes in SB520), the calculation process proceeds to step SB580. In step SB580, the preparatory control is terminated and the preparatory control target value Qpt** is returned to zero (0), because when the vehicle speed decreases, the abrupt yawing behavior is less likely to occur. On the other hand, in a case where the vehicle speed Vx is equal to or greater than the predetermined value v2 and a negative determination is concluded in step SB520 (i.e. No in SB520), the calculation process proceeds to step SB530.

In step SB530, it is determined whether or not the driver starts the brake operation after the preparatory control is started, on the basis of the brake operation quantity Bs. In a case where the driver starts the brake operation, the brake operation quantity Bs becomes greater than the predetermined value bs2 (>bs1) and where a positive determination is concluded in step SB530 (i.e. Yes in SB530), the calculation process proceeds to step SB580. On the other hand, in a case where the brake operation quantity Bs is equal to or smaller than the predetermined value bs2 and a negative determination is concluded in step SB530 (i.e. No in SB530), the calculation process proceeds to step SB540.

In step SB540, it is determined whether or not the degree of the steering angular velocity dSa is smaller than the predetermined value dsa4 (<dsa1, dsa2, dsa3). In a case where the degree of the steering angular velocity dSa is smaller than the predetermined value dsa4 and a positive determination is concluded in step SB540 (i.e. Yes in SB540), the calculation process proceeds to step SB580. In step SB580, the preparatory control is terminated because, generally, in the case where the steering angular velocity decreases, the abrupt yawing behavior is less likely to occur. On the other hand, in a case where the degree of the steering angular velocity dSa is equal to or greater than the predetermined value dsa4 and a negative determination is concluded in step SB540 (i.e. No in SB540), the calculation process proceeds to step SB550.

In step SB550, it is determined whether or not the degree of the yaw angular acceleration dYr is smaller than the predetermined value dyr4 (<dyr1, dyr2, dyr3). In a case where the degree of the yaw angular acceleration dYr is smaller than the predetermined value dyr4 and the abrupt yawing behavior has not yet been generated, a positive determination is concluded in step SB550 (i.e. Yes in SB550) and the calculation process proceeds to step SB580. On the other hand, in a case where the degree of the yaw angular acceleration dYr is equal to or greater than the predetermined value dyr4 and a negative determination is concluded in step SB550 (i.e. No in SB550), the calculation process proceeds to step SB560.

In step SB560, it is determined whether or not the degree of the actual lateral acceleration Gya is smaller than the predetermined value gy2 (<gy1). In a case where the degree of the actual lateral acceleration Gya is smaller than the predetermined value gy2 and a positive determination is concluded in step SB560 (i.e. Yes in SB560), the calculation process proceeds to step SB580. On the other hand, in a case where the degree of the actual lateral acceleration Gya is equal to or greater than the predetermined value gy2 and a negative determination is concluded in step SB560 (i.e. No in SB560), the calculation process proceeds to step SB570.

In step SB570, it is determined whether or not the duration time Tpc of the preparatory control is greater than the predetermined value tkz1. In a case where the duration time Tpc is greater than the predetermined value tkz1 and a positive determination is concluded in step SB570 (i.e. Yes in SB570), the calculation process proceeds to step SB580 and the preparatory control is terminated, because, generally, in the case where a predetermined amount of time has passed since the abrupt (rapid) steering operation had been performed, the vehicle stabilizing control is less likely to be started, therefore, the preparatory control may not be necessary. On the other hand, in a case where the duration time Tpc is equal to or smaller than the predetermined value tkz1 and a negative determination is concluded in step SB570 (i.e. No in SB570), the preparatory control is continued.

The above-mentioned predetermined values (the positive values) v2, bs2, gy2, dsa4, dyr4 and tkz1 are threshold values for determining the termination of the preparatory control (i.e. the preparatory control termination determining threshold values). The device does not need to include all of the above-mentioned determination blocks. For example, one or more of the determination block may be omitted (removed from the device).

Advantages and merits of the device according to the second embodiment will be explained below with reference to FIGS. 18 and 19. Generally, the drive may feel discomfort because of the drive noise of the actuator and the like while the preparatory control is being executed or because of the slight deceleration of the vehicle by the preparatory control. The preparatory control is likely to be necessary when the oversteering, which induces the abrupt yawing behavior, occurs. Hence, in this embodiment, in the case where the steering angular velocity dSa is great and the start of the vehicle stabilizing control (the main control) is expected, the oversteering tendency accompanying the abrupt yawing behavior is determined on the basis of the state quantity (the second state quantity Kos), which differs from the state quantity (the first state quantity Jos) used for executing the main control. The first state quantity Jos is calculated on the basis of the interrelation between the state quantity that indicates the magnitude (the size) of the yawing motion and the state quantity that indicates the speed of the yawing motion. The state quantity indicating the magnitude (degree) of the yawing motion is the property that includes the actual (vehicle body) sideslip angle βa of the vehicle. Furthermore, the state quantity indicating the magnitude of the yawing motion is the value calculated on the basis of at least one of the sideslip angle deviation Δβ and the actual sideslip angle βa. The state quantity indicating the speed of the yawing motion is the property that includes the actual yaw rate Yra. Furthermore, the state quantity indicating the speed (velocity) of the yawing motion is the value calculated on the basis of at least one of the yaw rate deviation ΔYr and the sideslip angular velocity dβa. Therefore, the sideslip angle term is included in the calculation of the first state quantity Jos, and the relatively gradual oversteering tendency may also be recognized. On the other hand, the second state quantity Kos is calculated on the basis of the state quantity indicating the speed of the yawing motion. Therefore, only the raw rate term is included in the calculation of the second state quantity Kos without using the sideslip angle term. Accordingly, the oversteering tendency accompanying the yawing behavior, which is relatively faster than the oversteering tendency recognized by using the first state quantity Jos, may be recognized. As a result, the rapid increase of the oversteering tendency may be determined at the early stage by using the second state quantity Kos, so that the execution of the preparatory control is promptly started. Additionally, the predetermined values dsa1, dsa2 and dsa3 correspond to the first predetermined value. The predetermined sa1 corresponds to the second predetermined value. The predetermined value sat corresponds to the third predetermined value. Furthermore, the predetermined values dyr1, dyr2 and dyr3 correspond to the fourth predetermined values.

Advantages and merits to be obtained in a case where the J-turn steering operation is performed will be described with reference to FIG. 18. In this case, the sudden steering operation in the first direction (e.g. in the left direction) is started at time u0 and the steering angle Sa rapidly increases. The steering angular velocity dSa is obtained by the steering angular velocity obtaining means BB50 and the degree (the absolute value) of the steering angular velocity dSa is compared with the predetermined value dsa1 at the control means BB60. The steering angular velocity dSa may be calculated on the basis of the steering angle Sa. Then, the control flag Fdsa indicating the comparison result is set on the preparatory control calculating block BB60. In the case where the steering angular velocity dSa is equal to or smaller than the predetermined value dsa1, zero (0) is outputted to the adjustment calculating block BB62 as the control flag Fdsa. On the other hand, in the case where the steering angular velocity dSa is greater than the predetermined value dsa1, one (1) is outputted to the adjustment calculating block BB62 as the control flag Fdsa. In the case illustrated in FIG. 18, the condition of the steering angular velocity dSa being greater than the predetermined value dsa1 (i.e. dSa>dsa1) is satisfied at time u1.

The second state quantity Kos and the predetermined value kos1 are compared in order to output the second control flag Fk, which indicates the comparison result. In the case where the second state quantity Kos is equal to or smaller than the predetermined value kos1, zero (0) is outputted to the preparatory control calculating block BB60 as the second control flag Fk. On the other hand, in the case where the second state quantity Kos is greater than the predetermined value kos1, one (1) is outputted to the preparatory control calculating block BB60 as the second control flag Fk. In the case illustrated in FIG. 18, the condition where the second state quantity Kos being greater than the predetermined value kos1 (i.e. Kos>kos1) is satisfied at time u2, and the oversteering tendency accompanying the abrupt yawing motion is recognized. In the case where the condition where the steering angular velocity dSa being greater than the predetermined value dsa1 (i.e. dSa>dsa1 (Fdsa=1)) and the second state quantity Kos being greater than the predetermined value kos1 (i.e. Kos>kosa1 (Fk=1)) is satisfied (i.e. time u2), the preparatory control is started. Accordingly, the target value Qptfr of the preparatory control (=the final target value Pwtfr=the predetermined value pre1) is outputted to the turning outer front wheel, so that the actual brake torque Pwafr is increased.

Figure 18:
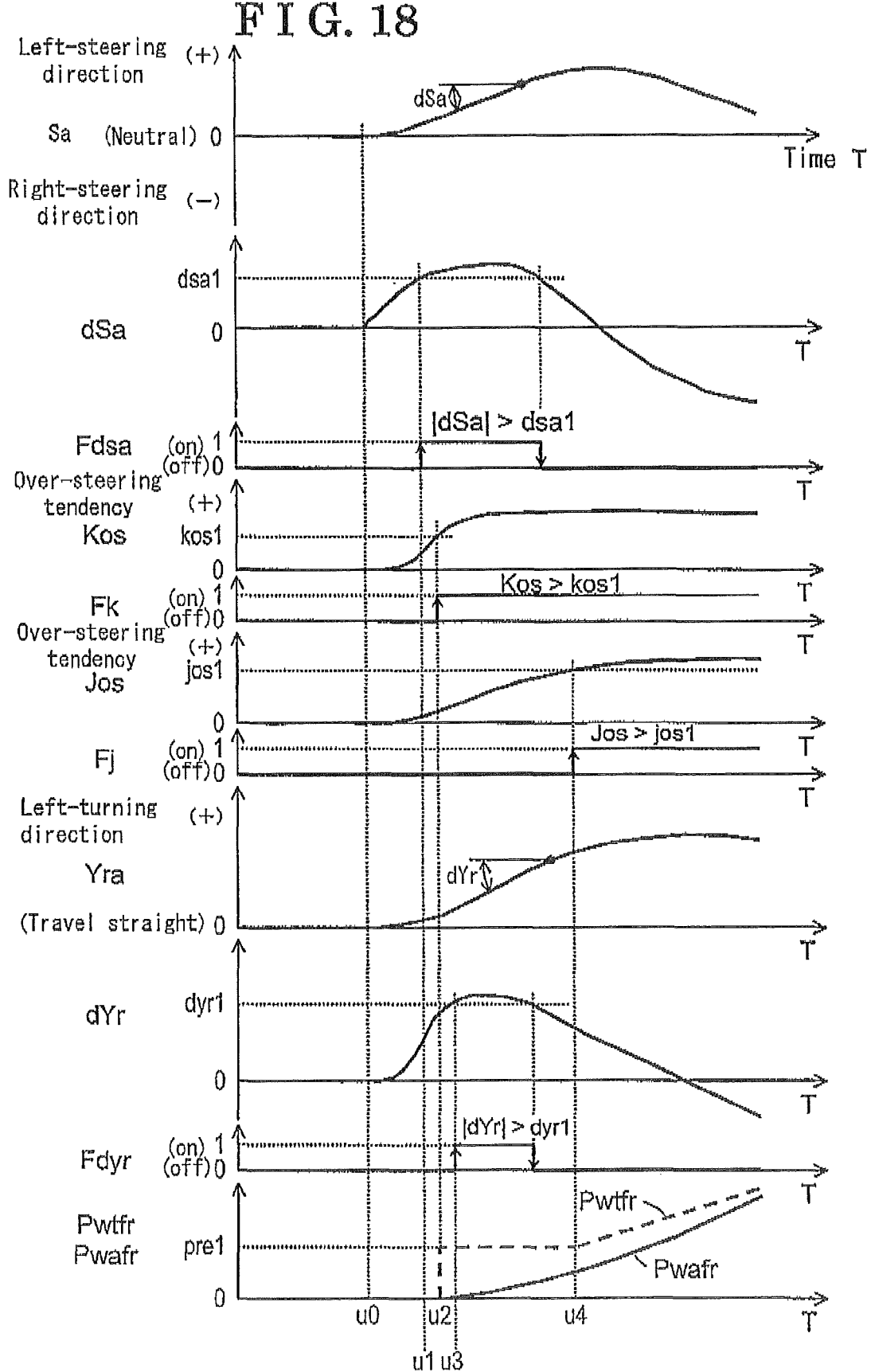
FIG. 18 is a diagram for explaining advantages and merits according to the second embodiment to be obtained in the case where the J-turn steering operation is performed.
Figure 19:
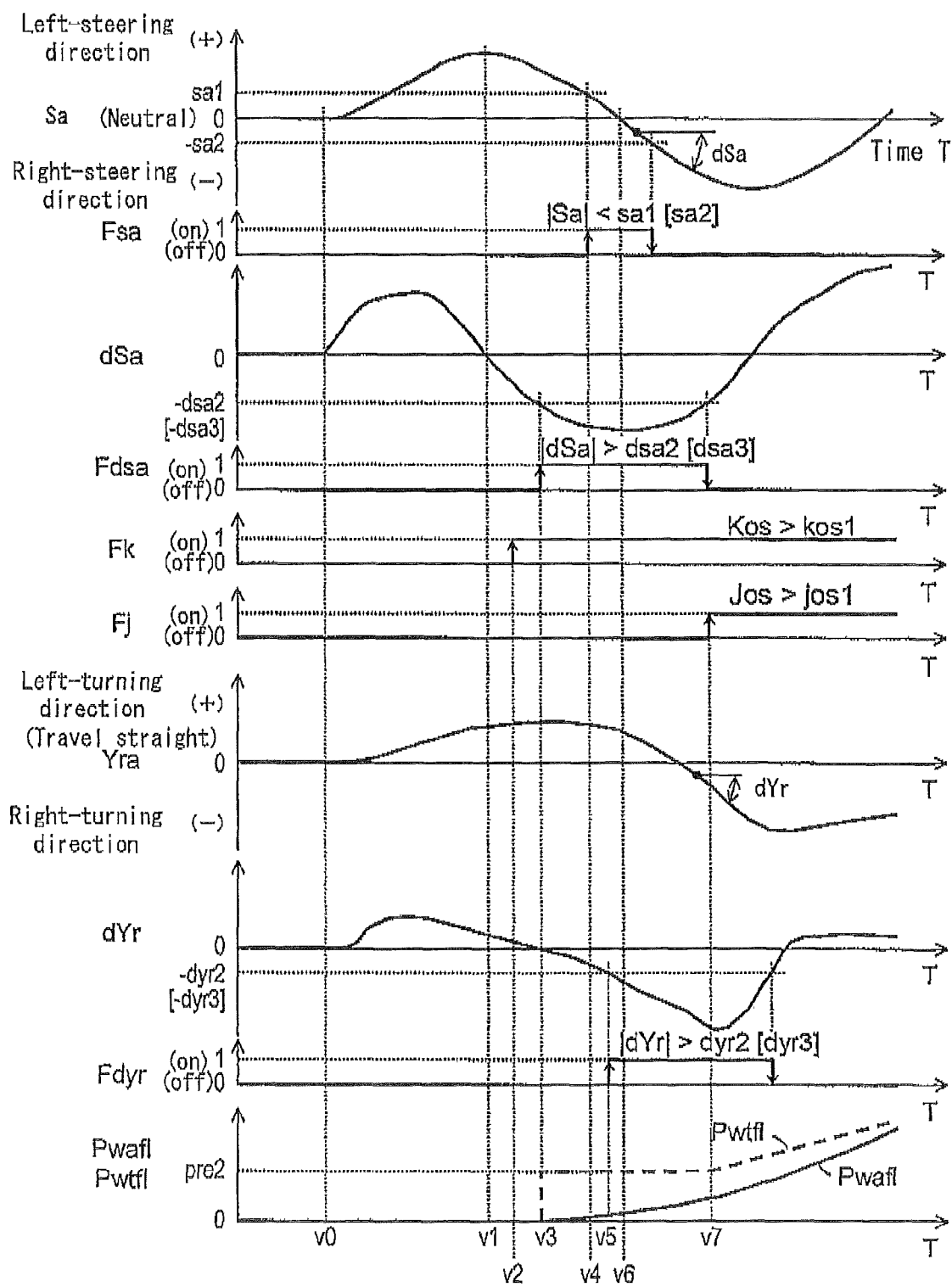
FIG. 19 is a diagram for explaining advantages and merits according to the second embodiment to be obtained in the case where the lane-change steering operation is performed.
Figure 20:
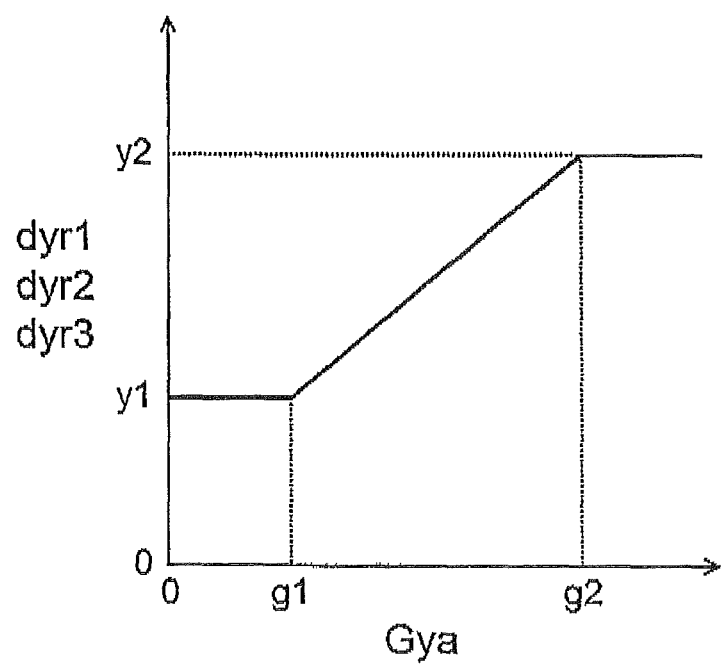
FIG. 20 is a diagram illustrating an example of a map for calculating a threshold value (a fourth predetermined value) used for determining a start of the preparatory control on the basis of the actual lateral acceleration according to the second embodiment.

In the case illustrated in FIG. 18, the main control of the vehicle stabilizing control based on the first state quantity Jos is started at time u4. The main control may need to be configured so as to respond to the gradual oversteering tendency. On the other hand, it may be sufficient as long as the preparatory control is configured so as to respond to the oversteering tendency accompanying the fast yawing motion. Accordingly, in this embodiment, the preparatory control may be stated earlier by recognizing the oversteering tendency accompanying the fast yawing motion on the basis of the second state quantity Kos, which differs from the first state quantity Jos.

The yaw angular acceleration dYr is obtained by the yaw angular acceleration obtaining means BB90. Then, the degree of the yaw angular acceleration dYr corresponding to the steering angular acceleration dSa is compared with the predetermined value dyr1. The "degree of the yaw angular acceleration dYr corresponding to the steering angular velocity dSa" indicates the absolute value of the yaw angular acceleration dYr to be obtained in the case where the sign of the steering angular velocity dSa corresponds to the sign of the yaw angular acceleration dYr. The yaw angular acceleration dYr may be calculated on the basis of the yaw rate Yra. Furthermore, the control flag Fdyr indicating the comparison result may be set. More specifically, in the case where the yaw angular acceleration dYr is equal to or smaller than the predetermined value dyr1, zero (0) is outputted to the adjustment calculating block BB62 as the control flag Fdyr. On the other hand, in the case where the yaw angular acceleration dYr is greater than the predetermined value dyr1, one (1) is outputted to the adjustment calculating block BB62 as the control flag Fdyr. The preparatory control may be started at least when the condition where the control flag Fdsa being one (1) (i.e. Fdsa=1), the control flag Fk being one (1) (i.e. Fk=1) and the yaw angular acceleration dYr being greater than the predetermined value (i.e. dYr>dyr1 (Fdyr=1)) is satisfied (time u3). In the case where the understeering tendency occurs at the vehicle, the yaw angular acceleration dYr does not increase that much. Accordingly, because the yaw angular acceleration dYr is taken into consideration in the start of the preparatory control, the preparatory control may be executed with higher accuracy.

The actual lateral acceleration Gya is obtained by the actual turning state quantity obtaining means BB20 in order to compare the degree of the actual lateral acceleration Gya with the predetermined value gy1. The control flag Fgy indicating the comparison result may be set. More specifically, in the case where the actual lateral acceleration Gya is equal to or smaller than the predetermined value gy1, zero (0) is outputted to the adjustment calculating block BB62 as the control flag Fgy. On the other hand, in the case where the actual lateral acceleration Gya is greater than the predetermined value gy1, one (1) is outputted to the adjustment calculating block BB62 as the control flag Fgy. The preparatory control may be started at least when the condition of the control flag Fdsa being one (1) (i.e. Fdsa=1), the control flag Fk being one (1) (i.e. Fk=1) and the actual lateral acceleration Gya being greater than the predetermined value gy1 (i.e. Gya>gy1 (Fgy=1)) is satisfied. Generally, the abrupt yawing behavior is likely to occur while the vehicle travels on the road surface having the relatively high friction coefficient. Therefore, in this embodiment, the condition relating to the lateral acceleration is added to the start determination of the preparatory control, so that the preparatory control having a higher accuracy may be executed.

Advantages and merits to be obtained in the case where the lane-change steering operation (i.e. the transitional steering operation) is performed will be described below with reference to FIG. 19. In this case, it is assumed that the steering wheel SW is rapidly and suddenly steered in the left direction at time v0 and then, the steering wheel SW is sequentially steered in the right direction at time v6. The lane-change steering operation will be described mainly with the determination of the steering returning operation in the first steering operation and the steering operation in the second steering operation will be indicated within the square brackets.

Firstly, the steering angular velocity dSa is obtained by the steering angular velocity obtaining means BB50 and then, the degree of the steering angular velocity dSa is compared with the predetermined value dsa2 [the predetermined value dsa3] at the control means BB60. As is the case with the above-mentioned case, the steering angular velocity dSa may be calculated on the basis of the steering angle Sa. Then, the control flag Fdsa indicating a comparison result may be set on the preparatory control calculating block BB60. In the case where the steering angular velocity dSa is equal to or smaller than the predetermined value dsa2 [the predetermined value dsa3], zero (0) is outputted to the adjustment calculating block BB62 as the control flag Fdsa. On the other hand, in the case where the steering angular velocity dSa is greater than the predetermined value dsa2 [the predetermined value dsa3], one (1) is outputted to the adjustment calculating block BB62 as the control flag Fdsa. In the case illustrated in FIG. 19, the condition of the steering angular velocity dSa being greater than the predetermined value dsa2 [the predetermined value dsa3] (dSa>dsa2 [dSa>dsa3]) is satisfied at time v3 [time v6].

The second state quantity Kos is calculated at the second state quantity calculating block BB41, and the second state quantity Kos is compared with the predetermined value kos1 at the second determination calculating block BB42. Then, the second control flag Fk indicating the comparison result is outputted to the preparatory control calculating block BB60. More specifically, in the case where the second state quantity Kos is equal to or smaller than the predetermined value kos1, zero (0) is outputted to the preparatory control calculating block BB60 as the second control flag Fk. On the other hand, in the case where the second state quantity Kos is greater than the predetermined value kos1, one (1) is outputted to the preparatory control calculating block BB60 as the second control flag Fk. When the condition of the second state quantity Kos being greater than the predetermined value kos1 (Kos>kos1) is satisfied at time v2, the oversteering tendency accompanying the abrupt yawing motion is recognized. Then, the preparatory control is started when the condition of the steering angular velocity dSa being greater than the predetermined value dsa2 [the predetermined value dsa3] (i.e. dSa>dsa2 [dsa3], Fdsa=1) and the second state quantity Kos being greater than the predetermined value kos1 (i.e. Kos>kosa1 (Fg=1)) is satisfied (time v3 [time v6]). In this case, the target value Qptfl of the preparatory control (=the final target value Pwtfl=the predetermined value pre2 [the predetermined value re3]) is outputted to the turning outer front wheel while the second steering operation is performed, so that the actual brake torque Pwafl is increased. Accordingly, the oversteering behavior accompanying the rapid yawing changes may be recognized before the main control of the vehicle stabilizing control is started on the basis of the first state quantity Jos (e.g. the main control is started at time v7). As a result, because the preparatory control is started earlier, the responsiveness of the brake actuator BKR may be effectively and properly compensated.

The yaw angular acceleration dYr may be obtained by the yaw angular acceleration obtaining means BB90 in order to compare the degree (the absolute value) of the yaw angular acceleration dYr corresponding to the steering angular velocity dSa with the predetermined value dyr2 [the predetermined value dyr3]. As is described above, the "degree of the yaw angular acceleration dYr corresponding to the steering angular velocity dSa" indicates the absolute value of the yaw angular acceleration dYr to be obtained in the case where the sign of the steering angular velocity dSa corresponds to the sign of the yaw angular acceleration dYr. Furthermore, the yaw angular acceleration dYr may be calculated on the basis of the yaw rate Yra. The control flag Fdyr indicating the comparison result may be set. More specifically, in the case where the yaw angular acceleration dYr is equal to or smaller than the predetermined value dyr2 [the predetermined value dyr3], zero (0) is outputted to the preparatory control calculating block BB60 as the control flag Fdyr. On the other hand, in the case where the yaw angular acceleration dYr is greater than the predetermined value dyr2 [the predetermined value dyr3], one (1) is outputted to the preparatory control calculating block BB60 as the control flag Fdyr. The preparatory control may be stared at least when the control flag Fdsa being one (1) (i.e. Fdsa=1), the control flag Fk being one (1) (i.e. Fk=1) and the yaw angular acceleration dYr being greater than the predetermined value dyr2 [the predetermined value dyr3] (i.e. dYr>dyr2 [dyr3], Fdyr=1) is satisfied. In other words, because the preparatory control is started after the abrupt changes in the yawing behavior (i.e. the changes in the yaw angular acceleration) are determined to occur in the same direction as the steering operation direction (i.e. when the direction of the steering angular velocity dSa corresponds to the direction of the yaw angular acceleration dYr), the preparatory control may be properly executed.

The steering angle Sa is obtained by the steering angle obtaining means BB70 and the degree (the absolute value) of the steering angle Sa is compared with the predetermined value sa1 [the predetermined value sa2]. Then, the control flag Fsa indicating the comparison result may be set. More specifically, in the case where the steering angle Sa is equal to or greater than the predetermined value sa1 [the predetermined value sa2], zero (0) is outputted to the preparatory control calculating block B 60 as the control flag Fsa. On the other hand, in the case where the steering angle Sa is smaller than the predetermined value sa1 [the predetermined value sa2], one (1) is outputted to the preparatory control calculating block BB60 as the control flag Fsa. The preparatory control may be started at least when the condition of the control flag Fdsa being one (1) (i.e. Fdsa=1), the control flag Fk being one (1) (i.e. Fk=1) and the steering angle Sa being greater than the predetermined value sa1 [the predetermined value sa2] (i.e. Sa>sa1 [sa2] (Fsa=1)) is satisfied. Generally, in a case where the second steering operation is not performed after the first steering operation is performed, the abrupt yawing behavior is less likely to occur. Therefore, in this embodiment, the degree of the steering angle is added to the starting condition of the preparatory control, so that the preparatory control is started when the second steering operation is expected to be certainly performed or immediately after the second steering operation is started.

The actual lateral acceleration Gya is obtained by the actual turning state quantity obtaining means BB20 and the degree (the absolute value) of the actual lateral acceleration Gya is compared with the predetermined value gy1. In this case, the control flag Fgy indicating the comparison result may be set. More specifically, in the case where the actual lateral acceleration Gya is equal to or smaller than the predetermined value gy1, zero (0) is outputted to the preparatory control calculating block BB60 as the control flag Fgy. On the other hand, in the case where the actual lateral acceleration Gya is greater than the predetermined value gy1, one (1) is outputted to the preparatory control calculating block BB60 as the control flag Fgy. The preparatory control may be started at least when the condition of the control flag Fdsa being one (1) (i.e. Fdsa=1), the control flag Fk being one (1) (i.e. Fk=1) and the actual lateral acceleration Gya being greater than the predetermined value gy1 (i.e. Gya>gy1 (Fgy=1)) is satisfied. As is the case where the J-turn steering operation is performed, generally, the abrupt yawing behavior is likely to occur when the vehicle travels on the road surface having relatively high friction coefficient. Therefore, in this embodiment, the condition relating to the lateral acceleration is added to the start determination of the preparatory control. Accordingly, the preparatory control may be properly executed.

The same value may be used for at least one of the set of the predetermined values dsa2 and dsa3, the set of the predetermined values dyr2 and dyr3 and the set of the predetermined values sa1 and sa2.

The predetermined values dyr1, dyr2 and dyr3 are the preparatory control starting threshold values relating to the yaw angular acceleration dYr. At least one of the predetermined values dyr1, dyr2 and dyr3 may be set on the basis of the actual lateral acceleration Gya. More specifically, at least one of the predetermined values dyr1, dyr2 and dyr3 may be set on the basis of a calculation map that specifies the characteristic of at least one of the predetermined values dyr1, dyr2 and dyr3 to be set as the predetermined value y1 in the case where the actual lateral acceleration Gya falls within the range between zero (0) and the predetermined value g1 (including zero (0) but not including the predetermined value g1), so as to increase in response to the increase of the actual lateral acceleration Gya in the case where the actual lateral acceleration falls within the range between the predetermined value g1 and the predetermined value g2 (>g1) (including the predetermined value g1 but not including the predetermined valued g2), and so as to be set as the predetermined value y2 (>y1) in the case where the actual lateral acceleration Gya is equal to or greater than the predetermined value g2. The friction coefficient of the road surface is reflected in the actual lateral acceleration Gya. Accordingly, because at least one of the predetermined values dyr1, dyr2 and dyr3 is set on the basis of the actual lateral acceleration Gya, the preparatory control in accord with the road surface condition may be executed.

The motion control device for the vehicle according to the second embodiment includes the steering angle obtaining means BB70 for obtaining the steering angle Sa of the vehicle. The control means BB60 is configured so as to apply the brake torque to the wheel WH** in the case where (the degree of) the steering angle Sa decreases and where (the degree of) the steering angle Sa is smaller than the second predetermined value (i.e. the predetermined value sa1). Additionally, the steering angular velocity obtaining means BB50 may be configured so as to calculate the steering angular velocity dSa on the basis of the steering angle Sa, which is obtained by the steering angle obtaining means BB70.

The motion control device for the vehicle according to the second embodiment includes the steering direction determining means BB80 for determining whether the steering direction Dstr of the vehicle corresponds to the first direction or the second direction (which is opposite from the first direction) on the basis of the steering angle Sa, which is obtained by the steering angle obtaining means BB70. The first direction (the one direction) is one of the left direction and the right direction, and the second direction (the other direction) is the other one of the left direction and the right direction. In this case, the control means BB60 may be configured so as to apply the brake torque to the wheel WH** in the case where the steering direction determining means BB80 determines that the steering direction Dstr corresponds to the first direction and then, the steering direction determining means BB80 sequentially determines that the steering direction Dstr corresponds to the second direction, (the degree of) the steering angle Sa increases and where (the degree of) the steering angle Sa is smaller than the third predetermined value (i.e. the predetermined value sa2).

[Third Embodiment]

A third embodiment of a motion control device for a vehicle will be described below with reference to the attached drawings. Illustrated in FIG. 21 is an entire configuration example of the motion control device for the vehicle according to the third embodiment.

Figure 21:
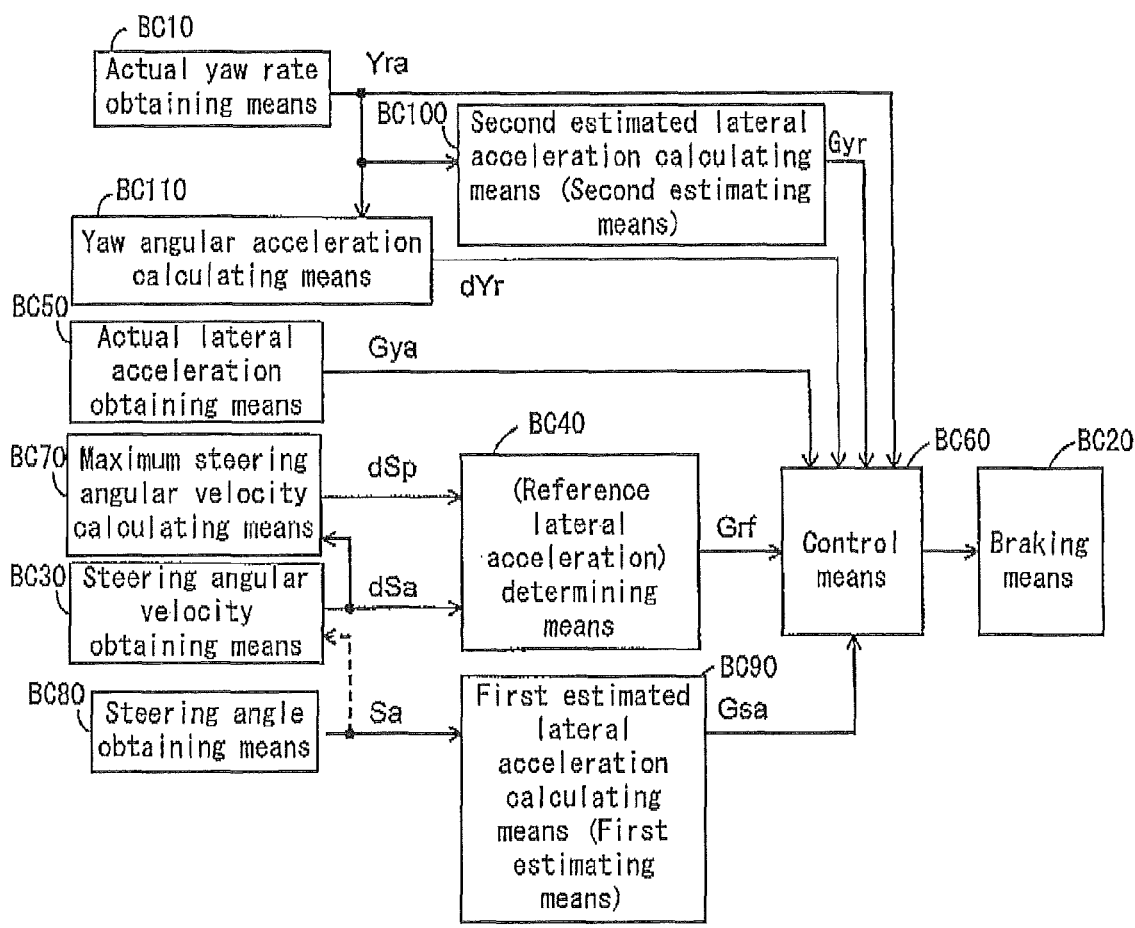
FIG. 21 is a diagram illustrating an entire configuration of a motion control device for a vehicle according to a third embodiment.

As illustrated in FIG. 21, the motion control device for the vehicle (which will be hereinafter referred to as the device) includes an actual yaw rate obtaining means BC10 for obtaining the actual yaw rate Yra of the vehicle and a braking means BC20 for applying the brake torque to the wheel WH of the vehicle. The device maintains the traveling stability of the vehicle by controlling the brake torque, which is applied to the wheel WH, via the braking means BC20 on the basis of the actual yaw rate Yra. The device further includes a steering angular velocity obtaining means BC30 for obtaining the steering angular velocity dSa of the vehicle, a determining means BC40 for determining a reference lateral acceleration Grf (a reference value of the lateral acceleration) for applying the brake torque to the wheel WH on the basis of the steering angular velocity dSa, an actual lateral acceleration obtaining means BC50 for obtaining the actual lateral acceleration Gya (an actual value of the lateral acceleration) of the vehicle, and a control means BC60 for controlling the braking means BC20 in order to execute the supply of the brake torque to the wheel WH. The control means BC60 controls the braking means BC20 in order to start applying the brake torque to the wheel WH** in a case where (the degree of) the actual lateral acceleration Gya exceeds (a degree, a level of) the reference lateral acceleration Grf. The determining means BC40 determines the reference lateral acceleration Grf in a manner where the greater (the degree of) the steering angular velocity dSa is, the smaller value the reference lateral acceleration Grf is determined to be. Alternatively, the determining means BC40 determines the reference lateral acceleration Grd in a manner where the smaller (the degree of) the steering angular velocity dSa is, the greater value the reference lateral acceleration Grf is determined to be. In this embodiment, because the steering angular velocity dSa and the actual turning state quantity of the vehicle are taken into account in the start of the preparatory control, an unnecessary execution of the preparatory control may be avoided.

The device further includes a maximum steering angular velocity calculating means BC70 for calculating a maximum steering angular velocity dSp (a maximum value of the steering angular velocity) on the basis of the steering angular velocity dSa, which is obtained by the steering angular velocity obtaining means BC30. The maximum steering angular velocity calculating means BC70 stores the steering angular velocities dSa obtained up to a previous calculating processing, so that the maximum steering angular velocity calculating means BC70 calculates the maximum steering angular velocity dSp on the basis of the stored steering angular velocity dSa. More specifically, the maximum steering velocities dSp obtained up to the previous processing are memorized at the maximum steering angular velocity calculating means BC70 and the memorized maximum steering velocities dSp are compared with the steering angular velocity dSa obtained in the current processing. Then, either the stored maximum steering angular velocity dSp or the steering angular velocity dSa having a greater value is obtained as the maximum steering angular velocity dSp and is newly memorized as the maximum steering angular velocity dSp within the maximum steering angular velocity calculating means BC70. The determining means BC40 determines the reference lateral acceleration Grf on the basis of the maximum steering angular velocity dSp. More specifically, the determining means BC40 determines the reference lateral acceleration Grf in a manner where the greater (the degree of) the maximum steering angular velocity dSp is, the smaller value the reference lateral acceleration Grf is determined to be. Alternatively, the determining means BC40 determines the reference lateral acceleration Grf in a manner where the smaller (the degree of) the maximum steering angular velocity dSp is, the greater value the reference lateral acceleration Grf is determined to be. As is the case with the above-mentioned case, a gap (a difference) between a timing when a maximum value of the actual lateral acceleration Gya is generated and a timing when the maximum value (i.e. a peak value) of the steering angular velocity dSa is generated may be compensated (reduced).

The device further includes a steering angle obtaining means BC80 for obtaining the steering angle Sa of the vehicle and a first estimated lateral acceleration calculating means BC90 (which serves as a first estimating means) for calculating a first estimated lateral acceleration Gsa (a first estimated value of the lateral acceleration) on the basis of the steering angle Sa. In this case, the determining means BC40 may be configured so as to apply the brake torque to the wheel WH in a case where the first estimated lateral acceleration Gsa exceeds the reference lateral acceleration Grf. The device further includes a second estimated lateral acceleration calculating means BC100 (which serves as a second estimating means) for calculating a second estimated lateral acceleration Gyr (a second estimated value of the lateral acceleration) on the basis of the actual yaw rate Yra. In this case, the determining means BC40 may be configured so as to apply the brake torque to the wheel WH in a case where the second estimated lateral acceleration Gyr exceeds the reference lateral acceleration Grf. Additionally, the steering angular velocity obtaining means BC30 may be configured so as to calculate the steering angular velocity dSa on the basis of the steering angle Sa, which is obtained by the steering angle obtaining means BC80. In this embodiment, because the start of the preparatory control is determined on the basis of plural actual turning state quantities Gya, Gsa and Gyr, a reliability in the execution of the preparatory control may be enhanced.

The device further includes a yaw angular acceleration calculating means BC110 for calculating the yaw angular acceleration dYr on the basis of the actual yaw rate Yra. The control means BC60 is configured so as to apply the brake torque to the wheel WH** when the yaw angular acceleration dYr exceeds the predetermined value dyr1. Accordingly, the unnecessary execution of the preparatory control may be avoided when the abrupt yawing motion does not occur.

The direction of the steering operation includes the right-steering direction and the left-steering direction. Furthermore, the turning direction of the vehicle includes the right-turning direction and the left-turning direction. Generally, those directions are indicated by the positive and negative signs (i.e. +, −). For example, the left-steering direction and the left-turning direction may be indicated by the positive sign while the right-steering direction and the right-turning direction may be indicated by the negative sign. When explaining the magnitude relation of values or when explaining the increase and decrease of the value in view of the steering directions and the turning direction, which are indicated by the plus and minus signs, the explanation may become too complicated. Therefore, values will be described (explained) on the basis of the magnitude relation of the absolute values or the increase and the decrease of the absolute value unless otherwise specified. Additionally, the predetermined value is set as a value with the plus sign (+).

Figure 22:
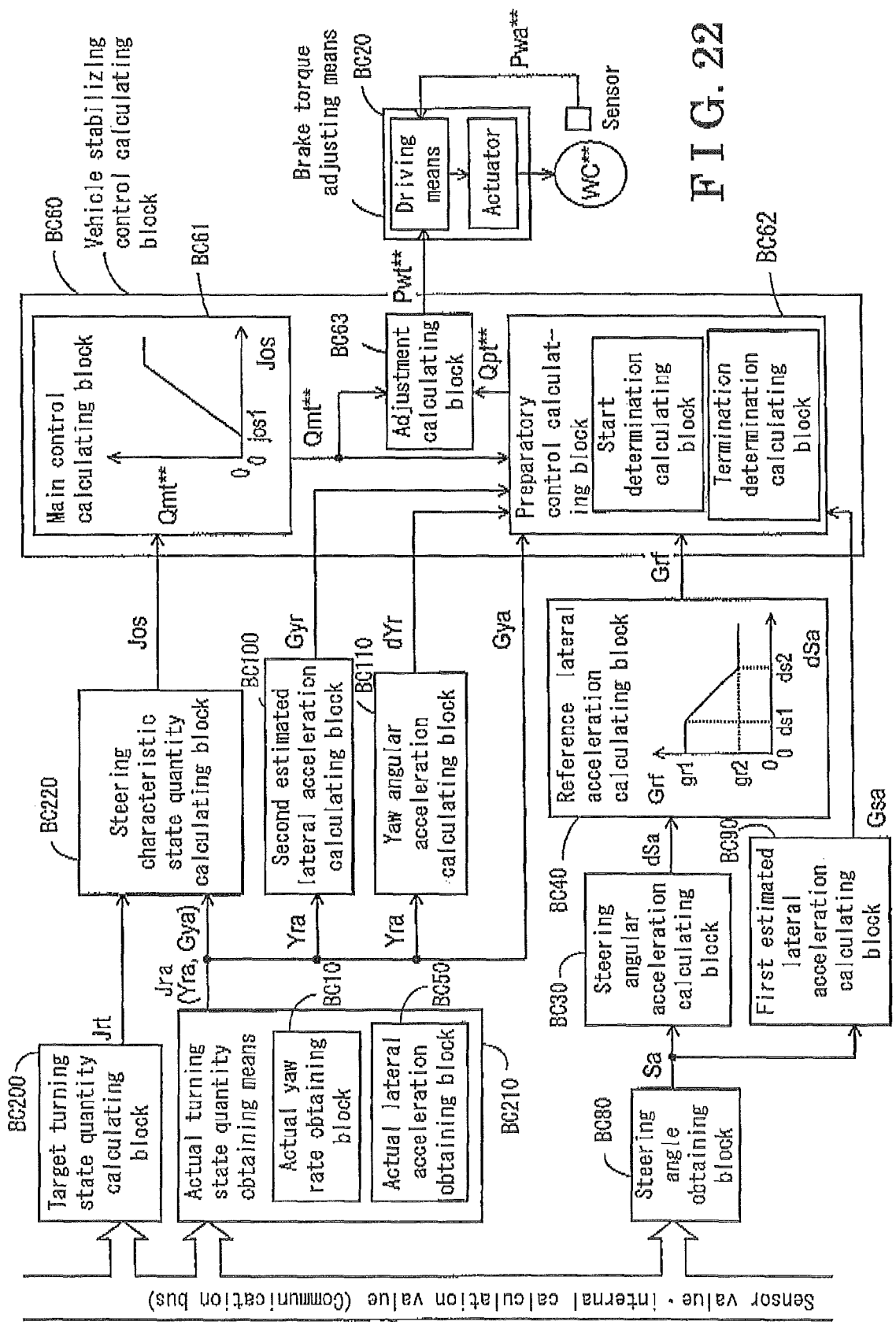
FIG. 22 is a functional block diagram illustrating a processing example of a motion control for the vehicle (a vehicle stabilizing control) according to the third embodiment.

Illustrated in FIG. 22 is a functional block diagram of a processing example of the motion control of the vehicle (the vehicle stabilizing control) according to the third embodiment. The vehicle having the motion control device for the vehicle (i.e. the device) according to the third embodiment has a similar configuration as the vehicle having the device according to the first embodiment (see FIG. 4). The vehicle stabilizing control includes the main control and the preparatory control. The main control is a control for restricting the understeering tendency of the vehicle and/or the oversteering tendency of the vehicle. The preparatory control is a control for assisting the main control. Furthermore, the preparatory control is a control that is executed before the main control is executed in order to compensate the responsiveness of the vehicle stabilizing control. Additionally, the functional block(s) having the identical reference numerals as the means in FIG. 21 has similar function as the corresponding means.

In a target turning state quantity calculating block BC200, the turning state quantity Jrt of the vehicle to be targeted (i.e. a target turning state quantity Jrt) is calculated by using a known method. The turning state quantity is a property indicating the turning state of the vehicle. More specifically, the turning state quantity is a value, which is calculated by using at least one of the yaw rate, the vehicle body sideslip angle (which is called simply as the sideslip angle) and the vehicle body sideslip angular velocity (which is called simply as the sideslip angular velocity). For example, the target yaw rate Yrt is calculated as the target turning state quantity Jrt on the basis of the vehicle speed Vx and the steering wheel angle θsw (or the front wheel steering angle δfa).

In an actual turning state quantity obtaining block BC210, the actual turning state quantity Jra corresponding to the target turning state quantity Jrt is obtained on the basis of the sensor value(s) and/or the internal calculation value(s) of other electronic control unit(s), which are obtained via the communication bus CB. The actual turning state quantity obtaining block BC210 includes an actual yaw rate obtaining block BC10 for obtaining the actual yaw rate Yra of the vehicle and an actual lateral acceleration obtaining block BC50 for obtaining the actual lateral acceleration Gya of the vehicle. For example, in the case where the target yaw rate is used as the target turning state quantity Jrt, the actual yaw rate Yra, which is detected by the yaw rate sensor YR, is obtained as the actual turning state quantity Jra. Furthermore, a state quantity (e.g. the actual sideslip angle βa) corresponding to the target turning state quantity Jrt may be calculated on the basis of the actual turning state quantity Jra.

In a steering characteristic state quantity calculating block BC220, a steering characteristic state quantity Jos, which indicates a degree of a steering characteristic of the vehicle (i.e. a characteristic of the oversteering and the understeering of the vehicle), is calculated on the basis of the target turning state quantity Jrt and the actual turning state quantity Jra. The steering characteristic state quantity Jos is a property indicating the degree of the oversteering tendency and/or the understeering tendency of the vehicle. In the steering characteristic state quantity calculating block BC220, the actual turning state quantity Jra is compared with the target turning state quantity Jrt, thereby obtaining the steering characteristic state quantity Jos. For example, the deviation (the difference) ΔYr between the actual yaw rate Yra and the target yaw rate Yrt (i.e. ΔYr=Yra−Yrt, the yaw rate deviation) may be calculated as the steering characteristic state quantity Jos. The steering characteristic state quantity Jos may be calculated based on interrelations with plural state quantities, instead of being calculated as a single (constant) state quantity. For example, the steering characteristic state quantity Jos may be calculated on the basis of the interrelations with the deviation Δβ between the actual sideslip angle βa and the target sideslip angle βt (i.e. Δβ=βa−βt, the sideslip angle deviation) and with the yaw rate deviation ΔYr (Jos=K1*Δβ+K2*ΔYr, where K1 and K2 are coefficients). In the case where the sideslip angle or the sideslip angular velocity is used as the turning state quantity, a target value of the turning state quantity may be set as a constant (e.g. zero (0)). Therefore, in the calculation of the steering characteristic state quantity Jos, the target turning state quantity Jrt (i.e. the target turning state quantity calculating block BC80) may be omitted. The steering characteristic state quantity Jos is inputted into the vehicle stabilizing control calculating block BC60.

In a yaw angular acceleration calculating block BC110, the actual yaw rate Yra, which is obtained at the actual yaw rate obtaining block BC10 (i.e. the actual turning state quantity obtaining block BC210), is differentiated by time in order to obtain the yaw angular acceleration dYr. Alternatively, the yaw angular acceleration dYr may be directly obtained from the sensor(s) and/or other electronic control unit(s) via the communication bus CB. In an actual lateral acceleration obtaining block BC50 (the actual turning state quantity obtaining block BC210), the actual lateral acceleration Gya is obtained. The yaw angular acceleration dYr and the actual lateral acceleration Gya are inputted into the vehicle stabilizing control calculating block BC60.

In a steering angle obtaining block BC80, the steering angle Sa is obtained on the basis of the sensor signal(s) and/or the internal calculation value(s) of other electronic control unit(s), which are obtained via the communication bus CB. The steering angle Sa is determined on the basis of at least one of the steering wheel angle θsw and the steering angle δfa of the steered wheels (i.e. the front wheels). In a steering angular velocity calculating block BC30, the steering angle Sa is differentiated by time in order to obtain the steering angular velocity dSa. More specifically, the steering angular velocity dSa is determined on the basis of at least one of the steering wheel angular velocity dθsw and the steered wheel steering angular velocity dδfa. Alternatively, the steering angular velocity dSa may be directly obtained from the sensor(s) and/or other electronic control unit(s) via the communication bus CB.

In a reference lateral acceleration calculating block BC40, the reference lateral acceleration Grf is calculated on the basis of the steering angular velocity dSa. More specifically, the reference lateral acceleration Grf is calculated by using a preliminarily set calculation map. The calculation map is set so as to specify the characteristic of the reference lateral acceleration Gft to be set as a predetermined value gr1 in a case where the steering angular velocity dSa is smaller than a predetermined value ds1, to decrease in response to the increase of the steering angular velocity dSa in a case where the steering angular velocity dSa is equal to or greater than the predetermined value ds1 but smaller than a predetermined value ds2 (>dw1), and to be set as a predetermined value gr2 (<gr1) in a case where the steering angular velocity dSa is equal to or greater than the predetermined value ds2.

In a first estimated lateral acceleration calculating block BC90, the first estimated lateral acceleration Gsa is calculated on the basis of the steering angle Sa. More specifically, the first estimated lateral acceleration Gsa is calculated by using an equation: Gsa=(Vx$^2$*Sa)/{L*(1+Kh*Vx$^2$)}, where L indicates a wheelbase of the vehicle and Kh indicates a stability factor, on the basis of the vehicle speed Vx obtained by the vehicle speed obtaining means and the steering angle Sa.

In a second estimated lateral acceleration calculating block BC100, the second estimated lateral acceleration Gyr is calculated on the basis of the actual yaw rate Yra, which is obtained at the actual yaw rate obtaining block BC10. More specifically, the second estimated lateral acceleration Gyr is calculated on the basis of the vehicle speed Vx and the actual yaw rate Yra, in other words, on the basis of an equation: Gyr=Yra*Vx.

In the vehicle stability control calculating block BC60, the target value Pwt of the brake torque to be applied to the wheel WH for maintaining the stability of the vehicle is calculated on the basis of the above-mentioned state quantity (e.g. the steering characteristic state quantity Jos and the like). Additionally, the steering characteristic state quantity Jos, the actual lateral acceleration Gya, the reference lateral acceleration Grf, the yaw angular acceleration dYr, the first estimated lateral acceleration Gsa and the second estimated lateral acceleration Gyr are inputted into the vehicle stabilizing control calculating block BC60.

The vehicle stabilizing control calculating block BC60 includes a main control calculating block BC61, a preparatory control calculating block BC62 and an adjustment calculating block BC63. In the main control calculating block BC61, the target value Qmt of the brake torque, which is applied to the wheel WH and which serves as a basis for stabilizing the vehicle (especially for restricting the oversteering tendency of the vehicle) (i.e. the main control target value Qmt), is calculated on the basis of the steering characteristic state quantity Jos. In the preparatory control calculating block BC62, a target value Qpt of the preparatory (auxiliary) brake torque for compensating the responsiveness of the brake actuator BRK (i.e. the preparatory control target value Qpt) is calculated. Then, in the adjustment calculating block BC63, the main control target value Qmt and the preparatory control target value Qpt are adjusted in order to obtain the final target value Pwt of the brake torque (i.e. the final target value Pwt**). Additionally, the vehicle speed Vx and the brake operation quantity Bs are inputted into the vehicle stabilizing control calculating block BC60.

In the main control calculating block BC61, the main control target value Qmt, which serves as the basis in the vehicle stabilizing control, is calculated on the basis of the steering characteristic state quantity Jos by using a preliminarily set calculation map. The calculation map is set so as to specify the characteristic of the main control target value Qmt to be set as zero (0) in the case where the steering characteristic state quantity Jos is smaller than the predetermined value jos1 (the threshold value) and so as to increase from zero (0) in response to the increase of the steering characteristic state quantity Jos in the case where the steering characteristic state quantity Jos is equal to or greater than the predetermined value Jos1. The predetermined value jos1 is a staring condition of the main control of the vehicle stabilizing control (i.e. the condition for staring the supply of the brake torque). The main control target value Qmt** is inputted into the preparatory control calculating block BC62.

In the preparatory control calculating block BC62, the preparatory control target value Qpt is calculated in order to advance the start of the supply of the brake torque to the wheel WH by the main control, so that the responsiveness of the brake actuator BRK is compensated. The preparatory control calculating block BC62 includes a start determination calculating block and a termination determination calculating block. Additionally, the reference lateral acceleration Grf, the actual lateral acceleration Gya, the first and second estimated lateral accelerations Gsa and Gyr and the yaw angular acceleration dYr are inputted into the preparatory control calculating block BC62. The preparatory control will be described in more detail later.

In the adjustment calculating block CB63, the final target value Pwt is calculated on the basis of the main control target value Qmt and the preparatory control target value Qpt. More specifically, either the main control target value Qmt or the preparatory control value Qpt having a greater value is selected in order to obtain the final target value Pwt. Alternatively, the final target value Pwt may be calculated by adding the preparatory control target value Qpt to the main control target value Qmt. Each of the main control target value Qmt, the preparatory control target value Qpt and the final target value Pwt may be calculated as a value of either the wheel braking force, the brake torque, the brake hydraulic pressure, the longitudinal slip, the wheel speed and the thrust force of the brake pad PD**.

The preparatory control may become necessary in the case where the abrupt yawing motion occurs. Therefore, the vehicle stability control calculating block BC60 may be configured so as not to execute the preparatory control in the case where the understeering tendency of the vehicle is detected and so as to execute the preparatory control only in the case where the oversteering tendency of the vehicle is detected.

In the brake torque adjusting means BC20(which corresponds to the braking means), the driving means of the brake actuator BRK (e.g. the electric motor for the hydraulic pump, the driving means of the solenoid valve and the like) is controlled on the basis of the final target value Pwt of the brake torque. More specifically, because the sensor (e.g. the pressure sensor PW) for detecting the actual value Pwa of the brake torque corresponding to the target value Pwt is provided at the wheel WH, the driving means may be controlled so that the actual value Pwa coincides with the target value Pwt on the basis of the target value Pwt and the actual value Pwa**.

Figure 23:
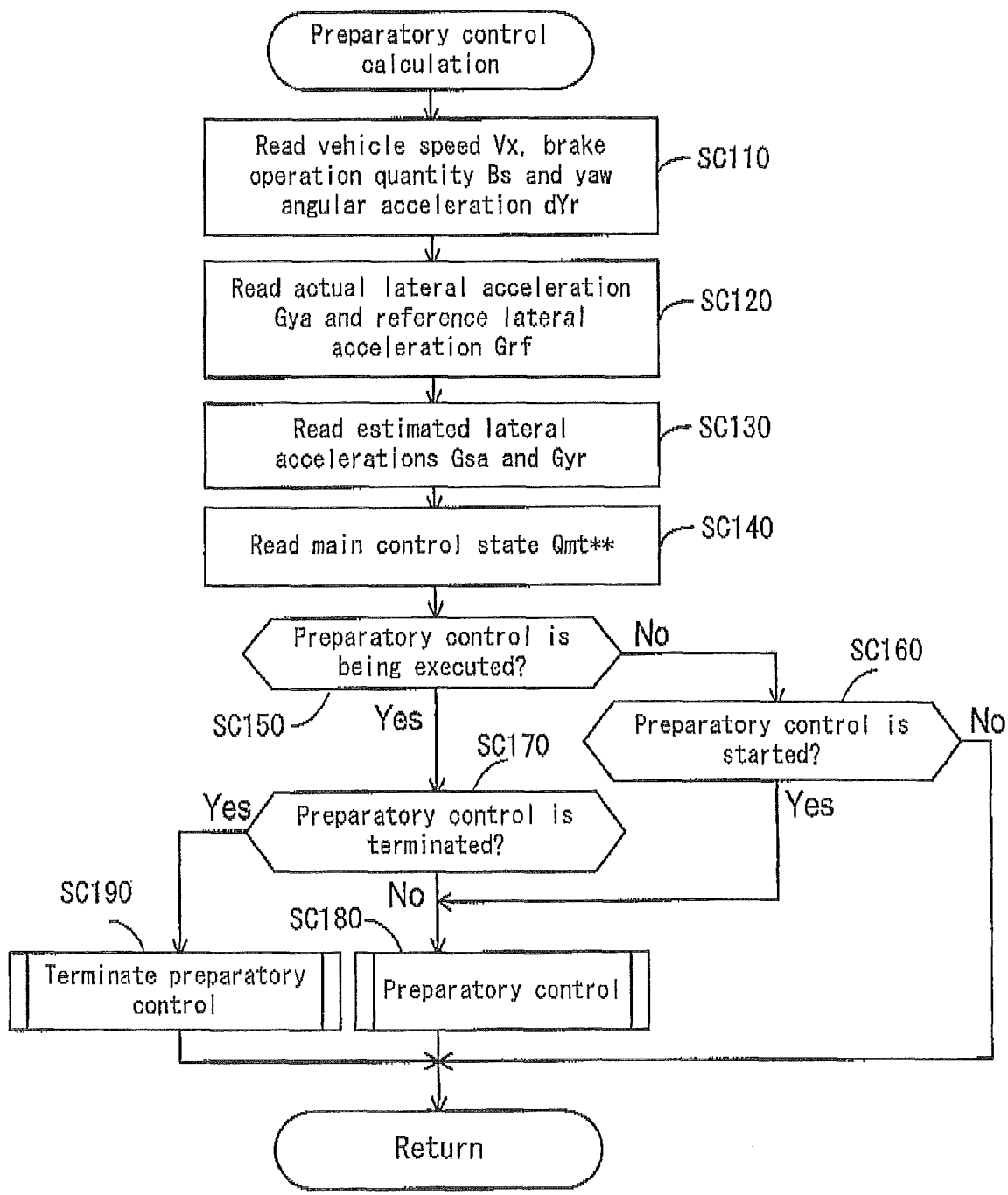
FIG. 23 is a control flowchart illustrating a processing example of the preparatory control calculation illustrated in FIG. 22 according to the third embodiment.

The preparatory control calculating block BC62 illustrated in FIG. 22 will be described below with reference to FIG. 23.

Firstly, in step SC110, the preparatory control calculating block BC62 reads the vehicle speed Vx, the brake operation quantity Bs and the yaw angular acceleration dYr. In step S120, the preparatory control calculating block BC62 reads the actual lateral acceleration Gya (i.e. the actual value of the lateral acceleration) and the reference lateral acceleration Grf (i.e. the reference value of the lateral acceleration). In step SC130, the preparatory control calculating block BC62 reads the first estimated lateral acceleration Gsa, which is obtained (estimated) on the basis of the steering angle Sa, and the second estimated lateral acceleration Gyr, which is obtained (estimated) on the basis of the actual yaw rate Yra. Furthermore, in step SC140, the preparatory control calculating block BC62 reads the control state Qmt of the main control of the vehicle stabilizing control. More specifically, in step SC140, information such as whether or not the main control has already been started, and how much the brake torque is applied to which wheel WH in the case where the main control has already been started, and the like are inputted into the preparatory control calculating block BC62.

Then, the start and/or the termination of the preparatory control is determined through determination steps SC150, SC160 and SC170. More specifically, in step SC150, it is determined whether or not the preparatory control is currently being executed. In a case where the preparatory control is not executed and a negative determination is concluded in step SC150 (i.e. No in SC150), the calculation process proceeds to step SC160. In step SC160, it is determined whether or not the starting condition of the preparatory control is satisfied. The starting condition of the preparatory control will be described in more detail later. In a case where the start of the preparatory control is determined in step SC160 (i.e. Yes in SC160), the calculation process proceeds to step SC180 and the preparatory control is started. In this case, the preliminarily set predetermined value pre1 is outputted to the adjustment calculating block BC63 as the preparatory control target value Qpt** in the preparatory control. When the preparatory control is executed, for example, the pad clearance is closed, thereby generating the preparatory (auxiliary) brake torque. Accordingly, the responsiveness of the brake actuator BRK is compensated. On the other hand, in a case where the start of the preparatory control is denied in step SC160 (i.e. No in SC160), the preparatory control is not started.

In a case where the preparatory control is being executed and a positive determination is concluded in step SC150 (i.e. Yes in SC150), the calculation process proceeds to step SC170. In step SC170, it is determined whether or not the termination condition of the preparatory control is satisfied. The termination condition of the preparatory control will be described later. In a case where the termination of the preparatory control is determined in step SC170 (i.e. Yes in SC170), the preparatory control is terminated at step SC190 and the preparatory control target value Qpt** is set back to zero (0). On the other hand, in a case where the termination of the preparatory control is denied in step SC170 (i.e. No in SC170), the calculation process proceeds to step SC180 and the preparatory control is continued.

Figure 24:
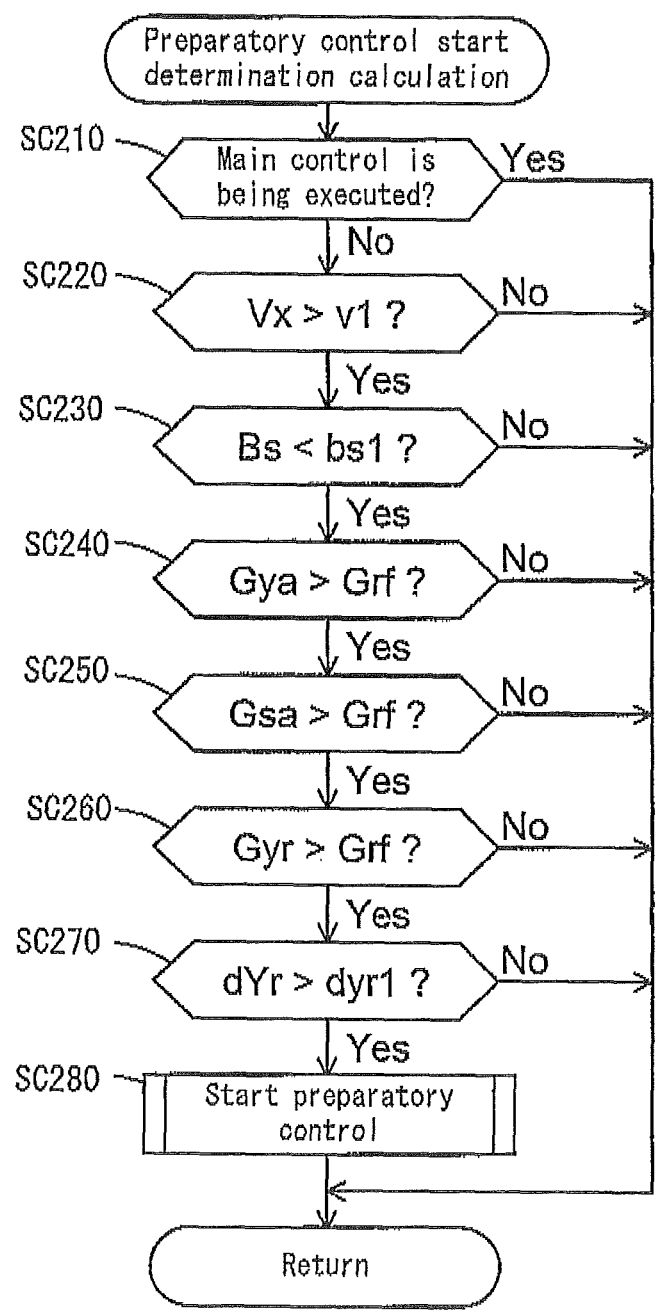
FIG. 24 is a control flowchart illustrating a processing example of a preparatory control start determination illustrated in FIG. 23 according to the third embodiment.

The preparatory control starting determination step SC160 illustrated in FIG. 23 (which corresponds to the start determination calculating block of the preparatory control calculating block BC62 illustrated in FIG. 22) will be described below with reference to FIG. 24. The preparatory control starting determination is executed to each wheel WH. Additionally, as mentioned above, when explaining the magnitude relation of values or when explaining the increase and decrease of the value in view of the steering directions and the turning direction, which are indicated by the plus and minus signs, the explanation may become too complicated. Therefore, values will be described (explained) on the basis of the magnitude relation of the absolute values or the increase and the decrease of the absolute value unless otherwise specified. Additionally, the predetermined value is set as a value with the plus sign (+). Furthermore, the symbols '' are used to comprehensively indicate wheels, specifically, 'fl' indicates the front-left wheel, 'fr' indicate the front-right wheel, 'rl' indicates the rear-left wheel, and 'rr' indicates the rear-right wheel.

In step SC210, it is determined whether or not the main control is executed. More specifically, the determination in step SC210 is executed on the basis of the main control target value Qmt of the vehicle stabilizing control. In a case where the main control has already been executed to the wheel WH, which is targeted for the determination, (i.e. in a case where a positive determination is concluded in step SC210 (Yes in SC210)), the preparatory control is not necessary, therefore, the preparatory control is not started. On the other hand, in a case where a negative determination is concluded in step SC210 (i.e. No in SC210, in a case where the main control is not executed), the calculation process proceeds to step SC220.

In step SC220, it is determined whether or not the vehicle speed Vx is greater than the predetermined value v1. In a case where the vehicle speed Vx is equal to or smaller than the predetermined value v1 and a negative determination is concluded in step SC220 (i.e. No in Sc220), the preparatory control is not started, because generally, in the case where the vehicle speed is low, the abrupt yawing behavior is less likely to occur, therefore, the necessity of compensating the responsiveness of the brake actuator BRK is low. On the other hand, in a case where the vehicle speed Vx is greater than the predetermined value v1 and a positive determination is concluded in step SC220 (i.e. Yes in SC220), the calculation process proceeds to step SC230.

In step SC230, it is determined whether or not the driver performs the brake operation. The determination in step SC230 is executed on the basis of the comparison result between the brake operation quantity Bs and the predetermined value bs1. In a case where the brake operation quantity Bs is equal to or greater than the predetermined value bs1 and the brake operating member BP is operated, a negative determination is concluded in step SC230 (i.e. No in SC230) and the preparatory control is not started, because the brake torque has already been generated at the wheel WH** while the driver performs the brake operation, therefore, the preparatory control is not necessary. On the other hand, in a case where the brake operation quantity Bs is smaller than the predetermined value bs1 (i.e. Bs<ba1) and a positive determination is concluded in step SC230 (i.e. Yes in SC230), the calculation process proceeds to step SC240.

In step SC240, it is determined whether or not the degree (the absolute value) of the actual lateral acceleration Gya is greater than the reference lateral acceleration Grf (one of the start determining conditions of the preparatory control). In a case where (the degree of) the actual lateral acceleration Gya is equal to or smaller than the reference lateral acceleration Grf and a negative determination is concluded in step SC240 (i.e. No in SC240), the preparatory control is not started. On the other hand, in a case where the degree (the absolute value) of the actual lateral acceleration Gya is greater than (the degree of) the reference lateral acceleration Grf and a positive determination is concluded in step SC240 (i.e. Yes in SC240), the calculation process proceeds to step SC250.

In step SC250, it is determined whether or not the degree (the absolute value) of the first estimated lateral acceleration Gsa, which is obtained (estimated) on the basis of the steering angle Sa, is greater than (the degree of) the reference lateral acceleration Grf. In a case where the first estimated lateral acceleration Gsa is equal to or smaller than the reference lateral acceleration Grf and a negative determination is concluded in step SC250 (i.e. No in SC250), the preparatory control is not started. On the other hand, in a case where the degree (the absolute value) of the first estimated lateral acceleration Gsa is greater than the reference lateral acceleration Gfr and a positive determination is concluded in step SC250 (i.e. Yes in SC250), the calculation process proceeds to step SC260.

In step SC260, it is determined whether or not the degree (the absolute value) of the second estimated lateral acceleration Gyr, which is obtained (estimated) on the basis of the actual yaw rate Yra, is greater than (the degree of) the reference lateral acceleration Grf. In a case where the second estimated lateral acceleration Gyr is equal to or smaller than the reference lateral acceleration Grf and a negative determination is concluded in step SC260 (i.e. No in SC260), the preparatory control is not started. On the other hand, in a case where the degree (the absolute value) of the second estimated lateral acceleration Gyr is greater than the reference lateral acceleration Grf and a positive determination is concluded in step SC260 (i.e. Yes in SC260), the calculation process proceeds to step SC270.

The start of the preparatory control is determined on the basis of the comparison between the actual turning state quantities Gya, Gsa and Gyr on the one hand and the reference lateral acceleration Grf, which is calculated on the basis of steering angular velocity dSa, on the other hand. Accordingly, the start of the main control of the vehicle stabilizing control is predicated on the basis of the steering angular velocity and the actual turning state quantity. Therefore, the preparatory control may be properly and accurately executed. Furthermore, because the start of the preparatory control is determined on the basis of plural turning state quantities Gya, Gsa and Gyr, the reliability in the execution of the preparatory control may be enhanced.

In step SC270, it is determined whether or not the degree (the absolute value) of the yaw angular acceleration dYr is greater than the predetermined value dyr1. In a case where the yaw angular acceleration dYr is equal to or smaller than the predetermined value dyr1 and a negative determination is concluded in step SC270 (i.e. No in SC270), the preparatory control is not started. On the other hand, in a case where a positive determination is concluded in step SC270 (i.e. Yes in SC270), the calculation process proceeds to step SC280 and the preparatory control is started. In step SC280, the preliminarily set predetermined value pre1 is outputted to the adjustment calculating block BC63 as the preparatory control target value Qpt**.

The reference lateral acceleration Grf for the preparatory control starting determination and the above-described predetermined values (the positive values) v1, bs1 and dyr1 are threshold values for determining the start of the preparatory control (i.e. the start determining threshold values for the preparatory control). The device does not need to include all of the above-mentioned determination blocks. For example, one or more of the determination block may be omitted.

Figure 25:
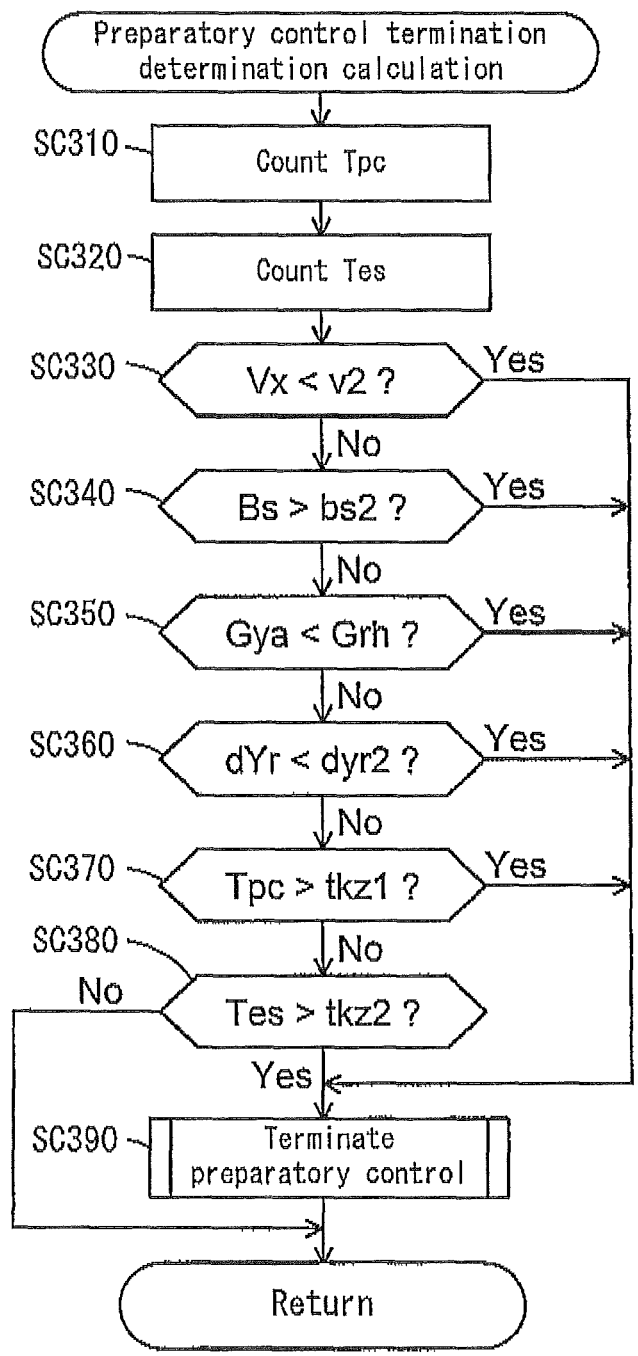
FIG. 25 is a control flowchart illustrating a processing example of a preparatory control termination determination illustrated in FIG. 23 according to the third embodiment.

The preparatory control termination determining step SC170 illustrated in FIG. 23 (which corresponds to the termination determination calculating block of the preparatory control calculating block BC62) will be described below with reference to FIG. 25. The termination determination of the preparatory control is executed to each wheel WH**.

In step SC310, a time during which the preparatory control is started and continued (i.e. the duration time Tpc) is counted. Furthermore, a time during which the main control is continued (i.e. the duration time Tes) is counted on the basis of the main control target value Qmt** of the vehicle stabilizing control.

In step SC330, it is determined whether or not the vehicle speed Vx is lower than the predetermined value v2 (<v1). In a case where the vehicle speed Vx is lower than the predetermined value v2 and a positive determination is concluded in step SC330 (i.e. Yes in SC330), the calculation process proceeds to step SC390. In step SC390, the preparatory control is terminated and the preparatory control target value Qpt** is set to zero (0), because generally, in the case where the vehicle speed decreases, the abrupt yawing behavior is less likely to occur. On the other hand, in a case where the vehicle speed Vx is equal to or greater than the predetermined value v2 and a negative determination is concluded in step SC330 (i.e. No in SC330), the calculation process proceeds to step SC340.

In step SC340, it is determined whether or not the driver starts the brake operation after the preparatory control is started, on the basis of the brake operation quantity Bs. In a case where the brake operation is performed by the driver, the brake operation quantity Bs becomes greater than the predetermined value bs2 (i.e. Bs>bs2 (>bs1)) and where a positive determination is concluded in step SC340 (i.e. Yes in SC340), the calculation process proceeds to step SC390. On the other hand, in a case where the brake operation quantity Bs is equal to or smaller than the predetermined value bs2 and a negative determination is concluded in step SC340 (i.e. No in SC340), the calculation process proceeds to step SC350.

In step SC350, it is determined whether or not the degree (the absolute value) of the actual lateral acceleration Gya is smaller than a reference lateral acceleration Grh used for the preparatory control termination determination. The reference lateral acceleration Grh of the termination determination is a value obtained by reducing the predetermined value g1 from the reference lateral acceleration Grf used for the starting determination (i.e. Grh=Grf−g1). In a case where the degree of the actual lateral acceleration Gya is smaller than the termination determining reference lateral acceleration Grh and a positive determination is concluded in step SC350 (i.e. yes in SC350), the calculation process proceeds to step SC390. In step SC390, the preparatory control is terminated, because generally, in a case where the actual lateral acceleration Gya decreases, the abrupt yawing behavior is less likely to occur. On the other hand, in a case where the degree of the actual lateral acceleration Gya is equal to or greater than the (termination determining) reference lateral acceleration Grh and a negative determination is concluded in step SC350 (i.e. No in SC350), the calculation process proceeds to step SC360.

In step SC360, it is determined whether or not the degree of the yaw angular acceleration dYr is smaller than the predetermined value dyr2 (<dyr1). In a case where the degree of the yaw angular acceleration dYr is smaller than the predetermined value dyr2 and the abrupt yawing behavior has not yet been generated, a positive determination is concluded in step SC360 (i.e. Yes in SC360) and the calculation process proceeds to step SC390. On the other hand, in a case where the degree of the yaw angular acceleration dYr is equal to or greater than the predetermined value dyr2 and a negative determination is concluded in step SC360 (i.e. No in SC360), the calculation process proceeds to step SC370.

In step SC370, it is determined whether or not the duration time Tpc of the preparatory control is greater than the predetermined value tkz1. In a case where the duration time Tpc is greater than the predetermined value tkz1 and a positive determination is concluded in step SC370 (i.e. Yes in SC370), the calculation process proceeds to step SC390 and the preparatory control is terminated, because generally, in the case where a predetermined amount of time has passed since the abrupt steering operation had been performed, the vehicle stabilizing control is not started, therefore, the preparatory control may not be necessary. On the other hand, in a case where the duration time Tpc is equal to or smaller than the predetermined value tkz1 and a negative determination is concluded in step SC370 (i.e. No in SC370), the calculation process proceeds to step SC380.

In step SC380, it is determined whether or not the duration time Tes of the main control is greater than the predetermined value tkz2. In a case where the duration time Tes is greater than the predetermined value tkz2 and a positive determination is concluded in step SC380 (i.e. Yes in SC380), the calculation process proceeds to step SC390 and the preparatory control is terminated, because generally, in the case where a predetermined amount of time has passed since the main control of the vehicle stabilizing control has been started, the preparatory control my not be necessary. On the other hand, in a case where the duration time Tes is equal to or smaller than the predetermined value tkz2 and a negative determination is concluded in step SC380 (i.e. No in SC380), the preparatory control is continued.

The reference lateral acceleration Grh used for determining the preparatory control termination and the above-mentioned predetermined values (the positive values) v2, bs2, dyr2, tkz1 and tkz2 are the threshold values for determining the termination of the preparatory control (i.e. the preparatory control termination determining threshold values). The device does not need to include all of the above-mentioned determination blocks. For example, one or more of the determination blocks may be omitted.

In the calculation process illustrated in FIG. 22, (the preparatory control start determining) reference lateral acceleration Grf is calculated on the basis of the steering angular velocity dSa. However, the reference lateral acceleration Grf may be calculated in a manner where, firstly, a maximum value (a peak value) of the steering angular velocity dSa is calculated, and then, the reference lateral acceleration Grf is calculated on the basis of the maximum value dSp. Other calculation process for calculating the reference lateral acceleration Grf based on the maximum steering angular velocity dSp will be described below with reference to FIG. 26. Additionally, only the difference between the calculation process illustrated in FIG. 22 and the calculation process illustrated in FIG. 26 will be described below.

Figure 26:
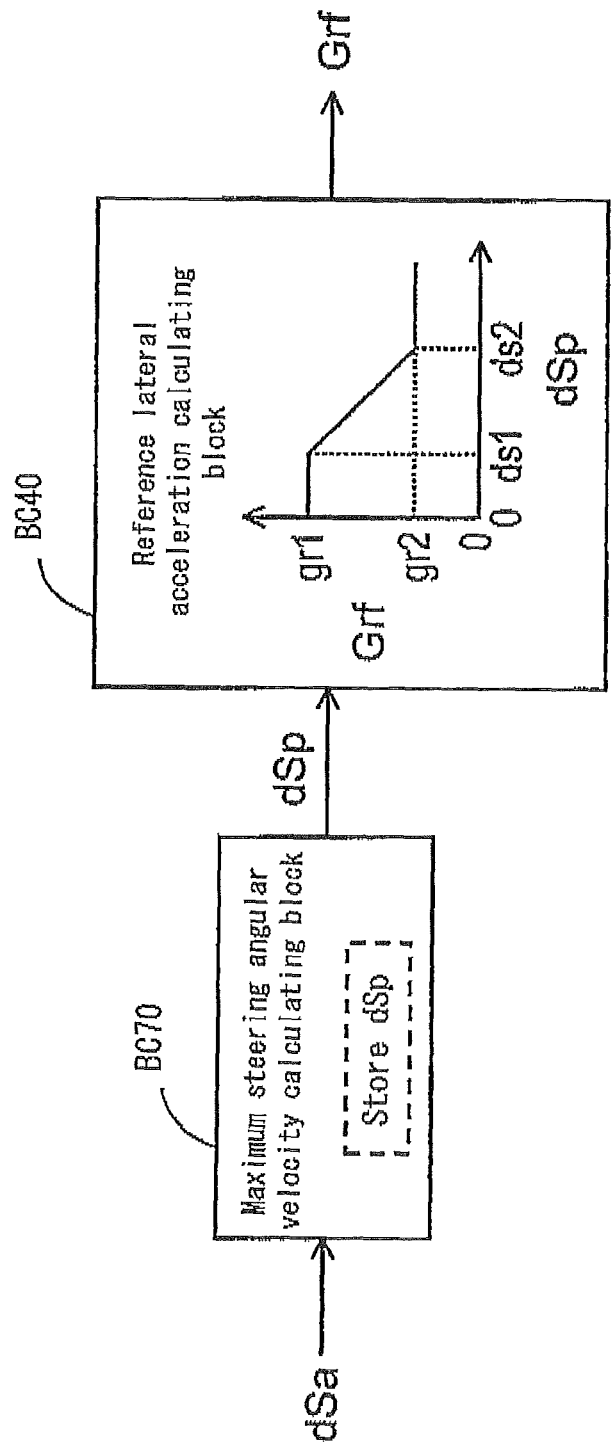
FIG. 26 is a functional block diagram illustrating another processing example of the motion control for the vehicle (the vehicle stabilizing control) according to the third embodiment.

The calculation process illustrated in FIG. 26 includes a maximum steering angular velocity calculating block BC70. The values of the steering angular velocity dSa, which is calculated at the steering angular velocity calculating black BC30, are continuously stored at the maximum steering angular velocity calculating block BC70, so that the maximum steering angular velocity dSa is determined on the basis of chronologically-ordered values of the stored steering angular velocities dSa. More specifically, the maximum steering angular velocities dSp[n−1] obtained up to the previous calculation process are stored within the maximum steering angular velocity calculating block BC70, so that the maximum values dSp[n−1] are compared with the steering angular velocity dSa[n] obtained in the current calculation process. Then, either the steering angular velocity dSp stored within the maximum steering angular velocity calculating block BC70 or the presently obtained steering angular velocity dSa having a greater value is obtained as the maximum steering angular velocity dSp[n] and is stored as a new maximum steering angular velocity dSp[n]. The maximum steering angular velocity dSp is set back to zero (0) after a predetermined time tk1 has passed. A subscript [n−1] indicates a previous calculation cycle. On the other hand, a subscript [n] indicates a present calculation cycle.

In the reference lateral acceleration calculating block BC40, the reference lateral acceleration Grf is calculated on the basis of the maximum steering angular velocity dSp while using the above-mentioned calculation map. More specifically, the reference lateral acceleration Grf is calculated on the basis of the characteristic in which the reference lateral acceleration Grf is set to the predetermined value gr1 in a case where the maximum steering angular velocity dSp is smaller than the predetermined value ds1, the reference acceleration Grf decreases in response to an increase of the maximum steering angular velocity dSp in a case where the maximum steering angular velocity dSp is equal to or greater than the predetermined value ds1 and where the predetermined value ds2 is smaller than the predetermined value ds2 (>ds1), and in which the reference lateral acceleration Grf is set to the predetermined value gr2 gr1) in a case where the maximum steering angular velocity dSp is equal to or greater than the predetermined value ds2.

The actual lateral acceleration may increase after the steering angular velocity reaches the maximum value (the peak value). Therefore, in this embodiment, the reference lateral acceleration Grf is calculated on the basis of the maximum steering angular velocity in order to compensate a phase shift (a phase difference) between the steering angular velocity dSa and the actual lateral acceleration Gya. Accordingly, the preparatory control is properly and accurately executed.

Advantages and merits of the motion control device for the vehicle according to the third embodiment will be described below with reference to FIG. 27.

Figure 27:
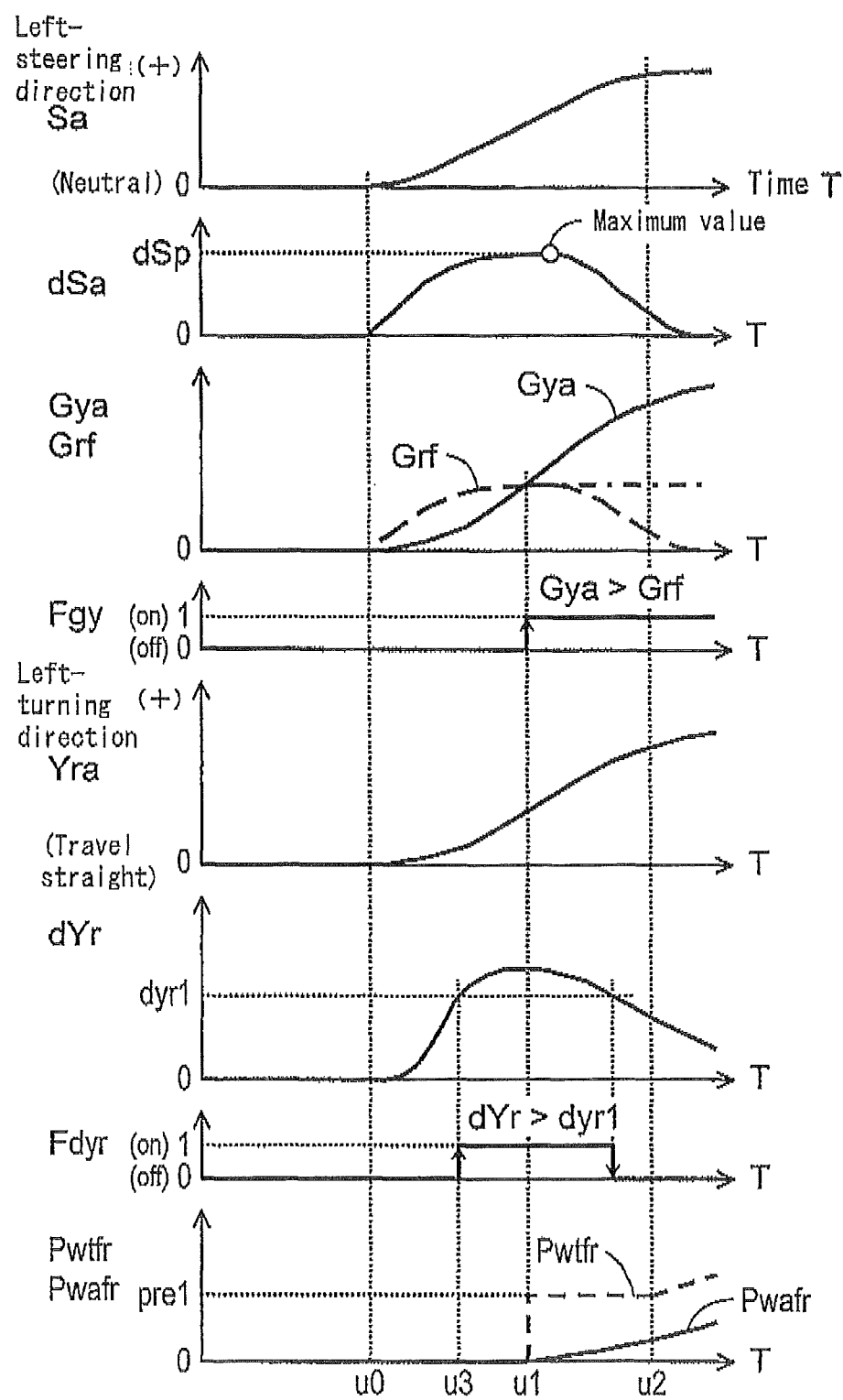
FIG. 27 is a diagram for explaining advantages and merits according to the third embodiment to be obtained.

According to the case illustrated in FIG. 27, the abrupt steering operation in the first direction (e.g. in the left direction) is started at time u0 and the steering angle Sa is rapidly increased. Then, the steering angular velocity dSa is obtained by the steering angular velocity obtaining means BC30 and the reference lateral acceleration Grf (which is indicated by a broken line in FIG. 27) is calculated on the basis of (the degree of) the steering angular velocity dSa. The steering angular velocity dSa may be calculated on the basis of the steering angle Sa. More specifically, in a case where the steering angular velocity dSa is relatively low, the reference lateral acceleration Grf is calculated to a relatively great value. Alternatively, in a case where the steering angular velocity dSa is relatively great, the reference lateral acceleration Grf is calculated to a relatively small value.

The maximum steering angular velocity dSp (i.e. the maximum value of the steering angular velocity) may be calculated on the basis of the steering angular velocity dSa. A data of the steering angular velocity dSa is stored within the maximum steering angular velocity calculating block BC70 in a chronological order in order to calculate the maximum value in the data as the maximum steering angular velocity dSp. More specifically, the maximum steering angular velocity dSp obtained up to the previous calculation cycles is stored within the maximum steering angular velocity calculating block BC70, so that the stored maximum steering angular velocities dSa are compared with the steering angular velocity dSa obtained in the present calculation cycle. Then, either the maximum steering angular velocity dSa obtained up to the previous calculation cycle or the steering angular velocity dSa obtained in the present calculation cycle having a greater value is calculated as the maximum steering angular velocity dSp and is stored within the maximum steering angular velocity calculating block BC70 as the new maximum steering angular velocity dSp.

The reference lateral acceleration Grf (which is indicated by an alternate long and short dashed line in FIG. 27) may be calculated on the basis of (the degree of) the maximum steering angular velocity dSp. More specifically, in the case where the maximum steering angular velocity dSp is relatively small, the reference lateral acceleration Grf is determined to a relatively great value. Alternatively, in the case where the maximum steering angular velocity is relatively great, the reference lateral acceleration Grf is determined to the relatively small value. Generally, a timing when the actual lateral acceleration Gya reaches the maximum value differs from a timing when the steering angular velocity dSa reaches the maximum value (the peak value). However, in this embodiment, because the reference lateral acceleration Grf is calculated on the basis of the maximum steering angular velocity dSp, the gap in the timings may be compensated (reduced).

The control flag Fgy indicating a comparison result between the actual lateral acceleration Gya (i.e. the actual value of the lateral acceleration) and the reference lateral acceleration Grf (i.e. the reference value of the lateral acceleration) may be set at the preparatory control calculating block BC62. In the case where the actual lateral acceleration Gya is equal to or smaller than the reference lateral acceleration Grf, zero (0) is outputted to the adjustment calculating block BC63 as the control flag Fgy. On the other hand, in the case where the actual lateral acceleration Gya is greater than the reference lateral acceleration Grf, one (1) is outputted to the adjustment calculating block BC63 as the control flag Fgy. In the case where the condition of the actual lateral acceleration Gya being greater than the reference lateral acceleration Grf is satisfied (time u1), the one (1) is outputted to the adjustment calculating block BC63 as the control flag Fgy (i.e. Fgy=1) and the preparatory control is started. More specifically, in this case, the target value Qptfr of the preparatory control (=the final target value Pwtfr=the predetermined value pre1) is outputted to the turning outer front wheel WH**, so that the actual brake torque Pwafr generated thereat is increased. Accordingly, because the preparatory control is started on the basis of the relationship of the actual turning state quantity relative to the reference value Grf, which is calculated on the basis of the steering angular velocity dSa, an unnecessary execution of the preparatory control may be avoided.

The first estimated lateral acceleration Gsa is obtained (estimated) on the basis of the steering angle Sa, and the first estimated lateral acceleration Gsa is compared with the reference lateral acceleration Grf. In the case where the condition of the first estimated lateral acceleration Gsa being greater than the reference lateral acceleration Grf (Gsa>Grf) is satisfied, the preparatory control may be started. Furthermore, the second estimated lateral acceleration Gyr is obtained (estimated) on the basis of the actual yaw rate Yra and the second estimated lateral acceleration Gyr is compared with the reference lateral acceleration Grf. When the condition of the second estimated lateral acceleration Gyr being greater than the reference lateral acceleration Grf (i.e. Gyr>Grf) is satisfied, the preparatory control may be started. Accordingly, because plural turning state quantities Gya, Gsa and Gyr are used for the determination of the start of the preparatory control, the reliability in the execution of the preparatory control may be enhanced.

Furthermore, the yaw angular acceleration dYr is obtained by the yaw angular acceleration calculating means BC110, and the degree of the obtained yaw angular acceleration dYr corresponding to the steering angular velocity dSa is compared with the predetermined value dyr1. The "degree of the yaw angular acceleration dYr corresponding to the steering angular velocity dSa" indicates the absolute value of the yaw angular acceleration dYr to be obtained when the sign of the steering angular velocity dSa corresponds to the sign of the yaw angular acceleration dYr. The yaw angular acceleration dYr may be calculated on the basis of the actual yaw rate Yra. The control flag Fdyr indicating the comparison result may be set at the preparatory control calculating block BC62. More specifically, in the case where the yaw angular acceleration dYr is equal to or smaller than the predetermined value dyr1, zero (0) is outputted to the adjustment calculating block BC63 as the control flag Fdyr. On the other hand, in the case where the yaw angular acceleration dYr is greater than the predetermined value dyr1, one (1) is outputted to the adjustment calculating block BC63 as the control flag Fdyr. According to the case illustrated in FIG. 27, the condition of the yaw angular acceleration dYr being greater than the predetermined value dyr1 (i.e. dYr>dyr1) is satisfied at time u3. The preparatory control may be started in the case where the condition in which the actual lateral acceleration Gya is greater than the reference lateral acceleration Grf (i.e. Fgy=1) and the yaw angular acceleration dYr is greater than the predetermined value dyr1 (i.e. Fdyr=1) is satisfied (time u2). Accordingly, the target value Qptfr of the preparatory control (=the final target value Pwtfr=the predetermined value pre1) is outputted to the turning outer front wheel WH**, so that the actual brake torque Pwafr thereat is increased.

Accordingly, because the supply of the brake torque to the (target) wheel WH** is executed earlier than the start of the main control of the vehicle stabilizing control (e.g. the main control is started at time u2), the responsiveness of the brake actuator BRK may be compensated. Generally, in the case where the abrupt yawing motion does not occur (i.e. in the case where the yaw angular acceleration dYr is not that great), the necessity of the preparatory control is low. Therefore, in this embodiment, the yaw angular acceleration dYr is also taken into account for the determination of the preparatory control in addition to the reference lateral acceleration based on the steering angular velocity dSa. As a result, the preparatory control may be properly executed.

The motion control device for the vehicle according to the third embodiment includes the maximum steering angular velocity calculating means BC70 for calculating the maximum steering angular velocity dSp (which is also referred to as a steering angular velocity maximum value) on the basis of the steering angular velocity dSa, which is obtained by the steering angular velocity obtaining means BC30. The maximum steering angular velocity calculating means BC70 stored therein the steering angular velocities dSa obtained up to the previous calculation process in order to calculate the maximum steering angular velocity dSp on the basis of the stored steering angular velocities dSa. The determining means BC40 determines the reference lateral acceleration Grf on the basis of the maximum steering angular velocity dSp. More specifically, the determining means BC40 determines the reference lateral acceleration Grf in the manner where the greater (the degree of) the maximum steering angular velocity dSp is, the smaller value the reference lateral acceleration Grf is determined to be, or the smaller (the degree of) the maximum steering angular velocity dSp is, the greater value the reference lateral acceleration Grf is determined to be.

The motion control device for the vehicle according to the third embodiment includes the steering angle obtaining means BC80 for obtaining the steering angle Sa of the vehicle and the first estimated lateral acceleration calculating means BC90 (which servers as the first estimating means) for calculating the first estimated lateral acceleration Gsa on the basis of the steering angle Sa. The determining means BC40 may be configured so as to apply the brake torque to the wheel WH when the first estimated lateral acceleration Gsa exceeds the reference lateral acceleration Grf. The device further includes the second estimated lateral acceleration calculating means BC100 (which serves as the second estimating means) for calculating the second estimated lateral acceleration Gyr on the basis of the actual yaw rate Yra. In this case, the determining means BC40 may be configured so as to apply the brake torque to the wheel WH when the second estimated lateral acceleration Gyr exceeds the reference lateral acceleration Grf. Additionally, the steering angular velocity obtaining means BC30 may be configured so as to calculate the steering angular velocity dSa on the basis of the steering angle Sa, which is obtained by the steering angle obtaining means BC80.

The motion control device for the vehicle according to the third embodiment includes the yaw angular acceleration calculating means BC110 for calculating the yaw angular acceleration dYr on the basis of the actual yaw rate Yra. In this case, the braking means BC60 may be configured so as to control and apply the brake torque to the wheel WH** when the yaw angular acceleration dYr exceeds the predetermined value dyr1.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motion control device for a vehicle including an actual yaw rate obtaining means for obtaining an actual yaw rate of the vehicle and a braking means for applying a brake torque to a wheel of the vehicle, and maintaining a traveling stability of the vehicle by controlling the brake torque via the braking means on the basis of the actual yaw rate, the motion control device for the vehicle comprising:
   a steering angular velocity obtaining means for obtaining a steering angular velocity of the vehicle;
   a maximum steering angular velocity calculating means for continuously storing values of the steering angular velocity and calculating a maximum steering angular velocity on the basis of chronologically-ordered stored values of the steering angular velocity;
   a determining means for determining a reference lateral acceleration on the basis of the maximum steering angular velocity so that the greater the maximum steering angular velocity is, the smaller the reference lateral acceleration is;
   an actual lateral acceleration obtaining means for obtaining an actual lateral acceleration acting on the vehicle; and
   a preparatory control means for applying a preparatory brake torque for compensating responsiveness of the braking means to the wheel in a case where the actual lateral acceleration exceeds the reference lateral acceleration wherein the preparatory control means is configured to apply the preparatory brake torque before a main control means determines that braking is needed.

2. The motion control device for the vehicle according to claim 1 further comprising a steering angle obtaining means for obtaining a steering angle of the vehicle and a first estimating means for calculating a first estimated lateral acceleration on the basis of the steering angle, wherein the determining means applies the preparatory brake torque for compensating the responsiveness of the braking means to the wheel in a case where the first estimated lateral acceleration exceeds the reference lateral acceleration.

3. The motion control device for the vehicle according to claim 1 further comprising a second estimating means for calculating a second estimated lateral acceleration on the basis of the actual yaw rate, wherein the determining means applies the preparatory brake torque for compensating the responsiveness of the braking means to the wheel in a case where the second estimated lateral acceleration exceeds the reference lateral acceleration.

4. The motion control device for the vehicle according to claim 1 further comprising a yaw angular acceleration calculating means for calculating a yaw angular acceleration on the basis of the actual yaw rate, wherein the preparatory control means applies the preparatory brake torque for compensating the responsiveness of the braking means to the wheel in a case where the yaw angular acceleration exceeds a predetermined value.

5. The motion control device for the vehicle according to claim 1 further comprising a yaw angular acceleration obtaining means for obtaining a yaw angular acceleration of the vehicle, wherein the preparatory control means applies the preparatory brake torque for compensating the responsiveness of the braking means to the wheel on the basis of the yaw angular acceleration obtained in a case where the steering angle increases.

6. The motion control device for the vehicle according to claim 1, wherein the preparatory control means sets the maximum steering angular velocity to zero after a predetermined time has passed.

* * * * *